United States Patent [19]
Sagawa et al.

[11] Patent Number: 5,963,731
[45] Date of Patent: Oct. 5, 1999

[54] METHOD OF ASSISTING EXECUTION OF PLURAL SIMULATION PROGRAMS FOR COUPLED SIMULATION

[75] Inventors: Nobutoshi Sagawa, Koganei; Mikio Nagasawa, Kodaira; Sigeo Ihara, Tokorozawa; Katsuro Kikuchi, Hachioji; Masahiko Hirao, Kawagoe; Kirin Ka, Hachioji; Satoshi Itoh, Kodaira; Yoshio Suzuki, Kokubunji, all of Japan

[73] Assignee: Hitachi, Ltd., Tokyo, Japan

[21] Appl. No.: 08/773,773

[22] Filed: Dec. 24, 1996

[30] Foreign Application Priority Data

Dec. 25, 1995 [JP] Japan .................................. 7-336430
Jun. 5, 1996 [JP] Japan .................................. 8-142587
Sep. 30, 1996 [JP] Japan .................................. 8-258266

[51] Int. Cl.$^6$ .......................... G06F 15/163; G06F 13/00
[52] U.S. Cl. ............................... 395/500.27; 395/500.33; 709/300
[58] Field of Search ................... 364/578, 512; 395/500

[56] References Cited

U.S. PATENT DOCUMENTS

| 4,914,612 | 4/1990 | Beece et al. ............................. 364/578 |
| 5,386,566 | 1/1995 | Hamanaka et al. ...................... 395/700 |
| 5,557,774 | 9/1996 | Shimabukuro et al. ................ 395/500 |
| 5,701,439 | 12/1997 | James et al. ............................. 395/500 |
| 5,737,628 | 4/1998 | Birrittella et al. ................. 395/800.11 |
| 5,850,345 | 12/1998 | Son ......................................... 364/578 |

FOREIGN PATENT DOCUMENTS 4-336369  11/1994  Japan .............................. G06F 15/16

OTHER PUBLICATIONS

"The Mathmatics of Public–Key Cryptography" by Martin E. Hellman vol. 241 No. 2 (1979) pp. 130–139.
"Cryptography and Computer Privacy", by Horst Feistel vol. 228 No. 5 (May 1973) pp. 15–23.

*Primary Examiner*—Kevin J. Teska
*Assistant Examiner*—Lonnie A. Knox
*Attorney, Agent, or Firm*—Antonelli, Terry, Stout & Kraus, LLP

[57] ABSTRACT

Each of a plurality of simulation programs is linked with a data conversion library and is executed as a simulation process. A data conversion process is executed in correspondence with each simulation process. In exchanging data resulted from simulation by the simulation process of one of the simulation programs with simulation processes of the other simulation programs, the data conversion process provided for a sending simulation process determines a receiving simulation process to which the data is to be sent, and sends the data to the data conversion process corresponding to the receiving simulation process. The data conversion process for the receiving simulation process performs data conversion for absorbing difference between the base of the sending simulation process and the base of the receiving simulation process, and transfers the data after the conversion to the receiving simulation process.

43 Claims, 31 Drawing Sheets

12 CONFIGURATION FILE

```
133.144.20.21 /usr/local/bin/dataexd
133.144.20.22 /usr/local/bin/dataexd
133.144.20.23 /usr/local/bin/dataexd
133.144.20.24 /usr/local/bin/dataexd
133.144.20.25 /usr/etc/dataexd
133.144.20.26 /usr/etc/dataexd
133.144.20.27 /usr/etc/dataexd
133.144.20.28 /usr/etc/dataexd
```

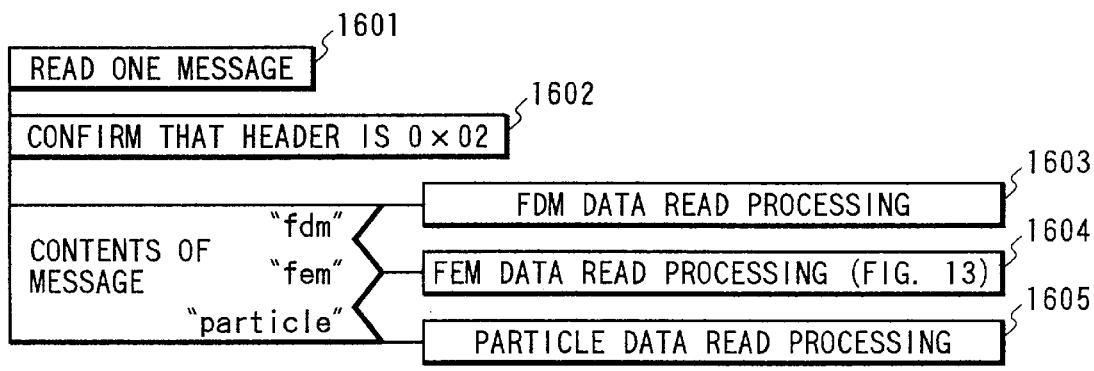
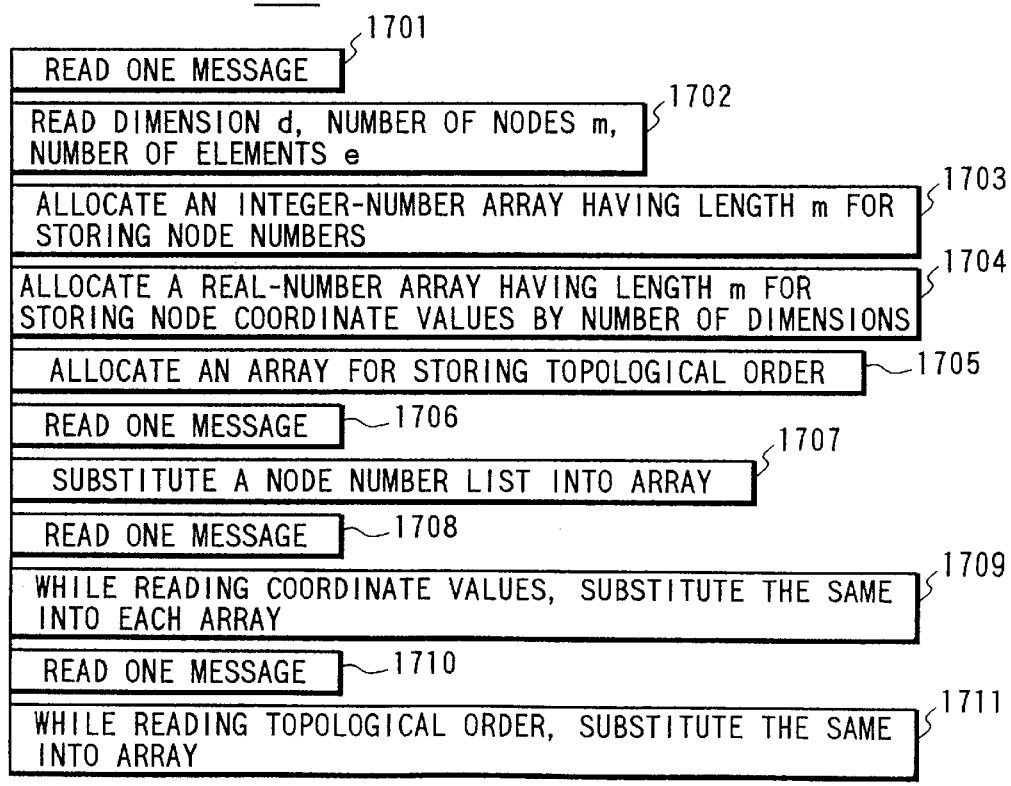

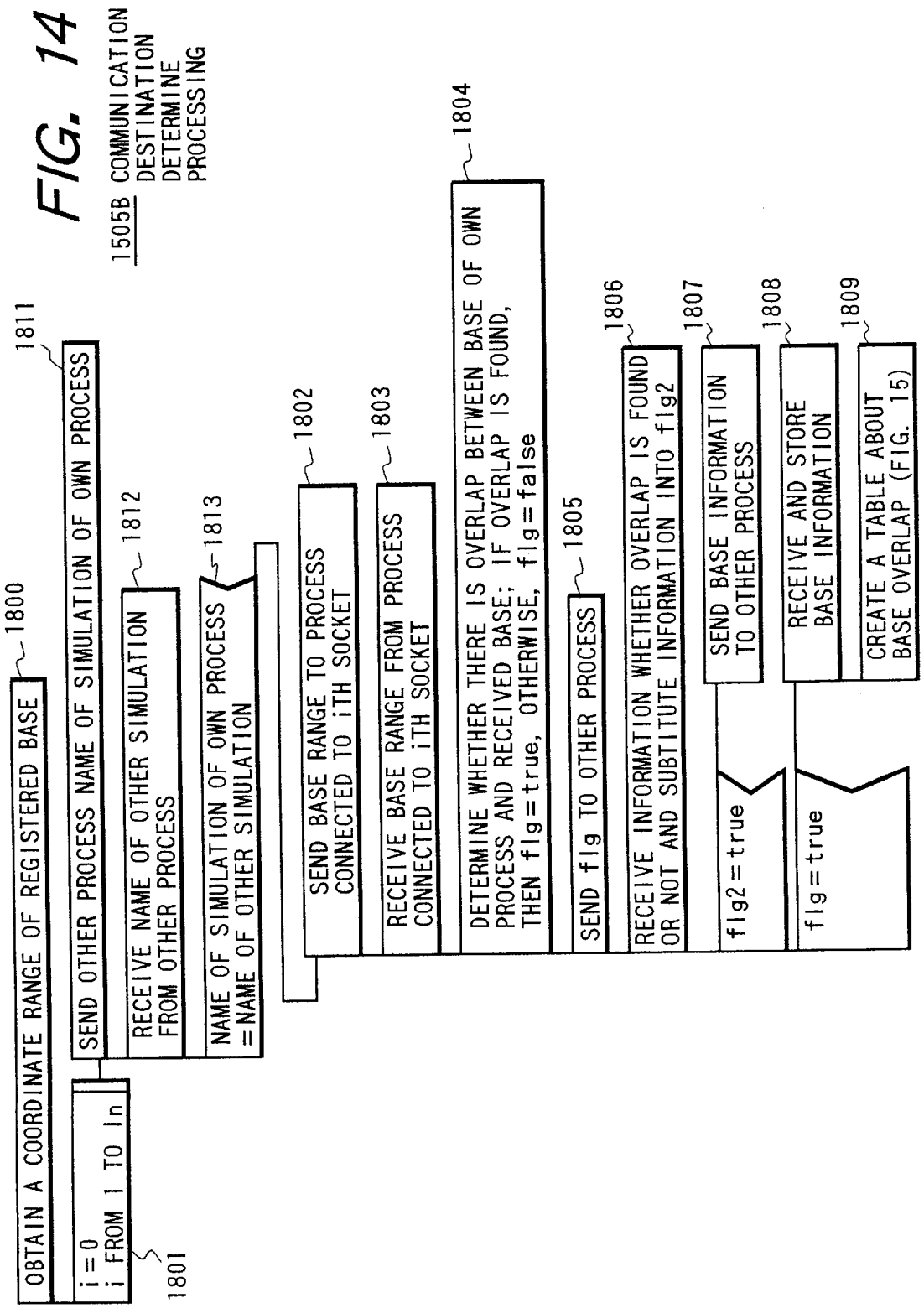

200 OVERLAP TABLE

| GRID POINT NUMBER | 18 | 23 | |
|---|---|---|---|
| NUMBER OF NODE AROUND GRID POINT | 211, 212, 254, 253 | 212, 213, 255, 254 | 2102 |
| LOCAL COORDINATES OF GRID POINT IN FINITE ELEMENT | 0.5, 0.5 | 0.4, 0.3 | 2103 |

(2101 at top row)

1908 FDM TO FEM COORDINATE CONVERSION

200 OVERLAP TABLE

| NODE NUMBER | 211 | 212 |
|---|---|---|
| NUMBER OF GRID POINT CONSTITUTING ELEMENT INCLUDING NODE | 5, 17, 18, 6 | 17, 22, 23, 18 |
| DISTANCE FROM EACH GRID POINT TO NODE | 1.2, 0.8, 1.3, 1.5 | 1.5, 1.1, 0.6, 1, 1 |

– 2301
– 2302
– 2303

1907 PARTICLE TO FDM COORDINATE CONVERTION

200 OVERLAP TABLE

| GRID POINT NUMBER | 18 | 23 |
|---|---|---|
| NUMBER OF PARTICLE AROUND GRID POINT | 453, 478, 485, 498, 524 | 529, 533 |

FIG. 32A

| 301 | 302 | 303 | 304 | 305 |
|---|---|---|---|---|
| 501 | 100M | 32M | 30M | 50M |
| ⋮ | ⋮ | ⋮ | ⋮ | ⋮ |
| 509 | 100M | 128M | 100M | 50M |

FIG. 32B

| 311 | 312 | 313 |
|---|---|---|
| mesh | {(501,502,503),(504,505,506,), (507,508,509)} | 50M |

FIG. 32C

| 321 | 322 | 323 | 324 | 325 |
|---|---|---|---|---|
| /users/taro/work/simA | 50M | 20M | 0M | 10M |
| /users/taro/work/simB | 100M | 30M | 10M | 10M |

FIG. 33

| 401 / 411 | 402 / 412 | 403 / 413 |
|---|---|---|
| 0.12 | 0.25 | 0.30 |
| 60M | 50M | 45M |
| 10M | 12M | 15M |
| 2M | 2M | 2M |
| 421 | 422 | 423 |
| 431 | 432 | 433 |

FIG. 34A

| 601 | 602 | 603 | 604 | 605 |
|---|---|---|---|---|
| 501-503 | 100M | 32M | 30M | 50M |
| 504-506 | 100M | 64M | 30M | 50M |
| 507-509 | 100M | 128M | 100M | 50M |

FIG. 34B

| 611 | 612 | 613 |
|---|---|---|
| 501-509 | mesh{(501,502,503),(504,505,506),(507,508,509)} | 50M |

FIG. 34C

| 621 | 622 | 623 | 624 | 625 | 626 |
|---|---|---|---|---|---|
| /users/taro/work/simA | 50M | 20M | 0M | 10M | 2 |
| /users/taro/work/simB | 100M | 30M | 10M | 10M | 4 |

FIG. 36

| 801 | 802 | 803 | 804 | 805 |
|---|---|---|---|---|
| 501 | 0.50 | 8M | 5M | 10M |
| 502 | 0.65 | 10M | 5M | 10M |
| 503 | 0.45 | 8M | 5M | 10M |
| 504 | 0.05 | 55M | 1M | 0 |
| 505 | 0.05 | 55M | 1M | 0 |
| 506 | 0.05 | 55M | 1M | 0 |
| 507 | 0.05 | 100M | 1M | 0 |
| 508 | 0.05 | 90M | 1M | 0 |
| 509 | 0.05 | 100M | 1M | 0 |

FIG. 37

| 901 | 902 | 903 | 904 | 905 |
|---|---|---|---|---|
| 501 | 50M | 0.75 | 0.83 | 0.8 |
| 502 | 35M | 0.69 | 0.83 | 0.8 |
| 503 | 55M | 0.75 | 0.83 | 0.8 |
| 504 | 95M | 0.14 | 0.97 | 1.0 |
| 505 | 95M | 0.14 | 0.97 | 1.0 |
| 506 | 95M | 0.14 | 0.97 | 1.0 |
| 507 | 95M | 0.22 | 0.99 | 1.0 |
| 508 | 95M | 0.30 | 0.99 | 1.0 |
| 509 | 95M | 0.22 | 0.99 | 1.0 |

FIG. 38

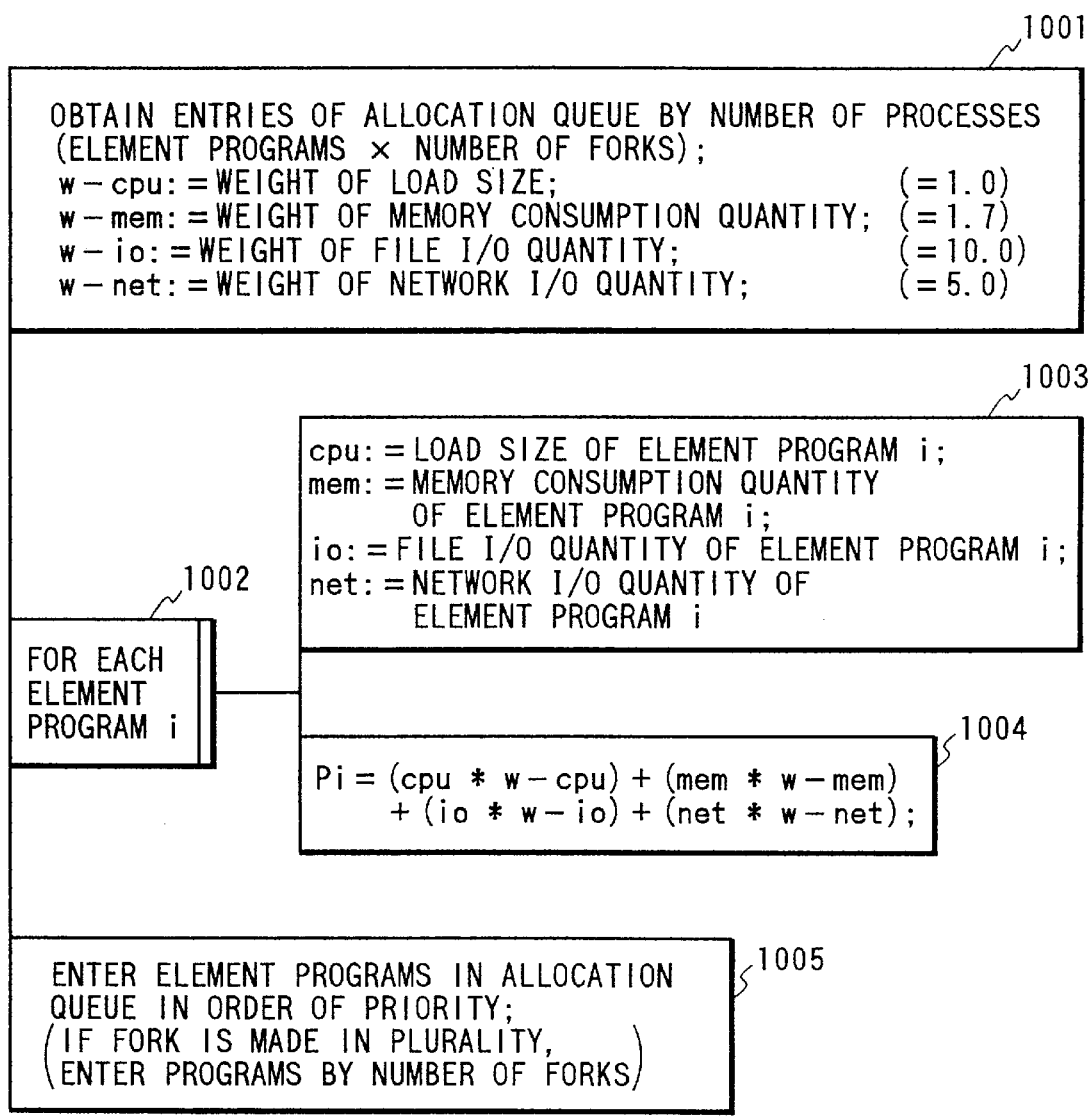

1001: OBTAIN ENTRIES OF ALLOCATION QUEUE BY NUMBER OF PROCESSES
(ELEMENT PROGRAMS × NUMBER OF FORKS);
w−cpu: = WEIGHT OF LOAD SIZE;                    (=1.0)
w−mem: = WEIGHT OF MEMORY CONSUMPTION QUANTITY;  (=1.7)
w−io: = WEIGHT OF FILE I/O QUANTITY;             (=10.0)
w−net: = WEIGHT OF NETWORK I/O QUANTITY;         (=5.0)

1002: FOR EACH ELEMENT PROGRAM i

1003: cpu: = LOAD SIZE OF ELEMENT PROGRAM i;
mem: = MEMORY CONSUMPTION QUANTITY
       OF ELEMENT PROGRAM i;
io: = FILE I/O QUANTITY OF ELEMENT PROGRAM i;
net: = NETWORK I/O QUANTITY OF
       ELEMENT PROGRAM i 1004: $P_i = (cpu * w-cpu) + (mem * w-mem) + (io * w-io) + (net * w-net);$ 1005: ENTER ELEMENT PROGRAMS IN ALLOCATION
QUEUE IN ORDER OF PRIORITY;
(IF FORK IS MADE IN PLURALITY,
ENTER PROGRAMS BY NUMBER OF FORKS)

FIG. 39A

| POINTER TO ELEMENT PROGRAM | PRIORITY 1 | PRIORITY 2 | PRIORITY 3 | PRIORITY 4 |
|---|---|---|---|---|

| POINTER TO simB | CPU | FILE I/O | MEMORY | NETWORK I/O |
|---|---|---|---|---|
| POINTER TO simB | CPU | FILE I/O | MEMORY | NETWORK I/O |
| POINTER TO simB | CPU | FILE I/O | MEMORY | NETWORK I/O |
| POINTER TO simB | CPU | FILE I/O | MEMORY | NETWORK I/O |
| POINTER TO simA | CPU | NETWORK I/O | MEMORY | FILE I/O |
| POINTER TO simA | CPU | NETWORK I/O | MEMORY | FILE I/O |

FIG. 41

| | | | | | | | | | |
|---|---|---|---|---|---|---|---|---|---|
| 501 | 0.50 | 8M | 5M | 10M | 501 | 50M | 0.75 | 0.83 | 0.8 |
| 502 | 0.65 | 10M | 5M | 10M | 502 | 35M | 0.69 | 0.83 | 0.8 |
| 503 | 0.45 | 8M | 5M | 10M | 503 | 55M | 0.75 | 0.83 | 0.8 |
| 504 | 0.05 | 55M | 1M | 0 | 504 | 95M | 0.14 | 0.97 | 1.0 |
| 505 | 0.05 | 55M | 1M | 0 | 505 | 95M | 0.14 | 0.97 | 1.0 |
| 506 | 0.05 | 55M | 1M | 0 | 506 | 95M | 0.14 | 0.97 | 1.0 |
| 507 | 0.25 | 70M | 3M | 2M | 507 | 75M | 0.45 | 0.97 | 0.96 |
| 508 | 0.05 | 90M | 1M | 0 | 508 | 95M | 0.30 | 0.99 | 1.0 |
| 509 | 0.05 | 100M | 1M | 0 | 509 | 95M | 0.22 | 0.99 | 1.0 |

| | |
|---|---|
| 401 | — |
| 402 | — |
| 403 | — |
| 404 | /users/taro/work/simB |
| 405 | /users/taro/work/simA |
| 406 | /users/taro/work/simA |
| 407 | /users/taro/work/simB |
| 408 | /users/taro/work/simB |
| 409 | /users/taro/work/simB |

METHOD OF ASSISTING EXECUTION OF PLURAL SIMULATION PROGRAMS FOR COUPLED SIMULATION

BACKGROUND OF THE INVENTION

The present invention relates to a method of assisting execution of a plurality of numerical simulation programs for simulating physical phenomena on a computer so that the programs are executed in cooperation with each other.

Recently, a parallel computer system has become commercially available in which a plurality of processing units (hereinafter also referred to as PUs) are interconnected by way of a high-speed network to be operated simultaneously for enhanced throughput. A region to be simulated is appropriately divided into partial regions, in such a way that each PU has one partial region assigned, thereby effectively exploiting the most of the high processing speed of the parallel computer system.

Parallel computer systems are largely classified into two groups by the method of accessing the memory space from each PU. One group is of shared memory type in which all PUs can access the entire memory space. The other group is of distributed memory type in which each PU can access only a memory space accompanied therewith. Since numerical simulation aims principally at solving large-scale problems by raising computational speeds, use of a parallel computer system of a distributed-memory type is under study.

In a parallel computer system in which a region to be simulated is divided into plural portions and those portions are allocated to a plurality of Pus, exchange of data between the PUs is required during simulation. The data to be exchanged includes results of computation of a physical quantity and the like. For example, a computed value of a physical quantity at a grid point located on the border of a partial region is used for computing a value of the physical quantity at a grid point near the boundary in an adjacent partial region. With a distributed-memory parallel computer system, transfer of data between the PUs must all be described in a program. Data is transferred between the PUs in terms of a message. A program for a parallel computer system must explicitly describe an instruction such that data generated by own PU is transmitted to another PU on generation of the data, in case the data is one required by the another PU, and data held by another PU is received by own PU at a timing when own PU actually uses the data, in case the data is one required by own PU. Many parallel computer systems prepare a group of functions each called a communications library (or subroutines) for supporting the transfer of messages between the PUs. The communication can be described as a function call from C or FORTRAN programs for example. Several communications libraries are implemented across different parallel computer system hardware to provide communications environment as de facto standard. Examples are the PVM (Parallel Virtual Machine) developed by Oak Ridge National Laboratory of US and the MPI (Message Passing Interface) that is under standardization involving many organizations. The parallel programs with calls to these communications libraries are high in possibility (portability) that they can be recompiled on different parallel computer systems for operation.

In executing a simulation program by a plurality of PUs, a plurality of processes for performing simulation of partial regions are executed by the plurality of PUs. In the PVM, a process being executed on each PU is provided with process identification data (PID) that is unique in the PVM. Each of messages transferred between PUs is composed of main data, the PID, and a message ID (MID) that the user can assign to the message. Therefore, creating parallel programs each of which executes communication based on the PID and MID determined appropriately by the user enables transfer messages between PUs without interference.

A communications library such as the PVM can be implemented on a plurality of workstations interconnected by a network, in addition to parallel computer systems, thereby providing a virtual parallel computer system environment. In operating communications libraries on multiple, different hardware systems, internal data representation may differ from one hardware system to another. That is, if a plurality of workstations interconnected by a network use different central processing units (CPUs) and operating systems (OSs), data types such as integer number and real number in a same program may differ in internal bit representation between the workstations. Therefore, to allow the user of a communications library to make communication without being aware of the details of data representation, the communications libraries such as the PVM provide a capability of automatically converting data representations inside the libraries as required. Providing a PVM process with an appropriate data converting capability allows a message coming from a user process to be converted appropriately and the resultant message to be sent to a destination process. In such a constitution, the differences between OSs and between CPUs are absorbed by the PVM processes, so the user programs are highly independent of the OSs and CPUs.

It should be noted that, when a simulation region of one simulation program is divided into partial simulation regions and simulation processings for them are executed by a plurality of processors concurrently, the mesh density of each partial region may differ from that of an adjacent partial region. According to Japanese Laid-Open Patent Publication No. 4-336369, a technology is disclosed which reflect physical quantities calculated at discrete points on the boundary between of a partial region onto the simulation of an adjacent partial region. That is, a circuit is provided for converting the calculated physical quantities to values at the discrete points on the boundary, belonging to the adjacent partial region and data obtained by this circuit is transferred to an adjacent processor. Actually, the number of boundaries and contour data are entered from both input and output units to create a conversion matrix by the arithmetic unit and the above-mentioned conversion is performed based on the conversion matrix.

Numerical simulation aims at obtaining the distribution of a physical quantity concerned. Numerical simulation is largely divided into two groups by method of representation physical quantity. One is simulations of continuous system and the other is simulations of particle system.

In continuous-system simulation, a physical quantity to be obtained is expressed by f and a space is expressed by a coordinate (x, y) (or (x, y, z) for a three-dimensional space) and the problem comes to solve an equation that f(x, y) satisfies. For example, Maxwell's equations for electromagnetic field description and Navier-Stokes equations for fluid field description are known as the equations of this type. Normally, these equations take a form of partial differential equation; therefore, except for very simple cases, no solution can be obtained analytically. Consequently, an approximate solution is numerically obtained for each problem by means of a computer. To numerically express the distribution of f(x, y) in the computer, a concept of functional discretization is introduced. Discretization denotes an operation for approximately representing, in the finite number of numerical values, an originally continuous function.

An example of the mesh is one obtained by dividing the (x, y) space by a plurality of straight lines orthogonally intersecting each other into a grid. This grid is also referred to as an orthogonal grid. In this case, grid lines are straight lines and intersecting each other orthogonally. In a more general situation, the grid lines may be curved. A technique for obtaining the value of physical quantity at the grid lines in the mesh is referred to as finite differential method.

In another mesh example, a mesh has an arbitrary shape composed of a trilateral or a quadrilateral. This type is called an unstructured grid. A typical technique for obtaining the value of physical quantity in a region divided into an unstructured grid includes finite element method. In this method, a grid point is referred to as a node and a trilateral or a quadrilateral is referred to as an element.

A special example of continuous-system simulation is also known in which, instead of using a mesh, f is expressed as a linear combination of known simple functions (for example, triangular functions). In this case, a discrete value corresponding to the function value at a mesh point is considered as a value of a coefficient for each function.

The grid points of a structured grid or an unstructured grid are positions where physical quantities are calculated, and are generally referred to as discrete points. A set of discrete points is referred to as a base or a simulation base. A set of grid points to which the simulation by finite differential method or finite element method is applied is sometimes referred to as a differential base or a finite element base. If one simulation program is executed on a parallel computer system as a plurality of simulation processes that handle different partial simulation regions, a group of discrete points belonging to each partial simulation region handled by each simulation process is referred to as the base of that simulation process.

In a particle-system simulation, a physical quantity is represented as motions of particles distributed in space. Each particle may correspond to a physical entity such as an atom in a materials simulation or a star in an astronomical simulation, and a problem to be used is described by use of the first principle of physics such as equation of motion. To save computational time, a technique is sometimes used in which a group of particles are represented by a single virtual particle. The position of each particle is described by coordinates $(x(t),y(t),z(t))$ and their time differentials with time t being an independent variable. Therefore, an equation to be mainly solved by a particle-system simulation is an ordinary differential equation. In this case too, it is difficult to obtain an analytical solution for a system having particles more than several particles; solving a problem having a realistic scale requires to resort to a numerical solving method assisted by a computer. It should be noted that in the particle-system simulation, a set of particles provides the base of simulation.

A continuous-system simulation and a particle-system simulation may be considered that both represent the same physical phenomenon in terms of different scales. While the particle-system simulation pays attention to a microscopic motion of each component of a physical phenomenon, the continuos-system simulation grasps the same phenomenon more macroscopically to understand to a statistical behavior. The same physical phenomenon can sometimes be solved by both methods. Often, however, these two methods are used complementarily according to the size and scale of problems to be handled.

To correctly analyze a physical phenomenon which is complex and industrially interesting, it is desired to perform coupled simulation such as simulation that considers a coupling effect of a plurality of physical phenomena occurring concurrently or simulation that combines different paradigms such as the particle system and the continuous system. For example, in designing a fluid related machine, it is possible that an analysis of a flow pattern of fluid by particle-system simulation and an analysis of vibration caused by the flow pattern by continuous-system simulation be performed simultaneously.

Conventionally, when it becomes necessary to analyze a plurality of physical phenomena or combine different simulation techniques, one of the following approaches has been selected.

(1) A plurality of user programs corresponding to respective simulation are obtained, rewritten and integrated into a coupled simulation program.

(2) Two simulation programs are executed alternately to exchange data between the programs without integrating them into one program.

If the two simulation programs are no t integrated, it is necessary to send a computational result data by one program to another program for a partial region at which simulation regions of these programs overlap. In an actual known method, the output of one simulation program is once stored in a file or the like and the format of the stored data is converted to the input format of the other simulation program as required. These operations are repeated to attain the same effect as that of coupled simulation.

If the simulation programs A and B are executed separately without integrating them into one program, data obtained as a result of the execution of the simulation program A cannot be reading used by the simulation program B because these programs have different bases. That is, the result data of the simulation program A are data defined on the base of the program A. So the data needs to be converted to one defined on the base of the simulation program B. This data conversion is executed based on a positional relationship between the coordinates of a group of discrete points constituting the base of the other simulation program and the coordinates of a group of discrete points constituting the base of own simulation program.

SUMMARY OF THE INVENTION

However, integration of the simulation programs as described in (1) above is very costly in terms of time and effort even when a conventional single computer is concerned. The program for a parallel computer system is much more complicated than those for the conventional single machine, so application of this approach to the parallel computer system may become prohibitively difficult.

On the other hand, coupling the input and the output of the programs by way of a file as described in (2) above is made possible by establishing a standard format for such files. However, in a numerical simulation performed on a parallel computer system, solutions are often held in the PUs in a distributed manner. Storing the solutions in the file every time a simulation program under execution by each node is changed and then reallocating the stored solutions will reduce the simulation efficiency. Especially, when obtaining a convergence solution by repeatedly calling a plurality of simulation programs for example, the coupling of the input and output and the reallocation present a serious bottleneck.

Further, as described before, if the simulation programs A and B are executed separately without integrating them into one program, the computational result data of one program must be converted to the data defined on the base of the other program. This requires the user to rewrite the simulation program used separately so far such that the data conversion can be performed by use of the base information of both programs. This data conversion depends on combinations of the types of the simulations by the two simulation programs to be used for coupled simulation. For example, the combinations may be two of the simulation of finite differential method, the simulation by finite element method, and the particle-system simulation. Therefore, the program must be rewritten for each of the other simulation programs to be used for coupled simulation. This problem of the data conversion occurs regardless whether the simulation programs are executed on one computer or on a plurality of computers.

Another problem that is encountered when a plurality of simulation programs are executed without being integrated into one program is a speed at which data are exchanged between the programs. To increase the speed of data exchange, it is desired that these programs be executed on a plurality of computers in parallel, and the data generated by one simulation program be passed to the other simulation programs by way of communication.

A communications library such as PVM for use in parallel computer system has been useful in describing messages transfer between the PUs in a parallel program easily and with good portability. However, such a communications library is not so sophisticated enough to support a complicated program for coupled simulation. Consequently, even assisted by the communications library, the user still must create programs for coupled simulation with much more time and effort than those for conventional computers.

That is, when executing a plurality of simulation programs on a plurality of computers as simulation processes, a send request or a receive request must be described in the simulation process executed to each other simulation process executed on the other PUs, even if the PVM is used. These communication requests need to specify the process ID specified for each destination process and the message ID specified by the user. Therefore, as the number of destination processes increases, the number of communication requests to be described in the simulation process increases, thereby increasing user's burden. And, since the destination processes differ depending on the region to be simulated, the physical equation governing the physical quantity to be calculated, and the simulation technique used, the user needs to rewrite the program for each simulation to be performed.

This problem of specifying communication destination processes is extremely difficult to overcome when executing each of a plurality of simulation programs by a plurality of simulation processes in cooperation with each other on a parallel computer system. To be more specific, the user must determine which of the simulation processes of the simulation program A exchanges data with which of the simulation processes of the simulation program B. Generally, it is required to determine a desired destination process by detecting an overlap of a partial simulation region of each simulation process of one simulation program and a partial simulation region of a particular simulation process in the other simulation program. This overlap, however, depends on the mutual positional relationship between the regions to be simulated by the simulation programs A and B. This significantly increases the time and effort for rewriting the program to determine the communication destinations.

Another problem that is encountered when executing a plurality of simulation programs on different computers is the security of computational result data obtained from execution of simulation programs on processors interconnected by an open network.

Still another problem that is encountered when executing a plurality of simulation programs on different computers by loading the plurality of simulation programs in the plurality of processors is selection of the computers in which the programs are loaded in order to enhance the program execution efficiency.

It will be apparent that the above-mentioned problems are encountered not only when modifying existing simulation programs to execute a coupled simulation but also when newly creating a plurality of simulation programs for executing a coupled simulation.

It is therefore an object of the present invention to provide a method of assisting execution of a plurality of simulation programs which enables concurrent execution thereof without much modifying the programs as compared with the case in which they are executed separately.

A more specific object of the present invention is to provide a method of assisting execution of a plurality of simulation programs which enables concurrent execution thereof on different computers even if each of the programs has no data conversion procedure for compensating the difference between the bases of the programs.

Another more specific object of the present invention is to provide a method of assisting execution of plural simulation programs which does not require separate designation of the destination simulation processes to which data resulted from the execution of each simulation process is to be transmitted, when executing the simulation programs on plural computers as plural processes.

It is a different object of the present invention to provide a method of maintaining security for the data resulted from simulation, suitable for the case in which a plurality of simulation programs are executed on a plurality of processes interconnected by an open network.

It is a still different object of the present invention to provide a method of program loading for enhancing the program execution efficiency when loading a plurality of simulation programs in a plurality of processors.

In a preferred mode of operation of the method of assisting execution of simulation programs according to the present invention, an interprogram data communication assist program (or process) is activated for a plurality of simulation programs (or processes). The data conversion program (or process) converts data produced by one of the plurality of simulation programs (or processes) to data for at least another of the plurality of simulation programs (or processes) that uses the data and defined on the base of that another program (or a process). The assist program (or process) transfers the data obtained by the converting to the other simulation program (or process).

The assist program (or process) receives base information related to a base used by each simulation program (or process) therefrom beforehand. It judges a positional relationship between the base of each simulation program (or process) and the base of other simulation program (or process), based on the base information received from them. The above-mentioned data conversion step is executed depending on the judged positional relationship between the base of the one simulation program (or process) and the base of that other simulation program (or process).

In another preferred mode of operation of the method of assisting execution of simulation programs according to the present invention, the assist program (or process) detects a destination program (or process) which will use operation result data which will be produced by one of the simulation programs (or processes). When operation result data has been produced by the one simulation program (or process), the assist program (or process) transfers the data to the destination program (or process), without receiving designation of the destination program (or process) from the one simulation program (or process). The detecting is done based upon base information which the assist program (or process) receives from each simulation program (or process) and relates to a base which each simulation program (or process) uses.

Further, in the present invention, for security of simulation resultant data, the operation result data produced by one of a plurality of simulation processes are encrypted by one data conversion process provided in correspondence to the one simulation process. The encrypted data is transferred to another data conversion process provided in correspondence to another simulation process. The encrypted data are decrypted by the another data conversion process, and the decrypted data are transferred to that another simulation process.

Still further, in the present invention, in order to enhance the efficiency of executing simulation programs on processors, the processors into which the simulation programs are to be loaded are selected based on quantities of various resources consumed by the simulation programs and based on quantities of resources held by the processors.

The above and other objects, features and advantages of the present invention will become more apparent from the accompanying drawings, in which like reference numerals are used to identify the same or similar parts in several views.

BRIEF DESCRIPTION OF THE DRAWINGS

FIG. 12 is a flowchart of base information storage processing of FIG. 11;

FIG. 13 is a flowchart of fem data read processing of FIG. 12;

FIG. 14 is a flowchart describing communication destination determining processing of FIG. 11;

FIG. 32A is a diagram illustrating resource quantities of PUs;

FIG. 32B is a diagram illustrating a network resource quantities;

FIG. 32C is a diagram illustrating a constitution of the program resource database;

FIG. 33 is a diagram illustrating a constitution of a time-series usage status database for use in the system of FIG. 30;

FIG. 34A is a diagram illustrating examples of numeric values of resource quantities of various resources held by processor units of the system of FIG. 30;

FIG. 34B is a diagram illustrating an example of numerical values of network resource quantities held by processor units of the system of FIG. 30;

FIG. 34C is a diagram illustrating examples of resource quantities and numerical values thereof requested by a plurality of simulation programs to be loaded in the system of FIG. 30;

FIG. 36 is a diagram illustrating an example of numerical values of usage status at the program loading, held by the processor units of FIG. 30;

FIG. 37 is a diagram illustrating an example of numerical values of resource quantities at program loading, held by the processor units of the system of FIG. 30;

FIG. 38 is a flowchart of program allocation priority determining processing of FIG. 35;

FIG. 39A is a diagram illustrating a structure of an allocation queue for use by the processing of FIG. 38;

FIG. 39B is a diagram illustrating the allocation priority determined by the processing of FIG. 38;

FIG. 41 is a diagram illustrating an example of computer resource quantities after one element program is allocated to the processor unit in the system of FIG. 30; and FIG. 42 is a diagram illustrating a result of the processor allocation determined by the third embodiment of the present invention.

DETAILED DESCRIPTION OF EMBODIMENTS

Figure 1:
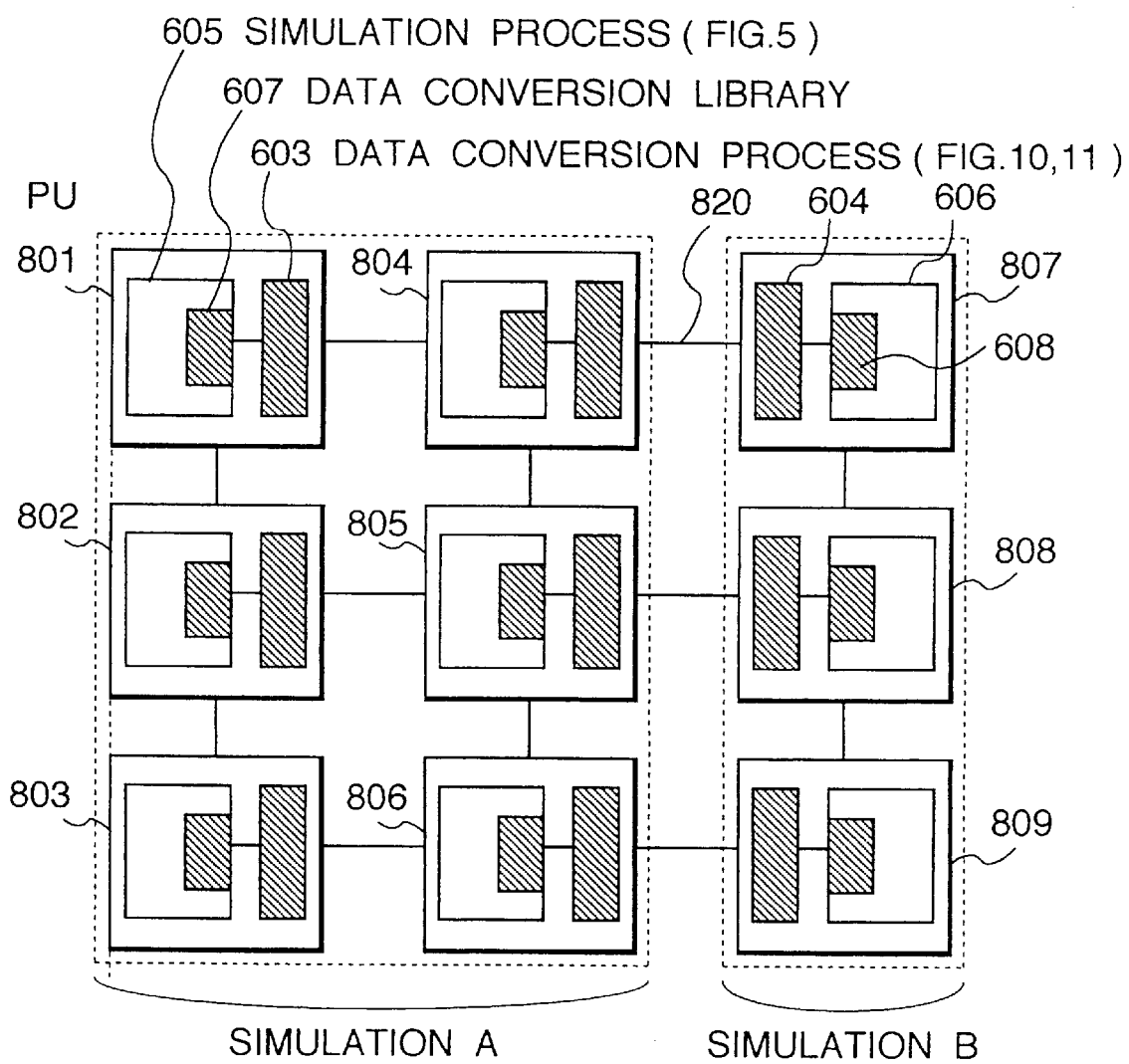
FIG. 1 is an overall block diagram illustrating a parallel computer system loaded with a plurality of simulation programs to which the method of assisting simulation program execution of the present invention is applied.

The present invention will be described in further detail by way of several embodiments with reference to the accompanying drawings. It should be noted that, in the following description, the same reference numerals denote the same or similar elements. It should also be noted that the second and subsequent embodiments will be described mainly in the differences from the first embodiment.

The first embodiment (1) Overview of the apparatus and operations

Figure 2:
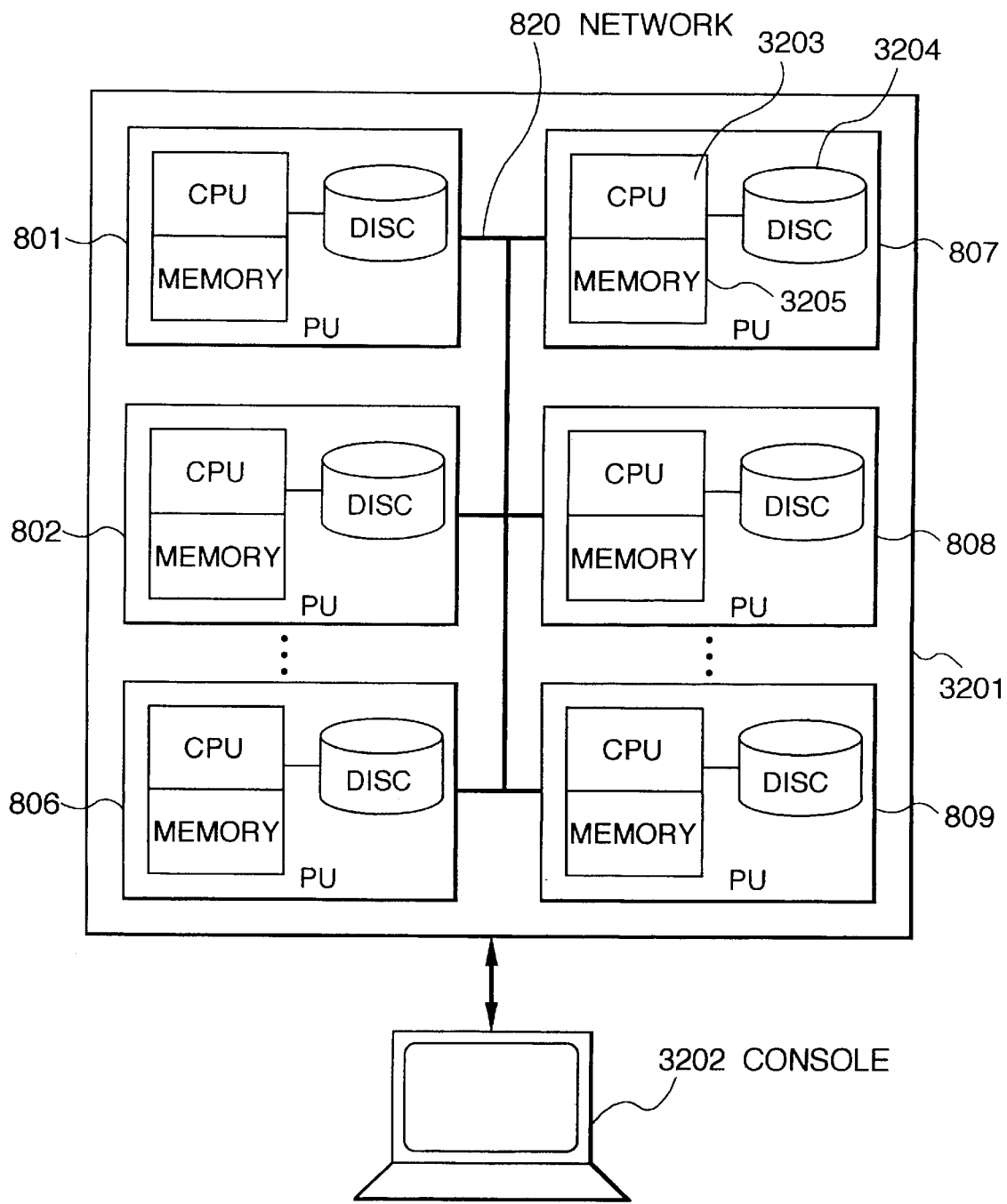
FIG. 2 is a block diagram of a parallel computer system for executing the simulation programs to which the present invention is applied.

A simulation program according to the present invention is executed on a parallel computer system 3201 as shown in FIG. 2 for example. The parallel computer system 3201 is composed of a plurality of processing units (PUs) 801 through 809 and a network 820 interconnecting the PUs. The parallel computer system can have any number of PUs. In this example, nine PUs are used. In the figure, the network 82 is depicted in a grid manner; however, the network can take any topology if communication between two PUs is assured as long as the present embodiment is concerned. However, it is desirable from the viewpoint of simulation execution time that the network 820 be a high-speed network that allows parallel transfer of a plurality of messages such as the hyper crossbar network. Each of the PUs mainly has a CPU (Central Processing Unit) 3203, a memory 3205, and a disk 3204, thereby constituting the parallel computer system of distributed memory type. The parallel computer system 3201 is externally attached with a console 3202 at which commands and the like are entered in the parallel computer system.

A simulation process of the user and a data conversion process and data conversion library characteristic to the present embodiment are stored in the disk 3204. These software components are loaded when a command is entered by the user at the console into the memory of each PU for execution by each CPU.

Referring to FIG. 1, there are shown, by way of example, programs to be executed by the present embodiment. In the present embodiment, it is assumed that two simulation programs A and B be executed to execute simulations A and B in a coupled manner. The simulations A and B are finite differential simulation and finite element simulation for example. Each of the simulation programs A and B is executed as a plurality of simulation processes. For example, the simulation program A is executed as six simulation processes A (605) loaded in the PU 801 through PU 806, while the simulation program B is executed as three simulation processes A (606) loaded in the PU 807 through PU 809. Each PU is loaded with a data conversion process 603 or 604 characteristic to the present embodiment in correspondence with the simulation process A or B loaded in that PU in order to assist in data exchange between these simulation processes. The simulation process A or B is created by the user from the simulation program A or B through compilation and linking. At the time of linking, the simulation process is linked with the data conversion library 607 or 608 into an executable form. At the time of execution, the executable process is loaded in a PU for execution. These data conversion libraries relay data or requests to be passed between the simulation process linked to the library and the data conversion process corresponding to that simulation process.

The data conversion process and the data conversion library for use as mentioned above are prepared on a storage medium such as a magnetic disc device or a magnetic tape as the following files: the data conversion process of an execute form, an archive file (one already compiled and of a form to be linked to a simulation program) and a header file for the data conversion library (one including accumulation of declaration of types of variables and definition of constants used in the library). These files are copied to the disc 3204 mentioned above.

Also, at the time of execution, the data conversion processes 603 and 604 are activated in advance (as demons, for example). When the simulation process 605 or 606 of each PU gets started for execution, the data conversion library 607 or 608 links the simulation process 605 or 606 with the data conversion process 603 or 604 through a software communication path. Further, the two data conversion processes 603 and 604 are coupled with each other through a software communication path. The two simulation processes 605 and 606 belonging to the different simulation programs transfer data with the data conversion libraries 607 and 608 by way of the data conversion processes 603 and 604.

It should be noted that the above-mentioned communication by way of the data conversion processes is performed for data transfer between the simulation processes belonging to the different simulation programs. Data exchanged between the simulation processes belonging to the same simulation program A (or B) is performed by use of the PVM (Parallel Virtual Machine) or the like as with the prior-art technology. In the present embodiment, the description of the structure and operation of the program portion associated with that data exchange will be omitted.

The data conversion processes 603 and 604 provide a capability of automatically determining a data destination and converting data at the time of data communication between the simulation processes 605 and 606. The data conversion herein denotes an operation in which data calculated by one simulation program and defined on the base of that simulation program are converted to data defined on the base of the other simulation program. For example, a solution obtained on the base of finite element method is mapped one defined on the base of finite differential method. To do so, information about the base to be used by each simulation process 605 or 606 is entered in the corresponding data conversion process 603 or 604 in advance, which will be described in detail later on. Each data conversion process 603 or 604 incorporates a plurality of conversion rules for combinations of different simulation bases. At initialization of each data conversion process, the simulation process 605 of the PU 801 through PU 806 and the simulation process 606 of the PU 807 through PU 809 communicate base-related information with each other. They determine which of the incorporated conversion rules is to be used for later exchange of data between the simulation process 605 on each of the PUs 801–806 and the simulation process 606 on each of the PUs 807–809. This conversion rule is determined for a pair of a sending simulation process and a receiving simulation process. In the present embodiment, the data conversion process that receives the data applies the conversion rule to the received data for data conversion. To be specific, when the data conversion process 603 (or 604) on a PU receives from the corresponding simulation process 605 (or 606) on the sending side, operation resultant data defined on the base of that simulation process, the data conversion process transfers the received data to the data conversion process 604 (or 603) corresponding to the simulation process 606 (or 605) on the receiving side. The data conversion process 604 (or 603) converts the transferred operation resultant data to the data defined on the base of the receiving simulation process 606 (or 605) by the conversion rule determined above for the data transferred from the simulation process 605 to the simulation process 606. The result of the conversion is sent to the receiving simulation process 606 (or 605). Since this data conversion capability is incorporated in each data conversion process, no program portion for the data conversion need be incorporated in each simulation process. And, since the data conversion process has the plurality of conversion rules, the above-mentioned conversion is applicable to any combinations of different simulation programs without change.

Figure 3A:
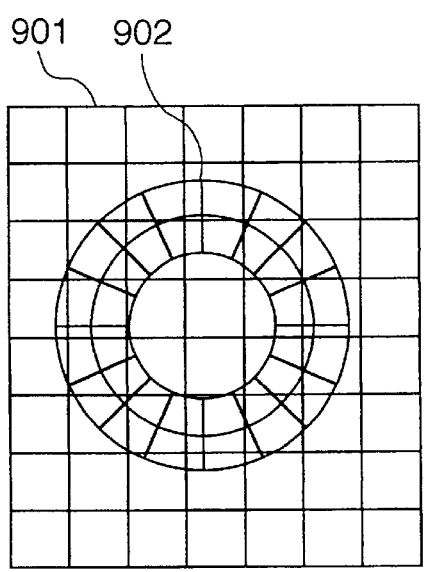
FIG. 3A is a diagram illustrating examples of a rectangular grid and a non-rectangular grid used by two simulation programs.

Determination of a communication destination by the data conversion process 851 is outlined as follows. FIG. 3A shows an example of the bases to be used by the simulation programs based on finite element method and finite differential method which are executed concurrently. A grid-like mesh 901 is the base for the finite differential simulation program, while a circular mesh 902 is the base for the finite element simulation program. A coupled simulation is made possible by alternately solving problems while exchanging data for the overlapped region by use of these plural bases.

Such a coupled simulation is especially effective for analyzing an air flow around an obstacle for example. Solving the region having turbulence in air flow in the vicinity of an obstacle by the finite element method has high shape adaptability. Solving the wide region away from the obstacle by the finite differential method has a high processing speed. Execution of these solving will provide high simulation accuracy, while decreasing the amount of the computation necessary for the simulation. When executing these two types of simulations on the parallel computer system, the bases of these simulations are spatially divided and allocated to the PUs. This spatial division is determined by the user in the simulation programs or in the data to be given to the simulation programs before simulation.

Figure 3B:
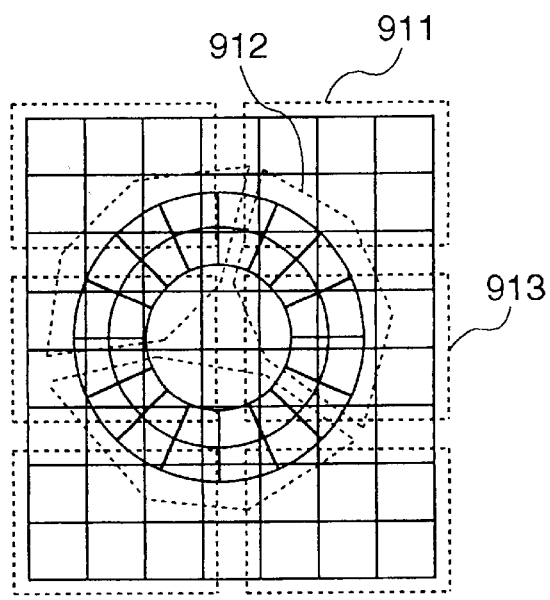
FIG. 3B is a diagram illustrating a plurality of partial regions obtained by dividing the region of FIG. 3A into the partial regions for use by the two simulation programs.

In the example of the parallel computer system of FIG. 1, the simulation process based on the finite differential method is executed by each of six PUs while the simulation process based on the finite element method is executed by each of three PUs. Each of the bases is spatially divided into the portions indicated by dotted lines as shown in FIG. 3B for example. In what follows, it is assumed for the purpose of description that a region 911 be allocated to the PU 804 of FIG. 1, a region 912 to the PU 807, and a region 913 to the PU 805. To register a base from a simulation process into the data conversion process, the portion dealt with by the process concerned may only be registered among the spatially divided base portions. Accepting the registration, the data conversion process 603 or 604 on each PU exchanges information about the base with the data conversion process 604 or 603 belonging to the simulation program different from the simulation program to which the process 603 or 604 belongs. It searches for data conversion processes to communicate with. Information related to base is generally referred to herein as base information. In the present embodiment, for specific base information, base coordinates range information and base constituting grid point information are exchanged between the data conversion processes, which will be described later in detail. It should be noted that these two specific pieces of information related to base may also be referred to as base information. Now, in the present embodiment, the data conversion process 604 on the PU 807 in charge of the region 912 inquires the data conversion process on the PUs 801 through 806 on which the other simulation process is being executed as to whether the region to be calculated by that other simulation process is overlapping the region of own process. Consequently, the data conversion process 604 receives an acknowledgment from the data conversion processes 603 on the PUs 804 and 805 in charge of the regions 911 and 913 respectively to recognize the data conversion processes thereof as the destinations of communication from now on. Thus, the overlapping between the simulation region of each simulation process and the simulation region of another simulation process is determined by the data conversion process corresponding to each simulation process in cooperation with another data conversion process. Based on the result of the determination, each data conversion process determines a simulation process to which the resultant data calculated by the simulation process corresponding to each data conversion process is to be transmitted. Therefore, each simulation process need not include the program portion for determining the destination simulation processes. Namely, each simulation process may only include a send request which specifies a destination simulation program.

In FIG. 1, only one simulation process is allocated to each PU. It will be apparent that a plurality of simulation processes may also be allocated to each PU. For example, when the simulations A and B are executed alternately, a pair of the simulation process A and a data conversion process for that process A and another pair of the simulation process B and a data conversion process for that process B may be loaded on one PU for an enhanced PU usage ratio. This change of process mapping to the PUs can be easily implemented by use of a program loading capability of the operating system (OS) of the parallel computer system or by user's writing a simple shell script (that is, a file which lists commands).

(2) Overall Processing Plow

Figure 4:
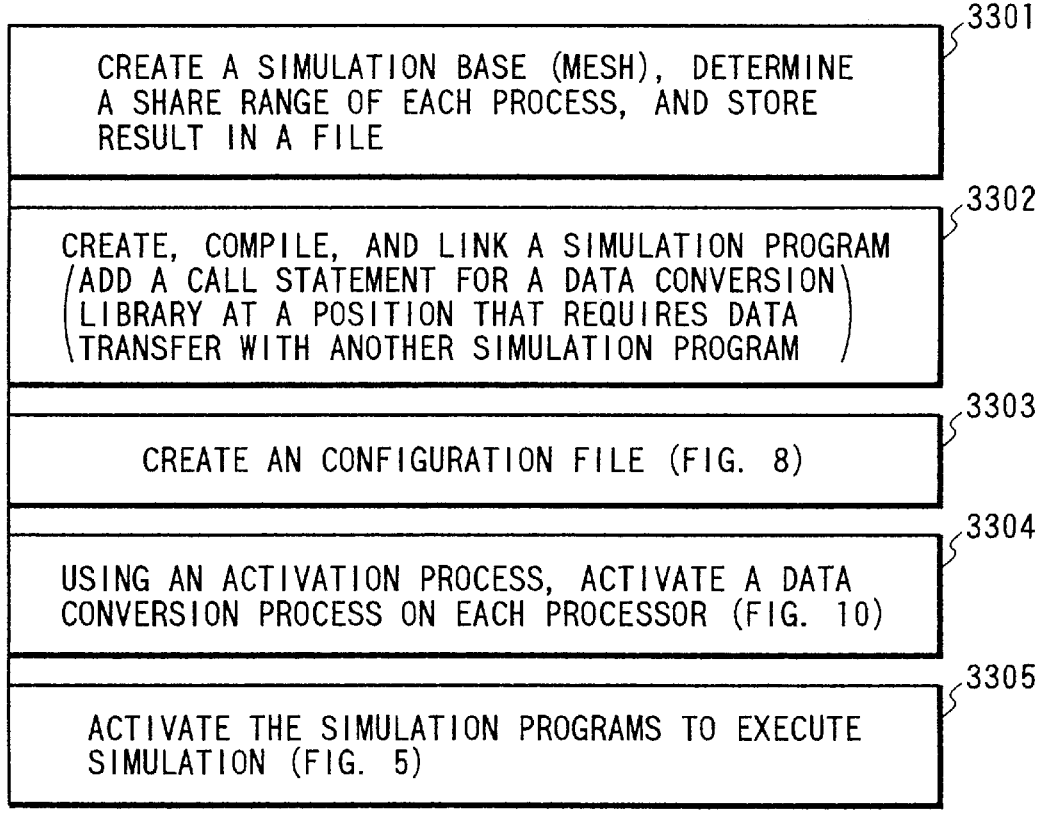
FIG. 4 is an overall flowchart describing the processing in the system of FIG. 1.

Referring to FIG. 4, there is shown a flow of the processing to be performed by the user in operating the system of FIG. 1. First, the user generates a base (or mesh) in a simulation target region of each simulation program and determines a partial region within the simulation region to be allocated to each parallel process (step 3301). Then, the user generates a plurality of simulation programs for use in the system of FIG. 1. In each simulation program, a call statement for a data conversion library is inserted in a portion where data transfer with another simulation program is required. The resultant simulation program is compiled, the complied program is linked with the data conversion library and as a result a file of an execute form is generated (step 3302). Next, the user creates a configuration file for specifying on which processor the data conversion process is to be activated (step 3303) and activates the data conversion process by use of the created activation process (step 3304). Steps 3303 and 3304 may be performed by the system administrator in advance instead of the user. Lastly, the simulation program created in step 3302 is activated to execute simulation, a result is obtained (step 3305). In what follows, the above-mentioned operations will be described in detail.

(3) Structure of Simulation Programs

Because the simulation program A or B is written as one of a so-called SPMD type in which the same program is executed on all PUs, the user may only create the simulation programs A and B. In each program, the user inserts a call statement for function-calling a data conversion library at a portion where data transfer with the other program is required.

Figure 5:
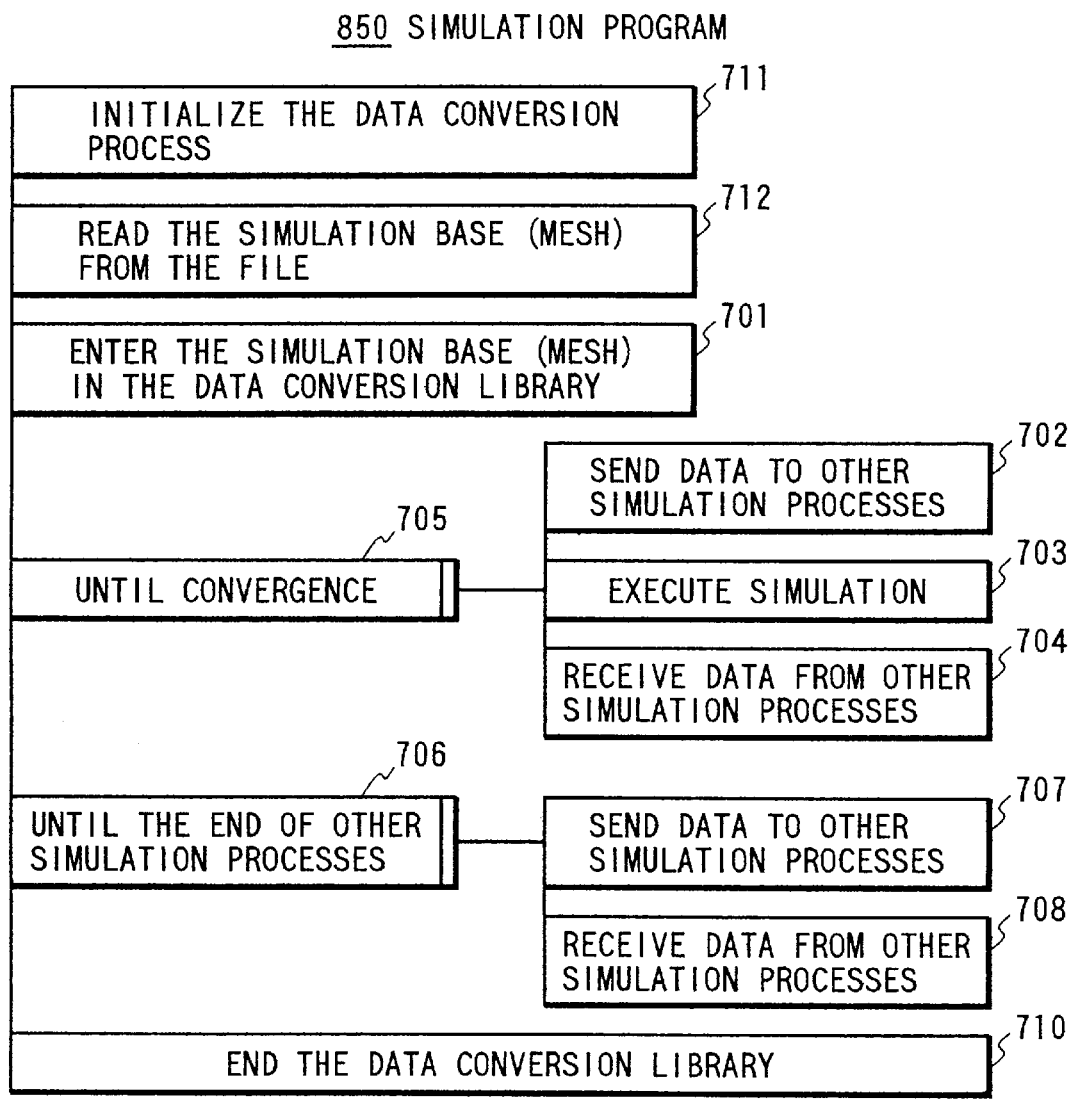
FIG. 5 is a flowchart of the simulation program used in the apparatus of FIG. 1.

FIG. 5 shows an outline of the simulation program written by the user in order to use the present embodiment. First, at the beginning of the simulation program, a call statement is issued for initializing the data conversion process (step 711). Then, the simulation base (or mesh) created beforehand is read from the file (step 712). In some applications, the simulation base may be created internally, rather than being read from the file. Next, a call statement is inserted for registering the simulation base read from the file (or created internally) into the data conversion process (step 701). The simulation base to be registered is determined before simulation by the user in the program or the data to be read from the program.

If the simulation program is constituted in such a way that the simulation base is changed during computation, for example, if a moving mesh which is a mesh whose position changes in time is used, the simulation program is constituted such that the call statement is repeatedly called every time meshes are changed. Thus, if meshes are changed during execution of the simulation program, destinations of computation defect data of that simulation program may change. In the present embodiment, however, the data conversion process determines a new destination every time mesh change occurs, thereby making it unnecessary for the simulation program to have a special program portion other than the portion for these three calls.

Next, the main portion of the simulation is described. In coupled simulation, this portion provides an iterative loop (step 705). In the loop, a result of the previous computation (or an initial value for the first iteration) is sent to the other simulation processes (step 702), the main simulation portion of the own process is executed in the conventional method (step 703), and results of execution of other simulation processes are received (step 704). The data transfer in step 702 or 704 is performed by a call statement to the data conversion library. These operations are repeated until a solution is converged to obtain a final result. However, if the computation is completed before the other simulation process comes to an end, a deadlock will occur, so dummy transfer is repeated until all simulation processes come to an end (steps 706, 707, 708). Upon completion of the simulation, the data conversion library is ended (step 710).

(4) Data Conversion Libraries

The data conversion libraries 607 and 608 relay data and requests between the simulation processes to which these libraries are linked and the corresponding data conversion processes. The data conversion libraries are provided to enable the data conversion processes to be used from the simulation processes. That is, the simulation process calls a function in the data conversion library and the data conversion library sends a message corresponding to the called function to the data conversion process. Likewise, the data conversion library sends the message from the corresponding data conversion process to the simulation process. In what follows, an argument and a return value required when the library user calls a function provided by the library from own program will be explained. In the following example, a C program language is assumed; it will be apparent that generally the same interface is applicable to another procedural language such as FORTRAN. The names of functions used below are examples; therefore the user can name the functions as long as the names do not overlap with those conventionally used. A type name preceding each function name indicates a type of a return value. To be specific, "void" indicates that there is no return value. It should be noted that "char" preceding each argument indicates a character argument, "int" indicates an integer argument, and "double" indicates a double-precision real argument. An asterisk "*" denotes that a variable attached therewith is of pointer type.

(a) void dex_initialize (char*simname)

This function initializes a data conversion library and a data conversion process. The user calls this function once at the beginning of each parallel program. If this function is called twice or more, an uncertain result will occur.

(b) void dex_register_quantum (char*meshtype, int*meshcount, int*meshno, double*meshdata, int*meshtopol, int*range)

Figure 6A:
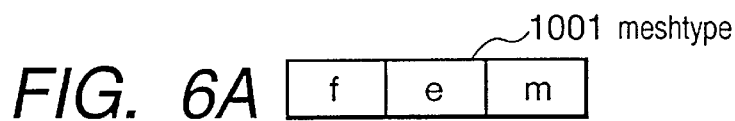
FIG. 6A is a diagram illustrating the argument (meshtype) of function call to the data conversion library.
Figure 6B:
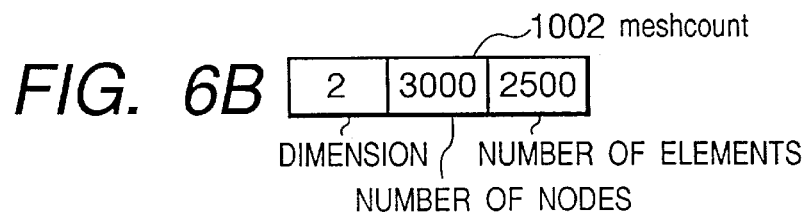
FIG. 6B is a diagram illustrating the argument (meshcount) of function call to the data conversion library.
Figure 6C:
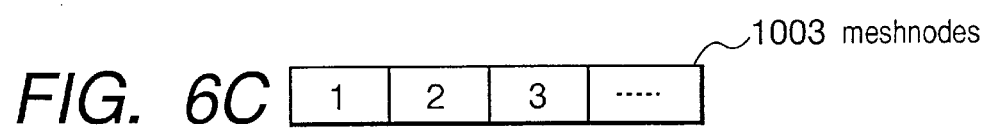
FIG. 6C is a diagram illustrating the argument (meshmodes) of function call to the data conversion library.
Figure 6D:
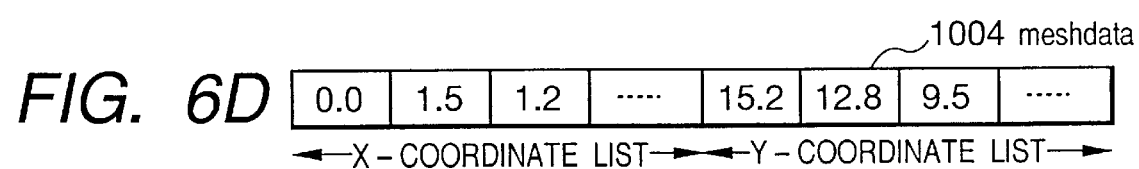
FIG. 6D is a diagram illustrating the argument (meshdata) of function call to the data conversion library.
Figure 6E:
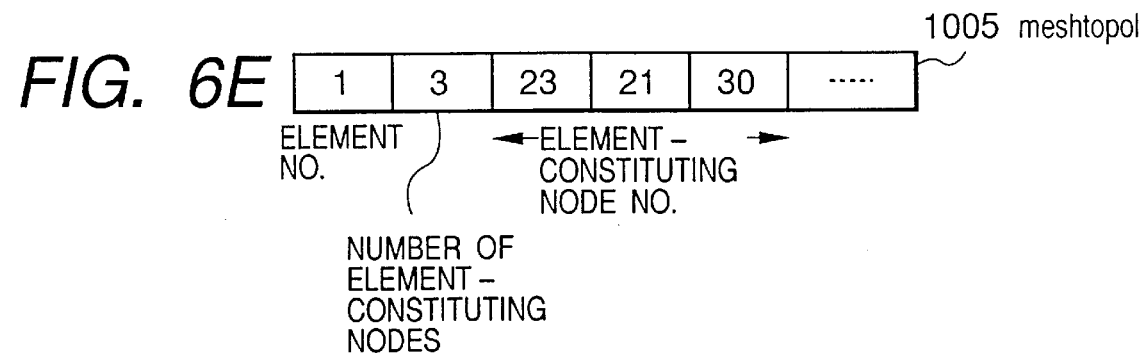
FIG. 6E is a diagram illustrating the argument (meshtopol) of function call to the data conversion library.

This function registers a simulation base in a data conversion process. The registration is made only once. To change the registered base with another, function "dex_unregister_quantum" which will be explained later on must be called to clear the registration. In what follows, the meanings of the arguments and a method of giving the same will be described.

meshtype: This argument denotes a type of the base. "fdm", "fem" or "particle" is given to this argument. "fem" denotes that the base is a finite element mesh, "fdm" denotes that the base is a finite differential mesh, and "particle" denotes that the base is particle. FIG. 6A shows an example of this argument in which the base "fem" is given to this argument.

meshcount: This argument specifies an array of information about the size of a base. In the first element of the array, 1, 2, or 3 indicating the dimension of the base is assigned. In the second element of the array, the number of grid points to be handled by the simulation process calling this function is assigned if the first argument is "fdm", the number of nodes to be handled by the simulation process calling this function is assigned if the first argument is "fem", or the number of particles to be handled by the simulation process calling this function is assigned if the first argument is "particle". In the following description, the grid points when the base is "fdm", the nodes when the base is "fem", and the particles when the base is "particle" are generically called grid points for simplicity. The third element of the array is significant only when the first argument is "fem", and the number of elements to be handled by the simulation process calling this function is assigned in the third element. FIG. 6B shows an example in which the first argument is "fem".

meshnodes: This argument specifies a list of the numbers of grid points to be handled by the simulation process calling this function. FIG. 6C shows an example of this argument.

meshdata: This argument specifies an array of data indicating the coordinates of the base. A list of x-coordinate of, a list of y-coordinates of, and a list of z-coordinates list of the grid points to be handled by the simulation process calling this function are assigned in this argument in this order. If the dimension of the base is 1 or 2, the y and z coordinates or the z coordinates are not required respectively. FIG. 6D shows an example of this argument. meshtopol: This argument specifies an array of a topological order of all elements of the base when the first argument is "fem". The topological order defines which node constitutes elements of each quadrilateral or trilateral in case of a two-dimensional base (or a tetrahedron, prism, or cube in case of three-dimensional base, a line in case of one-dimensional base) of the finite element method. To be more specific, this argument includes, for each element, a set of an element number, the number of nodes constituting the element, and a list of the numbers of the nodes. FIG. 6E shows an example of this argument when the first argument is "fem".

(c) void dex_unregister_quantum( )

This function clears the registration of a simulation base in a data conversion process. Subsequently, the function dex_register_quantum may be called again to register the canceled base again if required.

(d) void dex_send (double*data)

This function sends data to a simulation process in charge of a base which is spatially overlapping the base handled by own process. The data to be sent is the data resulted from the simulation in may cases. Otherwise, the data is the initial value of an array. The meaning of the argument is as follows.

data: This argument specifies an array of data to be sent. The number of pieces of data included in the array should be equal to the number of grid points (or the number of nodes or particles) of the registered base. This array holds the data about all registered grid points in the order of grid point numbers. It should be noted that, in this function call, the simulation program need not specify separately the simulation processes belonging to one or more simulation programs to which this data is to be sent. The data conversion process determines the destination simulation processes.

(e) void dex_receive (double*data)

This function receives data sent from other simulation processes. This function performs a blocking operation and no return is made from this function until necessary data have all come. The meaning of the argument is as follows.

data: This argument specifies an array of data to be received. The number of pieces of data to be received is equal to the total number of grid points (or nodes or particles) of the registered base, so it is necessary for the array to be of a size sufficient for storing the total number of grid points.

(f) void dex_exit (char*simname)

This function disconnects the communication path with the data conversion process.

Figure 7A:
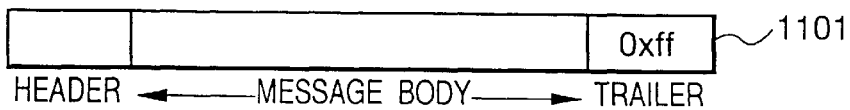
FIG. 7A is a diagram illustrating the basic structure of a message transferred between the data conversion process and the data conversion library.

In what follows, a method of implementing the data conversion libraries 607 and 608 will be described. These libraries are mainly intended for relaying information between a corresponding simulation process and a corresponding data conversion process. To be more specific, the data conversion library responds to a function call issued by the corresponding simulation process and sends the corresponding data conversion library a message corresponding to the function call. Most of the processing requested by the function call is performed by the corresponding data conversion process, which will be described later. The message transfer between the simulation process and the data conversion process is performed by use of a particular bit pattern (or a protocol). There is no limitation in implementing the protocol. In the present embodiment, however, the protocol is composed of a one-byte header, a succeeding message body having undefined length, and a further succeeding one-byte trailer indicating the end of this message. FIG. 7A shows a general form (10) of this protocol. Specific message generated by the data conversion library are the following.

(a) void dex_initialize(char*simname)

Figure 7B:
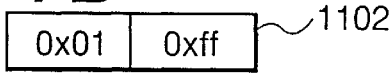
FIG. 7B is a diagram illustrating the structure of an initialization request message transferred between the data conversion process and the data conversion library.

This function establishes connection to a data conversion process and initializes the same. In the present embodiment, as means for transferring data between processes, communication by sockets (TCP/IP) is used. The procedure for establishing connection is based on the ordinary communication by socket. Namely, the data conversion process has been already activated at the activation of the simulation process as described above. This data process is in the state for waiting for connection by an accept system call at a preset port number. This library function issues a connect system call to that port number and establishes a software communication path. Then, using the established communication path, this function sends an initialization request message to initialize the data conversion process. FIG. 7B shows an example of this message 1102. This message has only a header and trailer for indicating an initialization request and therefore has no body.

(b) void dex_register_quantum(char*meshtype, int*meshcount, int*meshno, double*meshdata, int*meshtopol, int*range)

This function informs the data conversion process of a request for registering data about simulation base and sends base data thereto. One data registration request message is issued for each of the five arguments, totaling five messages. Examples of the messages 1103 to 1107 are shown in FIGS. 7C through 7G. As shown, each message is composed of one of the arguments of the present library functions shown in FIGS. 6A through 6E plus a header and a trailer.

(c) void dex_unregister_quantum( )

Figure 7C:
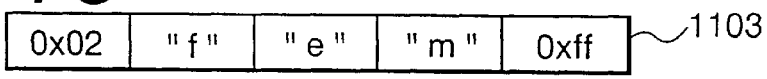
FIG. 7C is a diagram illustrating the structure of a data registration request message transferred between the data conversion process and the data conversion library.
Figure 7D:
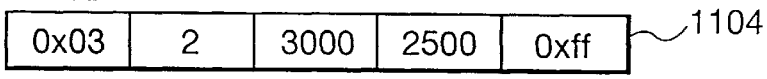
FIG. 7D is a diagram illustrating the structure of another data registration request message transferred between the data conversion process and the data conversion library.
Figure 7E:
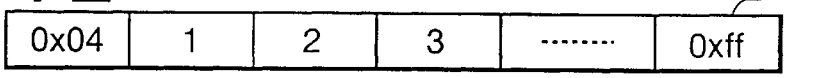
FIG. 7E is a diagram illustrating the structure of further another data registration request message transferred between the data conversion process and the data conversion library.
Figure 7F:
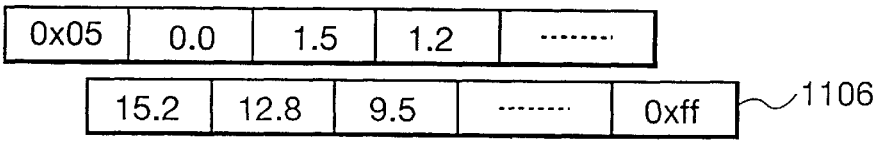
FIG. 7F is a diagram illustrating the structure of still further another data registration request message transferred between the data conversion process and the data conversion library.
Figure 7G:
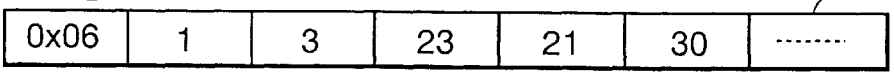
FIG. 7G is a diagram illustrating the structure of yet further another data registration request message transferred between the data conversion process and the data conversion library.
Figure 7H:
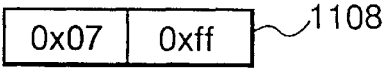
FIG. 7H is a diagram illustrating the structure of a registration cancel request message transferred between the data conversion process and the data conversion library.

This function sends a message for clearing the registration of the simulation base to the data conversion process. FIG. 7H shows an example of this message 1108. As shown the message is composed of a header and a trailer for indicating the clearing of registration and therefore has no body.

(d) void dex_send (double*data)

Figure 7I:
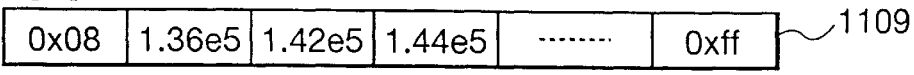
FIG. 7I is a diagram illustrating the basic structure of a data send request message transferred between the data conversion process and the data conversion library.

This function sends a data send request message to the data conversion process. FIG. 7I shows an example of this message 1109.

(e) void dex_receive (double*data)

Figure 7J:
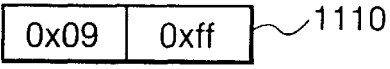
FIG. 7J is a diagram illustrating the structure of a data receive request message transferred between the data conversion process and the data conversion library.
Figure 7K:
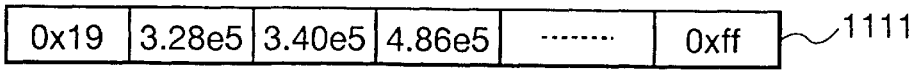
FIG. 7K is a diagram illustrating the structure of a data receive response message transferred between the data conversion process and the data conversion library.

This function sends a data receive request message to the data conversion process and stores data included in a data receive response message returned from the data conversion process into an array pointed by argument "data". FIG. 7J shows an example of the data receive request message 1110 and FIG. 7K shows an example of the data receive response message 1111.

(f) void dex_exit(char*simname)

Figure 7L:
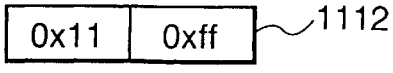
FIG. 7L is a diagram illustrating the structure of a disconnect request message transferred between the data conversion process and the data conversion library.

This function disconnects the communication path with the data conversion process. FIG. 7L shows an example of the message 1112.

(5) Activation of Data Conversion Processes

Figures 8, 9:
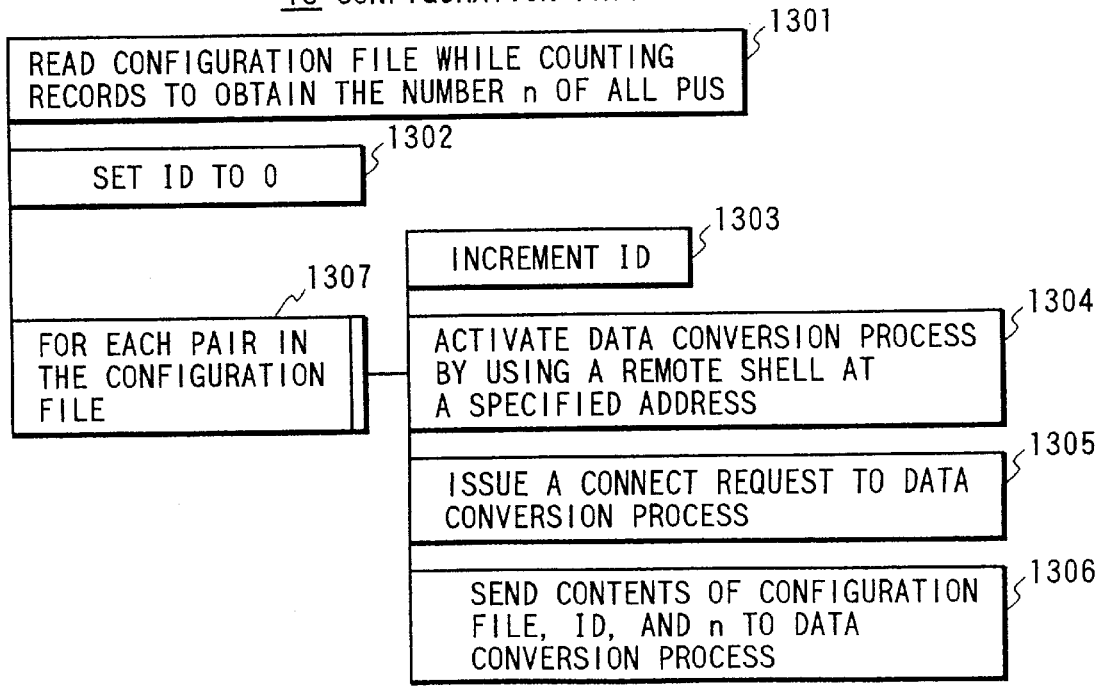
FIG. 8 shows an example of a configuration file.
FIG. 9 is a flowchart of an activation process.

The data conversion process 603 or 604 needs to be positioned in each PU of the parallel computer system at the time of activation as shown in FIG. 1 and all pairs of data conversion processes need to be interconnected by a software communication path. In the present embodiment, in order to meet these conditions, one process for activating the data conversion processes is set to one of the PUs, from which all data conversion processes are activated. This activation process is started by the user from the command line or is implemented so as to automatically start as a demon at activation of the parallel computer system. The activation process is set to a special PU for system control if the same is provided on the parallel computer system; if no such PU exists, the activation process is set to any of the PUs. In either case, a configuration file listing pairs of an address of a PUs to start the data conversion process therein and a path to a file execute form for the data conversion process is prepared beforehand on the activation PU. When started, the activation process reads this configuration file to perform processing. FIG. 8 shows an example of the configuration file 12. "133.144.20.21" and so on denote the addresses of the PUs. "/usr/local /bin/dataexd" and so on denote paths to files of execute form for the data conversion process stored on the disks. This example indicates that the data conversion process is activated on eight PUs. The first four differ from the last four in the path to the execute form file. The system operator or the user duplicates the execute form file beforehand on the specified path of each PU.

FIG. 9 shows a flow of the processing of the activation process 13. First, the configuration file is read to set the ID to 0 (steps 1301 and 1302). At this moment, records are counted to obtain the total number of PUs. This ID is used as the serial identification number of each data conversion process. Then, for each pair in the configuration file 12 (step 1307), the process ID is incremented (step 1303) to activate the data conversion process on the path in the pair in the PU having processor address in the pair by use of a remote shell or the like (step 1304). When activated, each data conversion process generates a socket for the activation process 12 and enters in the state for waiting for the accept system call at the predetermined port number (for example 3001). The activation process 13 establishes connection for this socket by the connect system call (step 1305). Then, by use of this communication path, the activation process notifies that data conversion process of the process ID and the total number of PUs and sends the addresses of all PUs in the configuration file 12 thereto (step 1306). As a result of this processing, the data conversion processes are activated on the PUs specified by the configuration file 12, each data conversion process having the process ID unique to the system and a copy of the addresses of all PUs for use in the simulation. Upon completion of its job, the data activation process is terminated.

Figure 10:
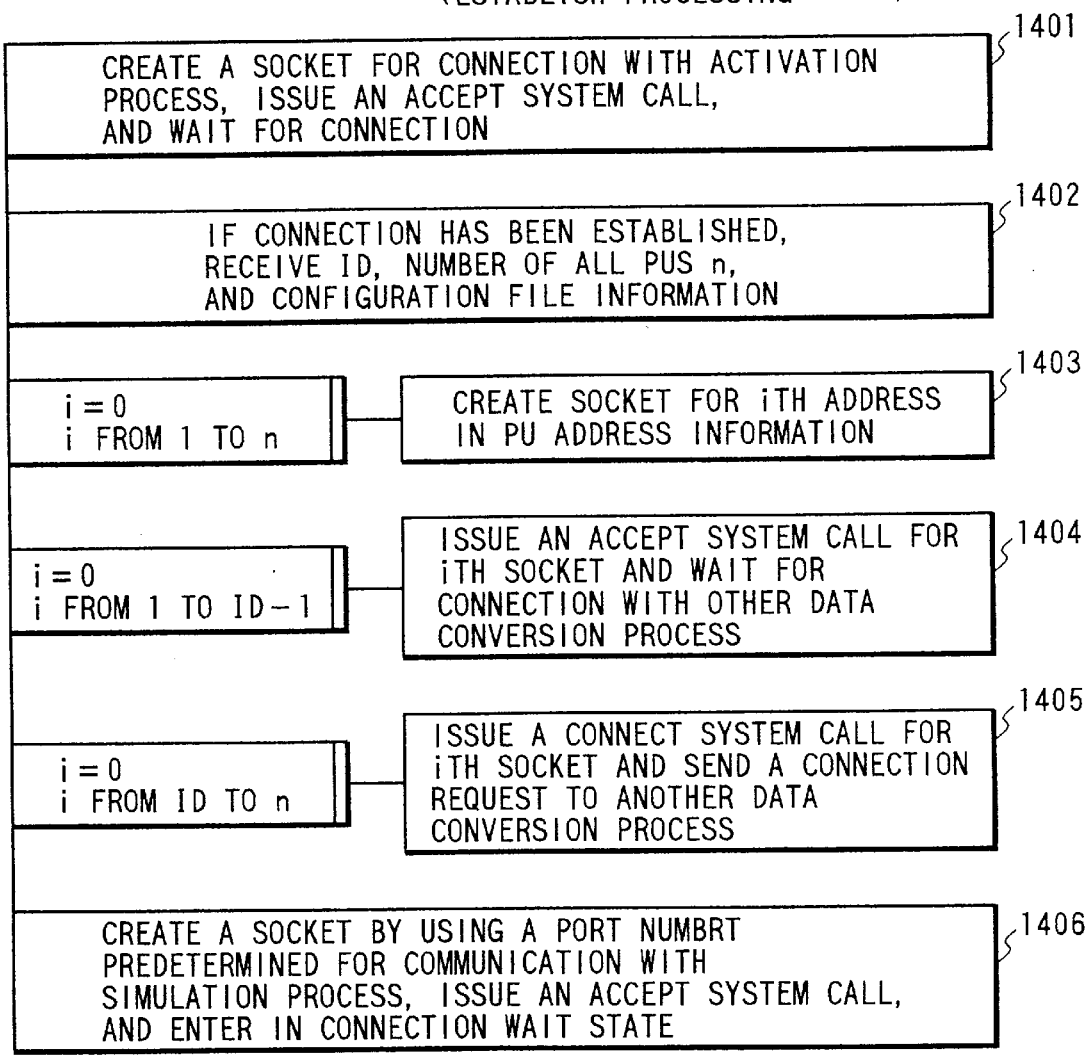
FIG. 10 is a flowchart of the communication path establishment processing in the data conversion process.

The following describes with reference to FIG. 10, a flow of the processing for the data conversion processes 603 and 604 to establish connection with each other. First, in correspondence to the above-mentioned processing by the activation process 13, each data conversion process generates a socket for receiving information from the activation process 13 and waits for connection (step 1401). When connection is established, each data conversion process receives the ID of own data conversion process, the total number of PUs, and the addresses of all PUs from the activation process 13 (step 1402). Then, the data conversion process generates a socket for mutual connection for each of all PU addresses (step 1403). Subsequently, a communication path is established by way of the socket between all pairs of different ones of the PUs. It is enough to establish the communication path by only one PU to the other in each pair because the path can be used for bilateral communication. So, if the ID of the other PU is lower than the ID of own PU, the own PU is set in a state of waiting for connection request from the other PU; otherwise, a connection request is issued from own PU to the other PU (steps 1404 and 1405). Further, in preparation for connection with the simulation process on own PU, the socket for communicating with that simulation process is generated by use of the predetermined port number and the accept system call is issued by way of that socket to set the connection wait state (step 1406). By the above-mentioned processing, the data conversion process 603 or 604 on each PU is activated, establishing the communication paths between the data conversion processes on all PUs. A communication path is also established in each PU between a simulation process 605 or 606 provided on the PU and a corresponding data conversion process 603 or 604 provided on the same PU. Thus, the preparation for the connection between the data conversion process 603 or 604 and any of the simulation processes 605 and 606 is complete.

(6) Operations of Data Conversion Processes

The following describes a flow of the processing of the data conversion processes with reference to FIG.

As described above, the data conversion library issues the connect system call to the preset port number in response to the dex_initialize library function call issued by the simulation program, so the accept system call of the data conversion process already activated catches the connect system call and establishes the communication path.

After the communication path has been established, the data conversion process 603 or 604 enters an event loop that is activated by a request message coming from the corresponding simulation process 605 or 606 by way of the corresponding data conversion library 607 or 608. Here and in the following description, the message sent by the data conversion library in response to a function call issued by the simulation process is sometimes referred to simply as a message coming from the simulation process by way of the library or as a message coming from the simulation process. The event loop is an infinite loop (step 1501), which is normally in the state for waiting for message reception (1502). Upon receiving the message, the processing branches according to the type of the message (step 1503). When branched processing comes to an end, the data conversion process returns to the message wait state. As shown in FIG. 7A, because the first one byte of the message coming from the corresponding simulation process provides the header indicating the type of that message, checking that byte allows the branching. Since there are six types of request messages coming from the corresponding simulation process, six branch destinations are prepared (steps 1504 through 1509).

The following describes the processing performed by the data conversion process upon receiving various request messages from a simulation process.

(a) Initialization Processing (step 1504)

Figure 24:
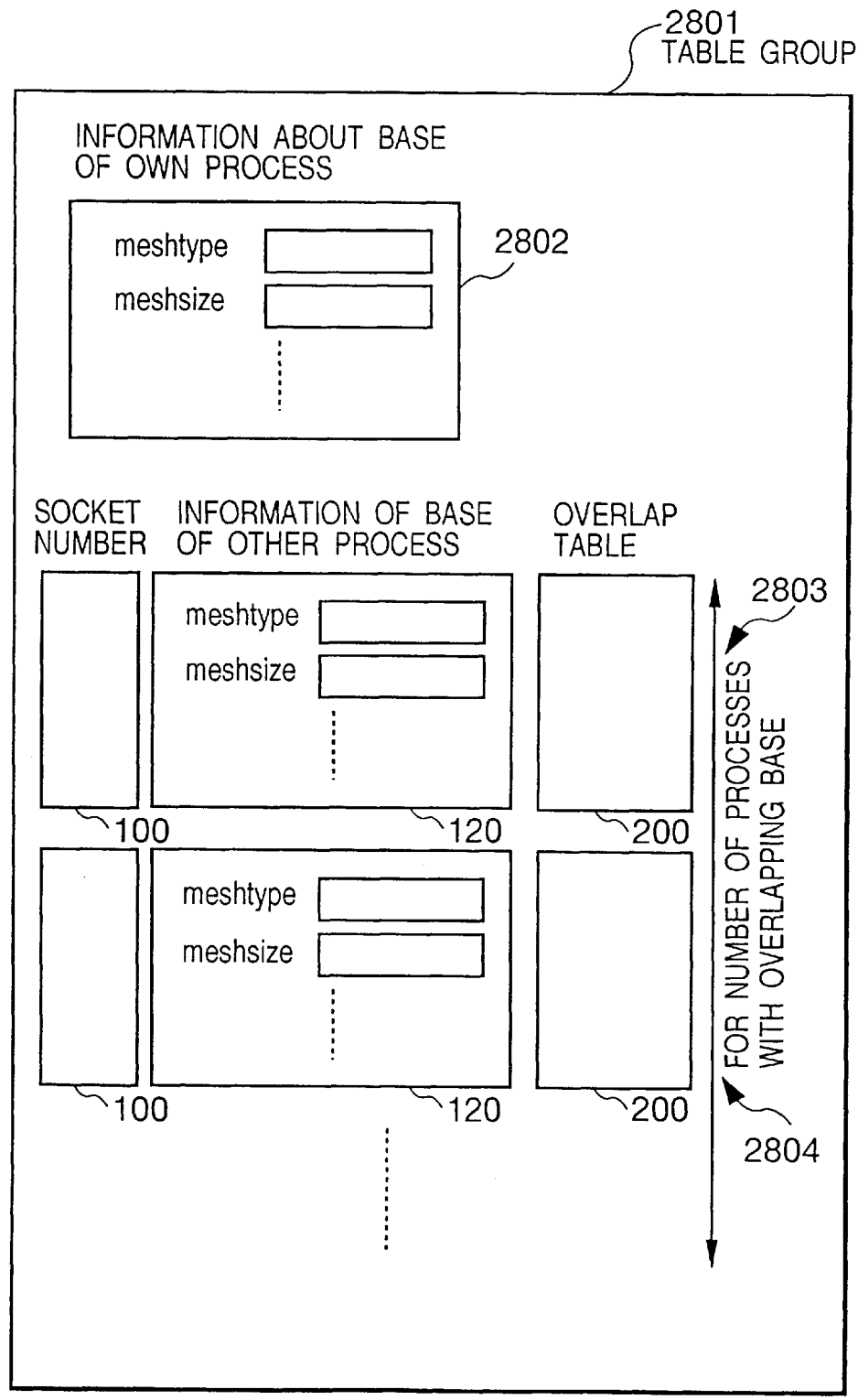
FIG. 24 is a diagram illustrating tables generated by the data conversion process.

Receiving an initialization request message 1102 from the corresponding simulation process, each data conversion process clears all internal tables (a table group 2801 of FIG. 24). In addition, each data conversion process stores a simulation name given by this request message 1102 into a variable.

(b) Base Registration Processing (step 1505)

Base registration processing comprises two portions. The first one is processing 1505A for storing the base information coming from the simulation process corresponding to the data conversion process. The second one is processing 1505B for searching for simulation processes having spatially overlapping bases with a base of the corresponding simulation process. This search is executed by matching the base information of the corresponding simulation process with that of each of the data conversion processes on other PUs, and determines the destination simulation process of communication for data send/receive operations.

First, the base information store processing 1505A will be described with reference to FIG. 12. The data conversion process reads one message from the corresponding simulation process (step 1601) to confirm that the message header is 0x02 (FIG. 7C). Depending on whether the remaining portion of the header is "fdm", "fem", or "particle", the process branches to the corresponding read processing (steps 1603 through 1605). FIG. 13 shows details of the read processing 1604. First, from the second message, the number of dimensions d, the number of nodes m and the number of elements e are obtained. Based on the results, an array having length m for storing node numbers, an array having length m for storing node coordinates, and an array for storing topological orders are captured by use of a memory allocation function such as malloc (steps 1703 through 1705). While reading the subsequent messages sequentially, the above-mentioned data are assigned into the allocated arrays (steps 1706 through 1711). This allows the copying of the necessary portion of the base information held by each simulation process into the corresponding data conversion process. This holds true with the "fdm" read processing (step 1603) and the "particle" read processing (step 1605) except that these processing operations have no processing 1705, 1710, and 1711 associated with topological order.

The following describes the processing for determining communication destinations 1505B with reference to FIG. 14. In this communication destination determining processing, each data conversion process checks for an overlap between the base to be handled by the simulation process corresponding to that data conversion process (this base may be hereinafter referred to as the base handled by the data conversion process for simplicity) and the bases handled by all other data conversion processes. As described with reference to FIG. 10, the i-th socket in the data conversion process is connected to the data conversion process of which ID is i (step 1403 of FIG. 10). In this communication destination determining processing, the base information about the base handled by each data conversion process is exchanged among all data conversion processes by use of this connection. Using the exchanged base information, each data conversion process determines data conversion processes to which the data generated by the simulation process corresponding to the data conversion process is to be sent. To be more specific, a data conversion process obtains a coordinate range of the base thereof as the information about the base to be handled by that data conversion process (step 1800). The coordinates range of the base denotes combinations of the maximum and minimum values in the coordinates of a grid point, a node, or a particle of the base. In the two dimensions, the coordinate range corresponds to a bounding box that encloses the range handled by the base. This coordinates range is used to determine the presence or absence of the overlap between the bases to be handled by two data conversion processes. In a loop 1801, paying attention to the i-th socket, the data conversion process sends its simulation name to the mate data conversion process connected to the socket and receives a simulation name of the mate data conversion process therefrom (steps 1811 and 1812). The data conversion process compares the sent simulation name with the received simulation name and, if they are found mismatching (step 1813), performs the following processing. The data conversion process sends the information about the abovementioned base coordinates range as the base information to the mate data conversion process connected to the socket and receives the base coordinates range information coming from the mate data conversion process (steps 1802 and 1803). The data conversion process compares the received base coordinates range with the base coordinates range of that data conversion process obtained in step 1800 to determine presence or absence of an overlap between the bases and notifies the mate data conversion process of the result of the determination. Then, the data conversion process receives the determination result obtained by the mate data conversion process from the same (step 1806). If the determination results coming from the mate data conversion process indicate the presence of the overlap, the data conversion process sends to the mate data conversion process, the information about grid points constituting the base (the base constituting grid point information) as the base information about the base of that data conversion process (step 1807). If the data conversion process notifies the mate data conversion process of the presence of the overlap, then the mate returns the base constituting grid point information. Receiving this information, the data conversion process stores this information and the number of the socket to which the mate is connected into the memory of the PU on which that data conversion process is being executed (step 1808). The base constituting grid point information transferred here is the same as the information shown in FIGS. 6A through 6E. And the base data read processing and the base data storage processing are the same as the processing shown in FIGS. 13 and 12. The abovementioned series of processing operations cause each data conversion process to have, if the overlap is found between the bases, two pieces of base constituting grid point information about the two bases of the own data conversion process and the mate data conversion process as the base information. Using these two pieces of information, the data conversion process generates a table that specifies the base overlap state in detail (step 1809). Details of this processing of step 1809 will be described later. FIG. 24 schematically shows a group of tables to be generated in the data conversion process at the final stage of this processing. These tables hold the information about the bases 2802 registered from the corresponding simulation process and to be handled by the same. They also holds the socket numbers 100 corresponding to the other data conversion processes having overlapped bases one to one, the base constituting grid point information 120, and the combinations of overlap tables 2803, 2804 and so on.

The data conversion process repeats the above-mentioned processing operations for each i and holds the tables that specify the overlap states for the other data conversion processes having bases overlapping the base of that data conversion processing.

Figure 15:
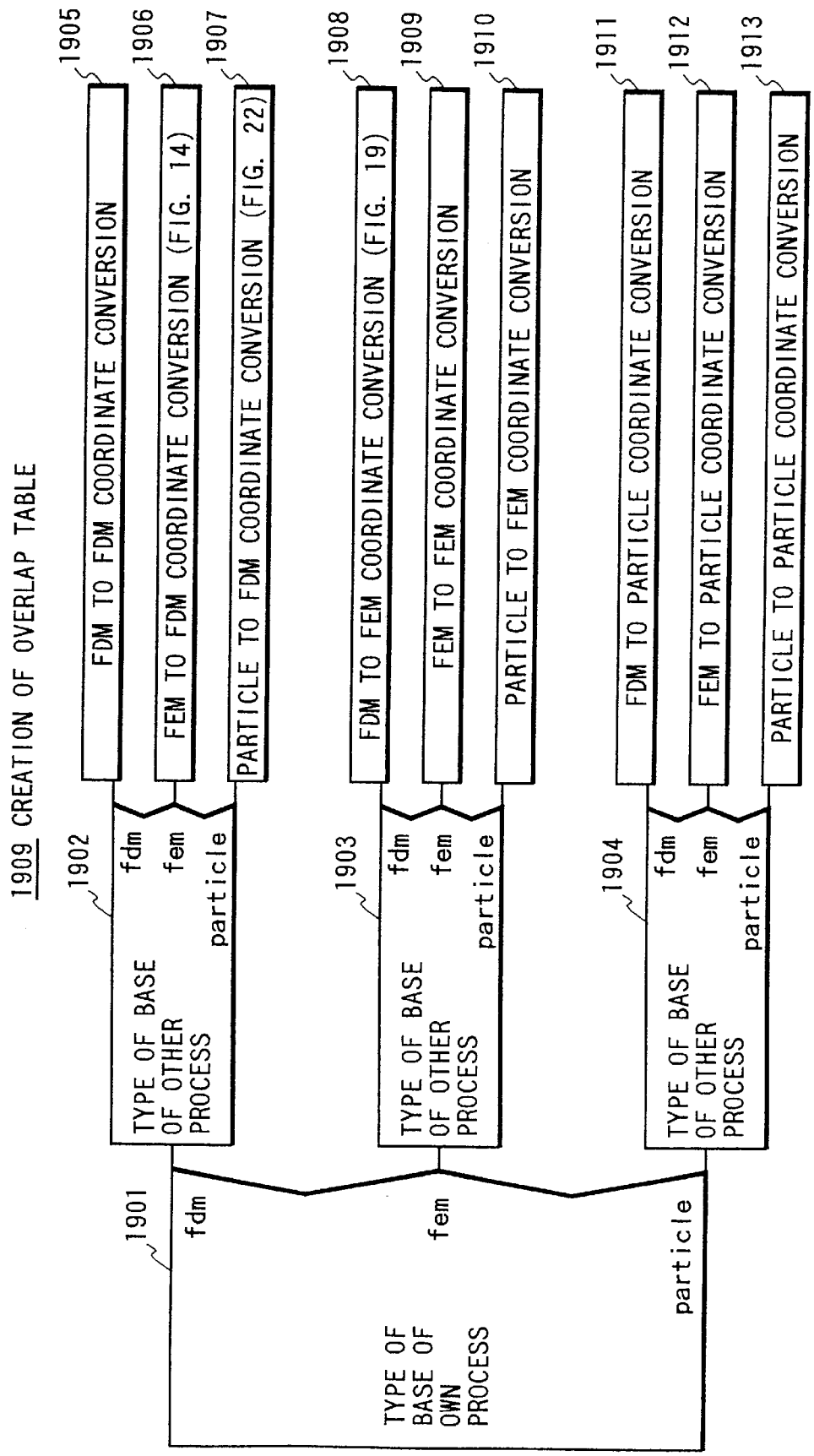
FIG. 15 is a flowchart of overlap table creation processing of FIG. 14.

The following describes details of the constitution and creation method of overlap tables. As shown in FIG. 15, nine coordinate conversion processing operations 1905 through 1913 are prepared from combinations of the types of bases registered in one data conversion process and the types of bases received from its mate data conversion process.

Figure 16:
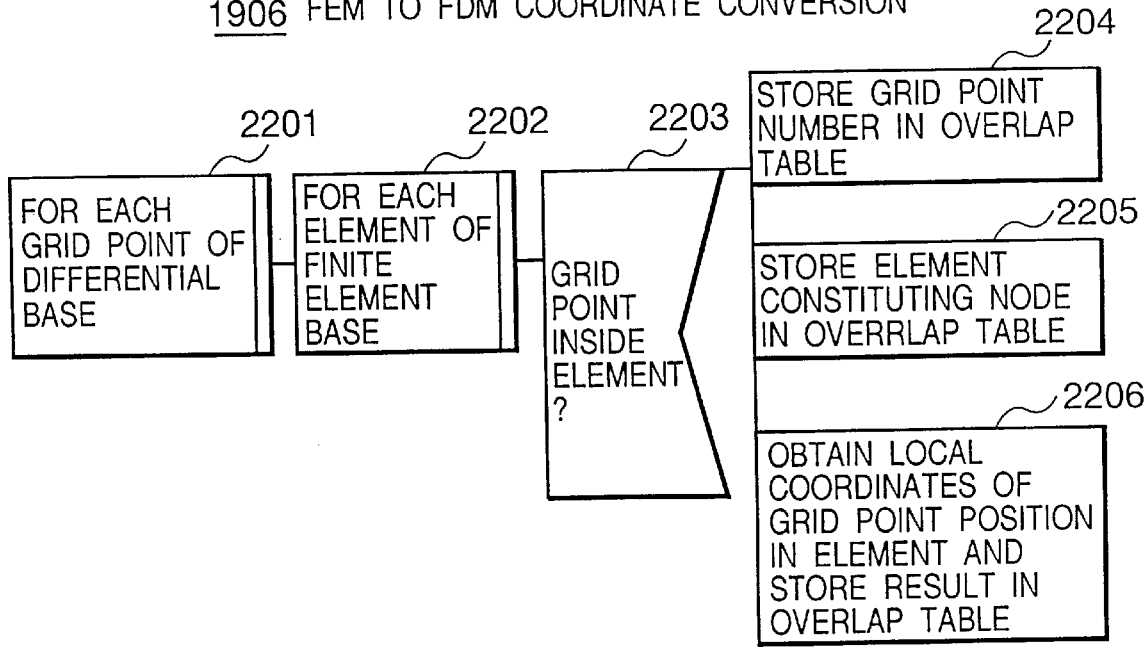
FIG. 16 is a flowchart of fem-to-fdm coordinate conversion of FIG. 15.

In what follows, fem-to-fdm coordinate conversion 1906 will be described with reference to FIG. 16. For the following description, the bases (namely, meshes in the finite differential method and the finite element method) shown in FIG. 17 will be used. First, a data conversion process checks to see if any grid point of a finite differential base 2002 to be handled by that data conversion process is included in a finite element base 2001 to be handled by the mate data conversion process. If the grid point is found included (step 2203), the data conversion process stores in the overlap table 200 (FIG. 21), the number of the grid point, the numbers of the nodes constituting that element, and the local coordinates of the grid point in that element (steps 2204, 2205, and 2206). As shown in FIG. 18, the overlap table 200 is a table that lists combinations of a grid point number 2101, an element constituting node number (i.e., node number around the grid point) 2102, and local coordinates of the grid point in element 2103. For example, in FIG. 17, a grid point 17 exists inside an element composed of nodes 211, 212, 254, and 253 and the local coordinates of the grid point are 0.5, 0.5, so that the contents of the overlap table 200 of FIG. 18 are those shown in the first row of the table. The local coordinates 2103 are obtained as follows. Let the coordinates of the four nodes constituting the element be (ax,ay), (bx,by), (cx,cy), and (dx,dy), the coordinates of the grid point be (nx,ny), and the local coordinates be (gz,et), then the following equations are established by the definition of the interpolating function in the element of the finite element method.

$$ax(1+gz)(1+et)+bx(1+gz)(1-et)$$
$$+cx(1-gz)(1-et)+dx(1-gz)(1+et)=nx$$
$$ay(1+gz)(1+et)+by(1+gz)(1-et)$$
$$+cy(1-gz)(1-et)+dy(1-gz)(1+et)=ny$$

Because the unknown quantities are only gz and et, the values thereof can be obtained from the above-mentioned equations. If the element is trilateral or one or three dimensional, use of an appropriate intraelement interpolating function permits the similar processing.

Figures 20, 21:
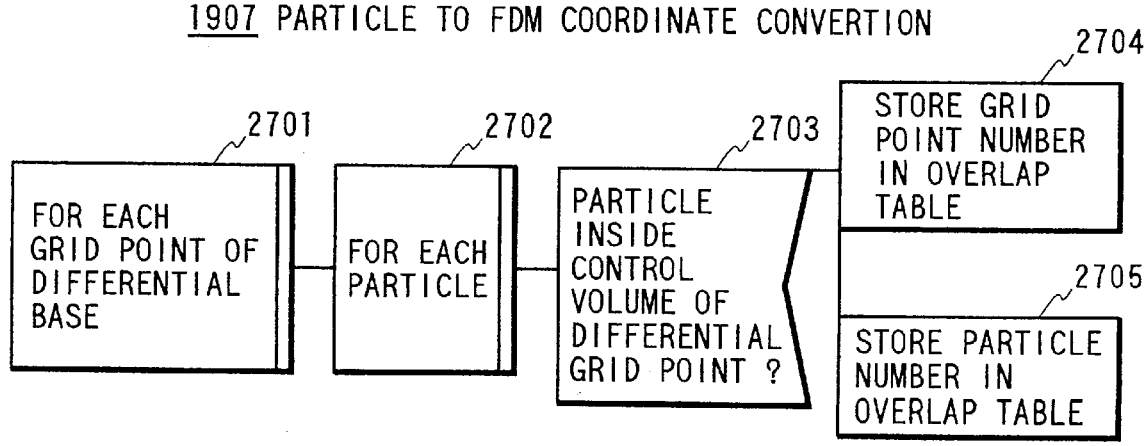
FIG. 20 is a diagram illustrating an example of an overlap table obtained by the conversion of FIG. 19.
FIG. 21 is a flowchart of particle-to-fdm coordinate conversion of FIG. 15.

The following describes fdm-to-fem coordinate conversion processing 1908 with reference to FIG. 19. For the bases for the description, those shown in FIG. 21 are used as with mentioned above. First, a data conversion process checks to see if any node of the finite element base 2001 to be handled by that data conversion process is included in any of quadrilaterals (hereinafter referred to as blocks) constituting the finite differential base 2002 to be handled by the mate data conversion process. If the node is found included (step 2403), the data conversion process stores in the overlap table 200 (FIG. 20), the number of the node, the number of the grid points constituting that block, and the distance from each of the grid points to the node (steps 2404, 2405, and 2406). As shown in FIG. 20, the overlap table 200 lists the node numbers 2301, the block constituting grid point numbers 2302, and the distances 2303 from the block constituting grid points to the node. For example, in FIG. 17, the node 211 exists inside the block composed of grid points 5, 17, 18 and 6 and the distances from these grid points to the node 211 are 1.2, 0.8, 1.3, and 1.5. So the contents of the first row of the overlap table 200 of FIG. 20 can be constituted.

Figures 22, 23:
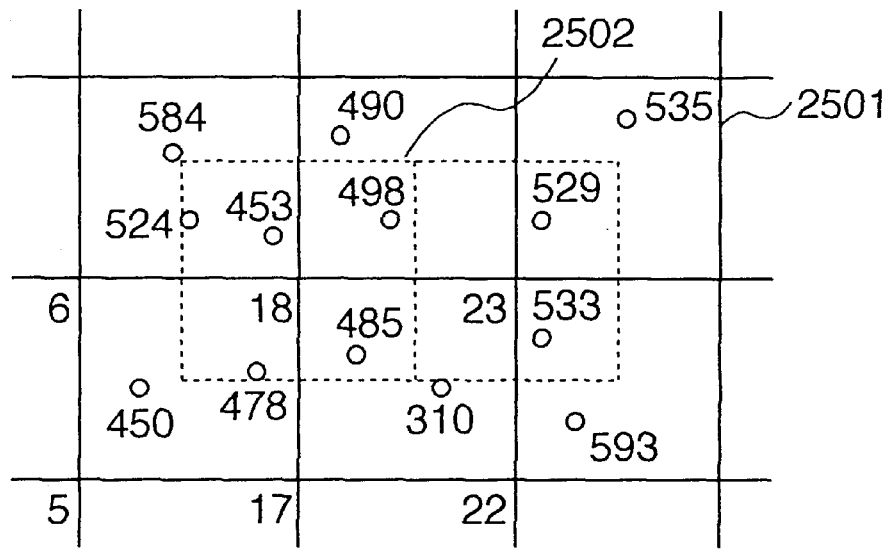
FIG. 22 is a diagram for describing a particle base and a finite element base to which the conversion of FIG. 21 is applied.
FIG. 23 is a diagram illustrating an example of an overlap table obtained by the conversion of FIG. 21.
Figure 26:
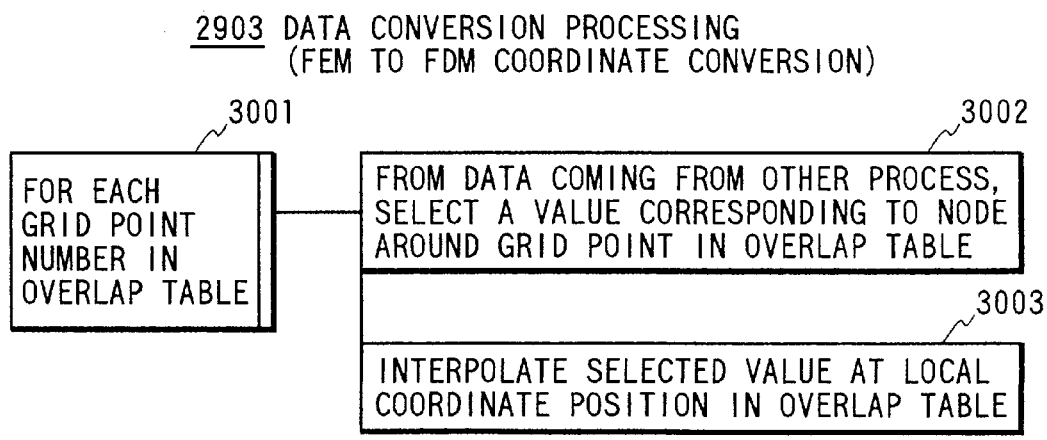
FIG. 26 is a flowchart of the data conversion processing in data conversion process.

The following describes particle-to-fdm coordinate conversion processing 1907 with reference to FIG. 21. For the bases for the description, the bases shown in FIG. 26 are used. First, a data conversion process determines a control volume of each of the grid points of the finite differential base 2501 to be handled by that data conversion process. This control volume denotes an influential range of that grid point and is obtained by interconnecting the midpoints of the squares around the grid point. Then, the data conversion process checks if any particle to be handled by the mate data conversion process is included in the control volume of one of the grid points. If a particle is found included (step 2703), the data conversion process stores in the overlap table 200 (FIG. 23), the number of the grid points and the number of the included particles (steps 2704 and 2705). As shown in FIG. 23, the overlap table 200 lists combinations of the grid point number 2601 and the particle numbers 2602. For example, referring to FIG. 26, the control volume 2502 of the grid point 18 includes particles 453, 478, 485, 498, and 524, so that the contents of the first row of the overlap table 200 of FIG. 23 can be constituted.

The other processing operations 1905 and 1909 through 1913 of FIG. 15 are generally the same as the processing operations 1906 through 1908, the descriptions these other processing operations will be omitted.

(c) Base Registration Clear Processing 1506

A data conversion process, upon reception a base registration clearing request message 1108 (FIG. 7H) from the corresponding simulation process, performs base registration clear processing 1506. In this clear processing, the data conversion process clears both the base information created on the base registration processing 1505 and the overlap table 200.

(d) Send Processing 1507

A data conversion process, upon reception of a send request message 1109 (FIG. 7I) from the corresponding simulation process, performs send processing 1507 to send data specified by the message to the mate data conversion process. In this processing 1507, the data conversion process references the information (2803 and 2804 of FIG. 24) about the mate data conversion process created in the above-mentioned base registration processing 1505 and transfers a send request message 1109 (FIG. 7I) to each of the socket numbers contained in the information. It should be noted that, in the present embodiment, the data base conversion is performed in the mate data conversion process, not in the sending data conversion process. It should also be noted that, if send and receive operations are out of synchronization, the socket (TCP/IP) capability causes no problem. If a receive operation comes first as with ordinary socket communication, the data conversion process blocks sending until a send operation is made by the mate data conversion process. If a send operation comes first, the message is buffered in the OS.

(e) Receive Processing 1508

Figure 25:
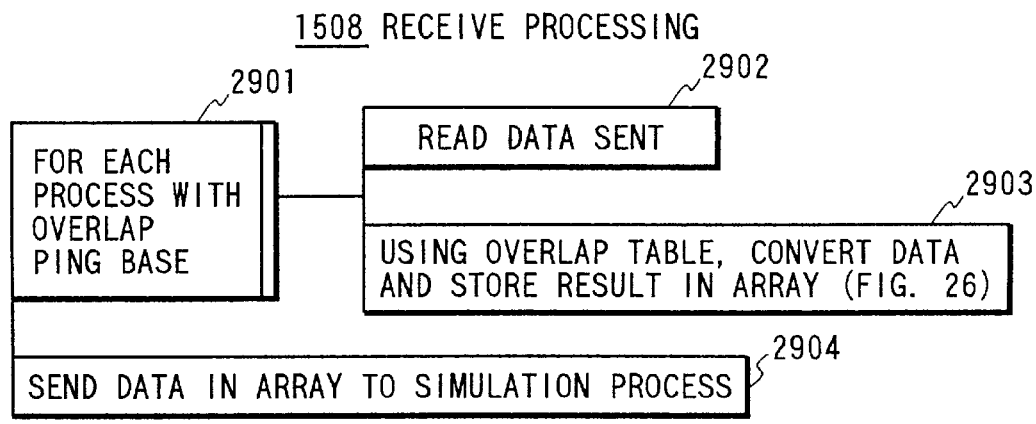
FIG. 25 is a flowchart of the receive processing in data conversion process.

A data conversion process, upon reception of a receive request message 1110 (FIG. 7J) from the corresponding simulation process, performs processing 1508 for receiving data from the mate data conversion process. The flow of this processing is shown in FIG. 25. First, the data conversion process sequentially references information (2803 and 2804 of FIG. 24) about the mate data conversion process created in the above-mentioned base registration process 1505 (step 2901) and reads data coming from the socket numbered 100 contained in the information (step 2902). Because the read data is defined on the base of the mate data conversion process, the data conversion process references the overlap table 200 already created to convert the received data to the data on the base of that data conversion process (step 2903). The conversion method used will be described later. The data conversion processes stores the converted data in a real array having elements for the number of grid points to be handled by that data conversion process by referencing "meshnodes" (1003 of FIG. 6C). At the end of the loop 2901, the data about all the grid points to be handled should have been determined, so that the data conversion process forms the data into a message 1111 (FIG. 7K) to be sent to the simulation process. Receiving this message, the simulation process exits from the receive wait state to the next processing.

In what follows, the data conversion processing 2903 will be described by use of an example. For this data conversion processing, nine data processing operations are prepared based on combinations of the base of a data conversion process and the base of the mate data conversion process as shown in FIG. 15. First, fem-to-fdm coordinate data conversion processing will be described with reference to FIG. 26. In this case, for an overlap table to be used in step 2903, the overlap table of FIG. 22 has already been prepared by the destination determination processing 1505B. Therefore, using this table, the data conversion process may only convert the data in the fem base coming from the mate process to the data in the fdm base. Namely, in FIG. 26, the data conversion process selects, for each grid point registered in the overlap table 200 (step 3001), from the received data the data at a plurality of nodes having a plurality of node numbers around the registered grid point (step 3002). Then, the data conversion process references local coordinates in the table to interpolate the data at the nodes, thereby obtaining the values at the nodes (step 3003). The interpolation is made by the following equation. In the following equation, V denotes an interpolated variable, and V1, V2, V3, and V4 denote variables before interpolation at four nodes located counterclockwise respectively.

$$V1(1+gz)(1+et)+V2(1-gz)(1-et)+V3(1-gz)(1-et)+V4(1-gz)(1+et)=V$$

For the conversion from fdm data to fem data, the overlap table 200 of FIG. 24 may only be used. By the processing similar to that of FIG. 26, the data conversion process selects data values at four grid points constituting a square including the nodes having node numbers 2301 registered in the overlap table. By use of the reciprocals of the distances from these grid points to the node, the process obtains the weighted mean of these four data values, and obtains the above-mentioned data values at the nodes.

The conversion from particle data to fdm data is performed by use of the overlap table 200 of FIG. 23. The data conversion process selects the data values at the particles 2602 around the grid points 2601 registered in the overlap table and obtains the mean of the selected data values, thereby obtaining the values at the above-mentioned grid points.

Thus, the base conversion can be performed with ease by use of the overlap table determined at base registration for each mate data conversion process.

(f) End Processing 1509

Each data conversion process, upon reception of a message 1110 (FIG. 7L) requesting for disconnection of the communication path between that data conversion process and the corresponding simulation process, sets up an event loop end flag, thereby disconnecting the communication path.

Variations to the First Embodiment

The present invention is not limited to the above-mentioned embodiment; rather, the variations shown below, among others, may also be made.

(1) Data Conversion by the Sending Data Conversion Process

In the above-mentioned embodiment, the coordinate data conversion processing is performed by the data conversion process provided for a receiving process. It is also possible to perform the data conversion process by the data conversion process provided for a sending process. In this case, the sending data conversion process receives from the destination data conversion process the base information to be handled by the same to create a data overlap table to be used for converting the data on the sending side to the data at the grid points of the destination.

(2) Selecting Data to be Sent

In the above-mentioned embodiment, the computational result data requested by the sending simulation process is all sent from the sending data conversion process to the destination data conversion process. To be actually used by the sending simulation process, however, are the data associated with the overlapped portion between the simulation region of the destination simulation process and the simulation region of the sending simulation process. Therefore, the sending data conversion process may receive the base constituting grid point information associated with the base to be handled by the destination data conversion process, and may select from the data to be received the data to be used by the mate simulation process. The selection is based on the received information and the base constituting grid point information associated with the base to be handled by the sending data conversion process. The sending data conversion may further send the selected data. This approach reduces the total amount of the data to be sent, shortening the time for data transfer between the data conversion processes.

In this case, the mate data conversion process may be made perform data conversion processing on the above-mentioned selected data; also, as described in the above-mentioned variation (1), the data conversion may be performed by the sending data conversion process to send the resultant data.

(3) Application to Different Computer Systems

In the above-mentioned embodiment, a plurality of simulation programs are concurrently executed on a plurality of processes. The present invention is also applicable to other computer systems.

For example, each of the simulation programs can be executed on one separate processor without any modification. To be specific, a plurality of simulation programs may be executed on different processors. Each simulation program is executed on one processor as at least one simulation process and the data conversion process determined for the simulation program is executed on that processor. The other simulation programs and the corresponding data conversion processes are executed on the other processors.

Further, without any modification, the present invention is applicable to the situation in which a plurality of simulation programs are all executed on one separate processor. In this case too, one simulation program is executed on one processor as at least one simulation process and the corresponding data conversion process is executed on that processor. Likewise, the other simulation programs are executed on the respective processors.

(4) Application to Other Regions

Figure 17:
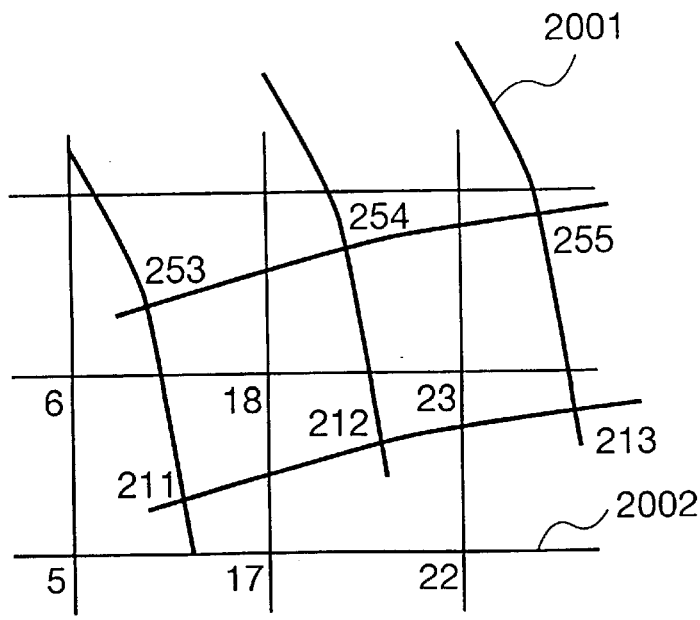
FIG. 17 is a diagram illustrating examples of a finite element base and a finite differential base to which the conversion of FIG. 16 is applied.
Figures 18, 19:
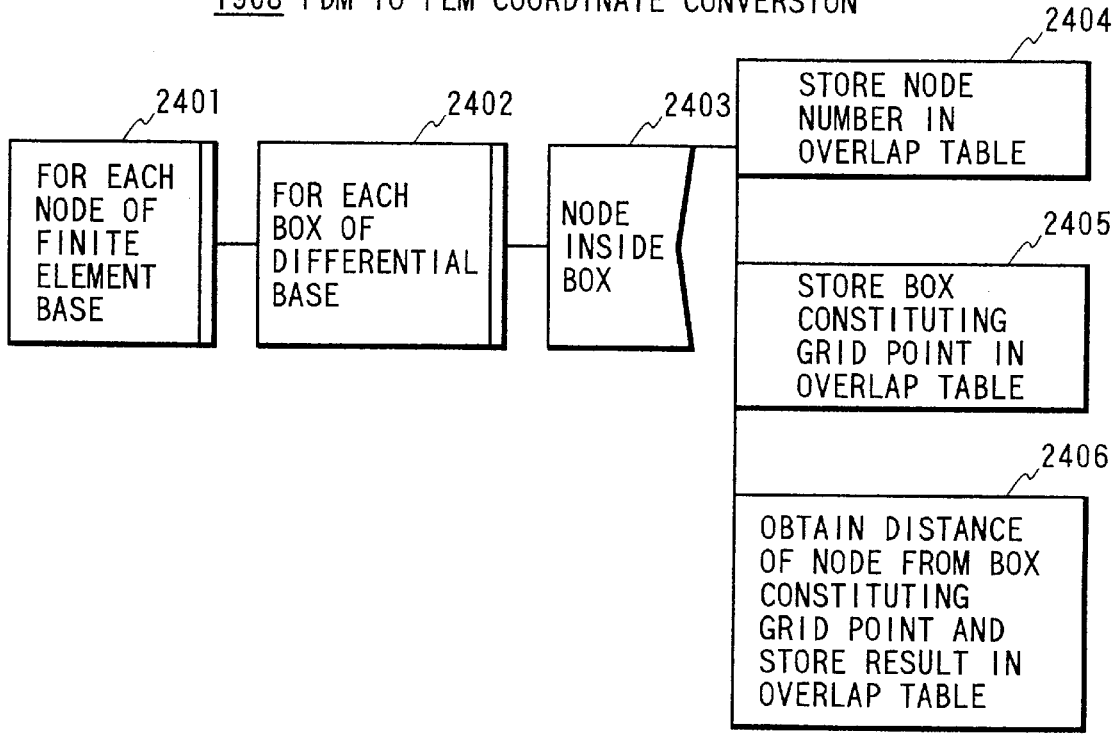
FIG. 18 is a diagram illustrating an example of an overlap table obtained by the conversion of FIG. 16.
FIG. 19 is a flowchart of fdm-to-fem coordinate conversion of FIG. 15.
Figure 27A:
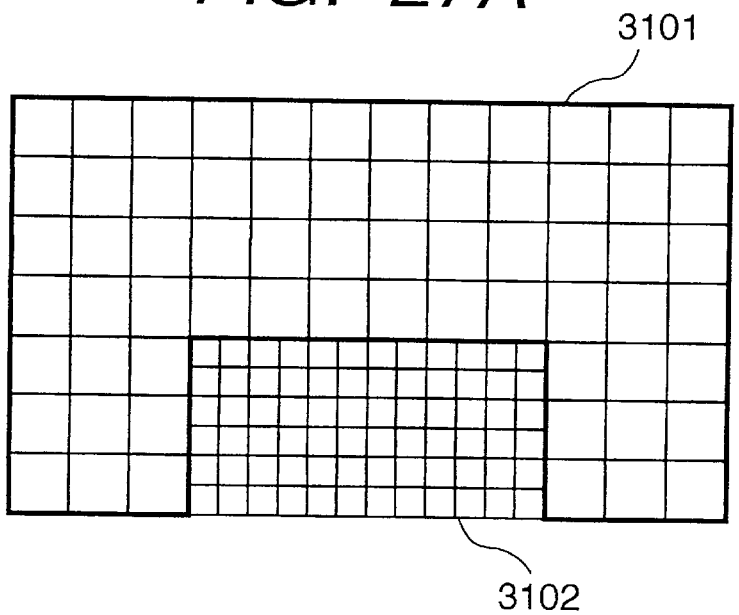
FIG. 27A is a diagram illustrating two adjacent bases.
Figure 27B:
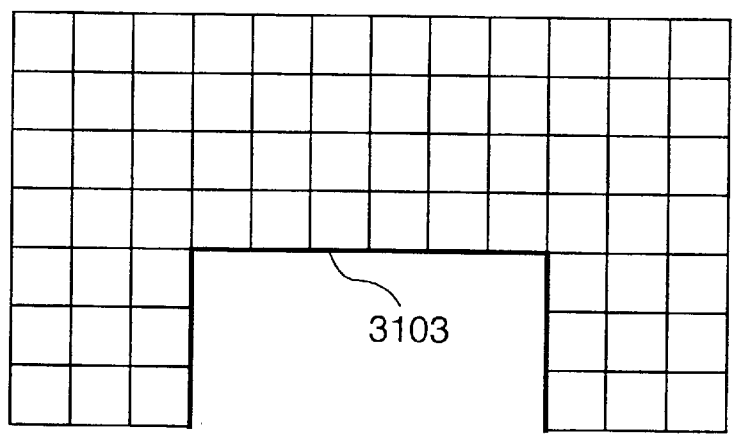
FIG. 27B is a diagram illustrating one of the two bases of FIG. 27A.
Figure 27C:
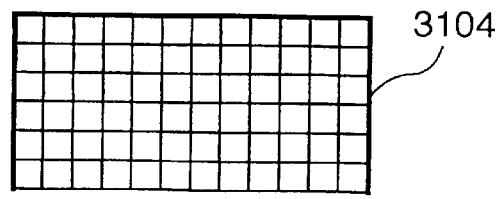
FIG. 27C is a diagram illustrating the other of the two bases of FIG. 27A.

In the above-mentioned embodiment, a plurality of bases spatially overlap each other as shown in FIGS. 17 and 22. The present invention is also applicable in the same manner to a situation in which a plurality of simulations pass physical quantities to each other by way of the boarder between the simulations. For example, FIG. 27A shows an example of the bases in which a physical phenomenon occurring in a region 3101 resembling a gate enclosed by thick lines and another physical phenomenon occurring in anther region 3102 are analyzed concurrently. The base may be continuous is discontinuous across the interface between both regions. Both the regions are adjacent to each other but have no positive overlap. In this case too, allocating the simulation base of the region (FIG. 27B) and the base of the other region (FIG. 27C) to their respective simulation processes allows exchange of the physical quantities between the processes by way of the overlap region between both bases (in this case, the regions 3103 and 3104 of FIGS. 27B and 27C respectively). The data conversion libraries and the data conversion processes described in the above-mentioned embodiment are applicable to this case without any modification.

(5) Execution as Subroutines

In the above-mentioned embodiment, each simulation program is executed as a plurality of simulation processes and the data conversion processes corresponding thereto are executed. Thus, each data conversion process is executed as a program which is independent from the corresponding simulation process. Consequently, an advantage is provided in that the execution of a simulation program is not directly affected by the execution or discontinuation of the corresponding data conversion process. Moreover, because each data conversion process controls the information about the base of the corresponding simulation process and the base of another simulation process, each simulation process need not use the array of such information. As a result, as compared with the case in which such an array is used by the simulation program, the degree in which the simulation process is restricted by the memory capacity of the computer that executes the simulation process is reduced.

However, in the above-mentioned embodiment, the data conversion processes require the communication of a great amount of data between them, so the communication time increases, eventually increasing the simulation time. One example of solving this problem is to make a program that executes the processing executed by a data conversion process be executed as a subroutine of the simulation program.

To be more specific, a program for data conversion that executes the processing executed by a data conversion process is used as a subroutine for each simulation program. In this case, no data conversion library used in the above-mentioned embodiment need be used. Thus, executing the simulation program including such a subroutine causes a subroutine of each simulation program as a part thereof. The requests in the above-mentioned embodiment such as data send and data receive requests can be replaced by the subroutine calls from the simulation programs. Further, exchanging data between a plurality of subroutines included in different simulation programs can replace the data exchange between the data conversion processes in the above-mentioned embodiment. This increases the data exchange speed as compared with the data exchange speed of the above-mentioned embodiment. It should be appreciated here that, because each subroutine uses the array of information about the relationship of the bases of different simulation programs and each simulation program including the subroutine need not use the array, the simulation programs are hardly affected by the memory restriction, which is one of the advantages of the above-mentioned embodiment.

(6) The present invention is applicable to not only simulation programs but also execution of a plurality of ordinary computer programs on computers interconnected by way of a network. For example, data conversion by the data conversion program (or process) used in the first embodiment can be applied to two programs (or processes) which may be ones for handling data for other purpose than simulation, and different data items are handled by those programs (or processes). The data conversion processes of the first embodiment can be used in order to convert data produced by the first one of them into data for the second one of them. So, the data items required by the latter is selected from data items included in the data produced by the former. This selection can be executed by the data conversion program (or process), if the program (or process) receives beforehand information related to the data items handled by the former program and those handled by the latter program respectively from those programs.

The determination of destination program realized by the data conversion program (or process) of the first embodiment can be applied to two or more programs (or processes) other than simulation programs. The data conversion program (or process) receives information on data handled by them beforehand from those programs (or processes), and can determine destination programs (or processes) to which data which will be produced by one of them should be sent, based upon the information. So, when data has been produced by one of them actually, the data conversion program (or process) sends the data to selected one or ones of the programs (or processes).

The Second Embodiment

Conventionally, no method has been available that is suited to a numerical simulation by a large-scale single program and a coupled (numerical) simulation in which a plurality of simulation programs are used in an interrelated manner, and ensures security of the numerical simulation programs and data on a network. Also, no immunization system to such programs has been introduced that prevents, when a program is infected with computer virus, the infection from being spread all over the network. The following describes an encryption method and an immunization method for ensuring security of the programs and data when building an environment in which a single numerical simulation or a coupled numerical simulation can easily be performed on a network. The methods also ensure building an immunization system to be had by programs of the same type that prevents, when part of the data or programs is infected with computer virus, the infection form from being spread throughout the network. These methods are practiced as the second embodiment of the present invention.

To be specific, in the second embodiment, a program portion that serves as a security process (hereinafter sometimes referred to as a security process portion) is added to the data conversion processes 603 and 604 used in the first embodiment. Furthermore, a program portion that serves as a security library (hereinafter sometimes referred to as a security library portion) having a capability of relaying data and requests between the security process portion and a simulation process is added to the data conversion libraries 607 and 608 of the first embodiment. In what follows, the data conversion process portion associated with the original data conversion process capabilities is sometimes referred to as a data conversion process or a data conversion process portion. Likewise, the data conversion library portion that is associated with the original data conversion library capabilities is sometimes referred to as a data conversion library or a data conversion library portion. Therefore, in what follows, the operations of the apparatus and programs in the second embodiment will be described also with reference to FIG. 1 and other drawings used in the description of the first embodiment.

To be more specific, the data conversion process 603 or 604, upon receiving a data send request from the corresponding simulation process, determines a destination simulation process described before. The process encrypts the data to be sent with a first encryption key specified for each of the destination simulation processes, and sends the encrypted data to the determined destination. The destination data conversion process, upon reception of the encrypted data, decrypts the data received with a second encryption key specified for each destination simulation process, performs data conversion on the decrypted data, and transfers the resultant data to the corresponding destination simulation process.

Encryption and decryption are described by M. E. Hellman in Scientific American, vol. 241, No. 2, pp. 130–139, or Scientific American, vol. 228, No. 5, pp. 15–23, for example. For a more detailed document, "Security for Computer Networks," by D. W. Davis and W. L. Price, 1984, John Wiley and Sons, Ltd. or its Japanese edition (published by Nikkei McGraw-Hill) is available. Before going into details, necessary terminology will be described:

plain text data (program) denotes data (or a program) not yet undergone any encryption-associated processing;

encrypted data (program) denotes data (or a program) resulted from encrypting plain text data (program);

encryption denotes the process of encrypting any data (program) in which a specific key is required to restore the original data (program);

decryption denotes the process of taking encrypted data (program) and reconstructing from it the original data (program);

key denotes the key for use in encryption and decryption; and decipher/tapping denotes decryption of encrypted data (program) by a party not given the authorized key.

While encryption is performed, a server connected to a network is checked to see to which site on the entire network the same simulation program as the simulation process being executed is distributed. The same effect can be obtained by communication between the processes related to each other.

A variety of cryptosystems are available. In what follows, a system will be described by way of example in which a public key and a secret key are used for encryption. This system is known as a public-key cryptosystem. In this system, a key used for encrypting a plain text is distinct from a key used for decrypting an encrypted message. The encryption key is made public to servers on a network and only the decryption key is made secret. The key dedicated to encryption is called a public key, while the key dedicated to decryption is called a secret key. The public key and the secret key are constituted by one data group and therefore can be used only in the same combination. Other combinations do not ensure consistency.

The most standard and reliable public-key cryptosystem so far is the RSA (Rivest-Shamir-Adelman) algorithm. The present embodiment employs this algorithm. The strength of the RSA algorithm is based on the fact that factoring large composite prime numbers into their prime factors involves an overwhelming amount of computation, whereby it is practically impossible to reach a solution.

There are variations to the RSA algorithm, which are also usable in the present embodiment.

The security process portion to be used in the present embodiment comes in two types. One is a hardware available process portion (or a process portion for hardware) in charge of hardware availability such that permission for using the hardware to be used by the network is obtained from the operating system of the hardware. This process portion only determines available hardware and therefore has nothing to do with what kind of program is to be executed on the determined hardware. As the networks progress, situations can happen in which a certain server cannot be accessed for input/output operations of a program A, while the access is permitted though another program B. In other words, a situation can happen in which a certain hardware unit permits only the computational execution of the program A; that is, the hardware unit does not permit the input/output operations of the program A. In such a case, coupling a plurality of programs requires a distinct authentication system independent of hardware. Consequently, in the present embodiment, a program available portion (or a process portion for software) is provided in addition to the above-mentioned hardware available process portion. The second embodiment is therefore advantageous in that the authentication between software programs can be performed in addition to the conventional authentication of hardware.

In the hardware available process portion, usage authorization is obtained from a computer on network to be used by a user in a preprocessing program for executing a simulation program by the user. Alternatively, usage authorization could also be obtained in a separately running, more general process (for example, a process running as a demon).

This process portion has the information about user's authenticity in a table indicating whether a certain hardware unit permits only computation of a program or the unit also permits input/output operations of the program. To be more specific, this process portion has a key, as public key KHA+, that includes an ID group of a hardware group to be used by a program A and another key, as secret key KHA−, that includes an encrypted password group for obtaining authentication of the hardware group to be used by the program A. It should be appreciated here that the public key KHA+ and the secret key KHA− include authentication keys (KHA 1+, KHA 2+, KHA 3+, and so on) and (KHA 1−, KHA 2−, KHA 3−, and so on) respectively corresponding to a plurality of node processors P1, P2, P3, and so on. When a process A wants to use a particular node processor Pn, the process A sends a signal thereof to the Pn without encryption (or by using a public key prepared by the Pn). The Pn, if the received signal is encrypted, decrypts the same by using the secret key of its own, encrypts an approval signal by the public key HAn+ of the process A, and sends the encrypted signal to the process A. The process A applies the secret key to the received encrypted signal to decrypt the same. Thus, authorization of using the Pn can be confirmed. These operations are repeated for each of the node processors to be used by the process A. Only when authenticated by all node processors, the process A can obtain authorization to use the same.

In the present embodiment, the RSA algorithm is used also for the confirmation of usage in the hardware available process portion; generally, however, the authentication is often obtained by the DES (Data Encryption Standard) often used commercially.

Only when the authentication data about the level at which computation can be executed by the hardware available portion in the security process portion and the authentication data for the use of other programs in the program available portion to be described later are both available, the following processes are executed to enable a simulation through program A and program B. To do so, the process A sends to the process B a signal indicating an intention to use the same by encrypting the signal with public key KSB+of the process B. The process B applies its own secret key KSB- to the received signal to decrypt the same. The process B tells nothing to the process A if the process B does not give the requested usage authorization to the process A. If the process B gives the usage authorization to the process A, the process B encrypts a signal for giving the usage authorization with public key KSA+ of the process A and sends the encrypted signal to the process A. The process A decrypts the received signal by using its own secret key KSA-. Thus, the authorization for using the process B can be confirmed. This holds true with the case in which the process B wants to use the process A.

The program available portion has the data structure described below. To be specific, the program available portion of the program A has the public key of a program to which the program A is to be coupled (for example, the program B) and the public keys of some or all of the copies of the program A distributed over the network (these copies are herein called as a program surrogate group). These key data are held by the processes themselves and communicated between the same or stored as a database on the server of a site of confidence. On the other hand, the decryption key (or the secret key) may also be stored on such a server as a database. In the present embodiment, however, the decryption key held in a process as data. It should be appreciated that the user can select either to prepare a particular data server to store the public key data or transfer the public keys between the processes when required.

The data transferred in simulation are huge in quantity in general. Therefore, the data necessary for simulation that comes from other processes are one compressed. That is, original data is compressed. A hart of the compressed data is encrypted. When another piece of data is compressed, a part of the compressed data to be encrypted is determined by another method. As mentioned above, the data transferred in simulation is huge in quantity, encrypting all the compressed data is time-consuming. Therefore, as shown by use of screens of FIGS. 28 and 19, the user can specify whether to encrypt the entire compressed data or only a part thereof. That is, the user can select encryption timings. In addition, the user can select whether to automatically control the scheme or timing of use of the cryptosystem and the immunization method, by holding these pieces of information in the system as default and making the system generate random numbers.

Figure 28:
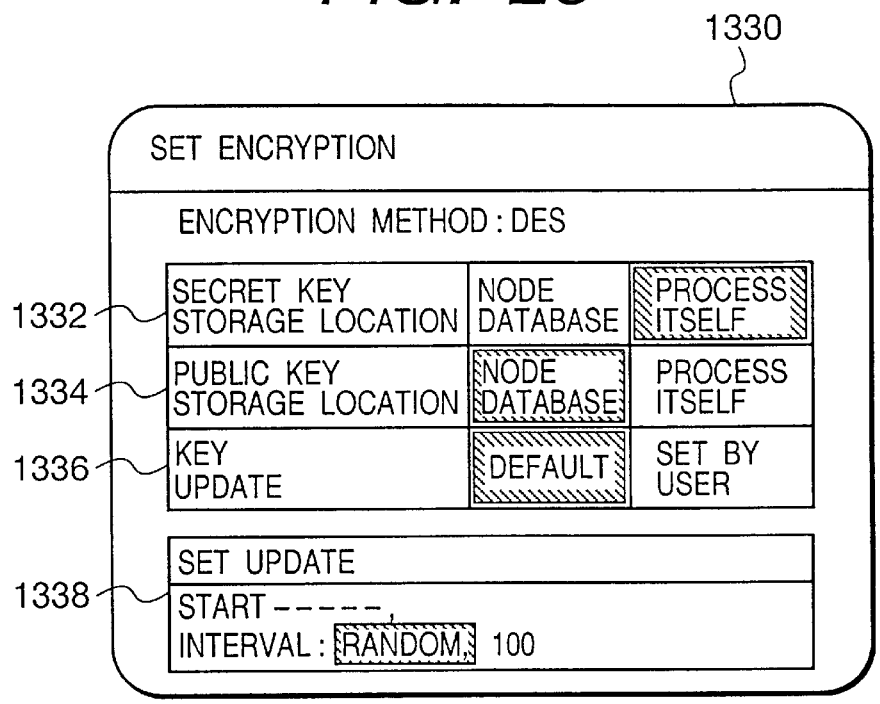
FIG. 28 is a diagram illustrating a screen for setting encryption conditions for use in the second embodiment of the present invention.
Figure 29:
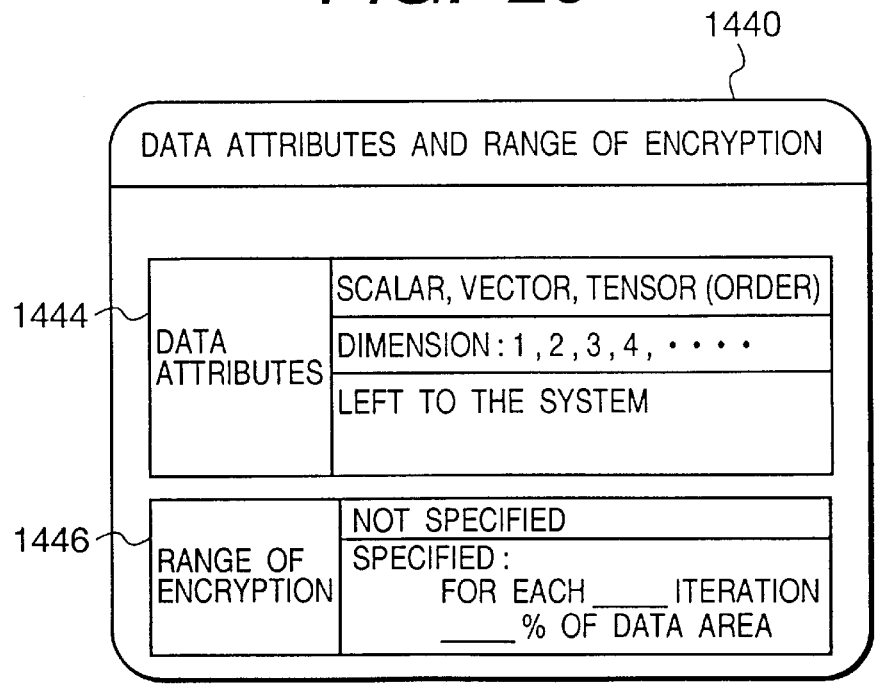
FIG. 29 is a diagram illustrating a screen for setting data attributes and a encryption range for use in the second embodiment of the present invention.

Reference numeral 1330 of FIG. 28 indicates an example of interface for the user to set the conditions of encryption. Reference numeral 1440 of FIG. 29 indicates an example of interface for the user to determine data attributes and set an encryption range. FIG. 28 shows an example in which the user specifies a public key, a secret key, and the time of key update. Referring to FIG. 28, the hatched portions indicate the user selection with the mouse. Likewise, FIG. 29 shows an example in which the user specifies data attribute 1444 and encryption range 1446 in a given process.

If an attempt is made to access the secret key or copy the program available process portion, the process (demon) in the activated state is automatically terminated. If this happens, a warning is sent to the user and, at the same time, communication is made between the copies (the program surrogate group) of that program existing on the network, the surrogate group data is referenced to set a locked state, thereby preventing a new process of the program A from being activated. The locked state can be cleared only by a particular supervisor. To be more specific, a dummy program is attached to each security process portion. This dummy program frequently transfers information with the operating system of the computer about file read, write, duplication, creation of dummy encryption process, and other operations only to make the system intentionally vulnerable to a computer virus or hacker. A monitor process is executed along with this dummy program. Virus infection or access by a hacker is determined by checking the monitor process for any change. If the infection or hacker access is found, the fact is communicated between the programs on the network based on the information of the hardware available process portion stored as information in the security process portion and the data of the program surrogate group.

The following describes an example of processing for verifying whether the security process portion has been copied intentionally or accidentally. The security process portion makes no response to any program that requests a process to which the security process belongs for usage authorization, data send, or data receive without authentication. This prevents an intruding program from getting in the system or accidental copying. A process X that requests a program (for example the program A) for data transfer but does not send data to that program is monitored by the security process portion. If the frequency of the access by the process X exceeds a preset level, the security process portion performs quarantine in the following procedure. For this quarantine, each process records data transfer with other processes in the database or its own process portion. Statistical analysis is sequentially performed on the record stored in the database or the own process portion. If this analysis indicates a process portion of which data transfer is significantly abnormal, the process A intentionally sends some data to the suspicious process X along with the request data. Then, the process A requests the process X for performing a simple mathematical operation on that intentionally sent data and then requires the process X to send the resultant data to all other processes (for example, processes C and D). If the process X cannot send the data, namely, if the process X has not gotten authentication from any of the processes C and D, the process A determines that the process X is an intruder. The processes C and D return the data received from the process X to the process A. The process A checks the contents of the data and, if no mismatch is found, determines that the process X is not an intruder. These processing operations are repeated subsequently.

The following describes only differences from the first embodiment. A simulation program used in the second embodiment differs from that of FIG. 5 in the following points. The call statement used in step 701 registers the data and public key entered by the user and the public key data of surrogate processes into the data conversion library.

As for the function calls and their arguments included in the data conversion library, the second embodiment differs from the first embodiment only in the following point.

By function void dex_register_quantum( ), various security data are entered in the security process portion by use of the screen. In FIG. 28, the user selects the storage locations (1332 and 1334) of the secret key and public key of the security process portion and the timing 1338 of key update 1336. In FIG. 29, the user specifies which percentage of the data is to be encrypted and decrypted by the secret key and public key of the security process and at what frequency. If no specification is made, encryption and decryption are performed on 0.01% of the data resulted from a simulation. The encryption and the decryption are performed at a random frequency according to the random numbers generated by the system. To perform encryption and decryption with only a particular site, the site is specified by function void dex_register_quantum(num,ids) after the data conversion process to be described later. This function restricts the node processor and site for encryption and decryption. In the function, "num" denotes the number of node processors to be specified and "ids" denotes their ID numbers.

It should be noted that the messages to be passed between the data conversion library and the data conversion process are the same as those used in the first embodiment.

The data conversion process is activated in the same manner as that of the first embodiment.

The flow of the processing for establishing the connection between the data conversion processes is generally the same as that of FIG. 10. In data connection in processing 1402 through 1405 too, the processing of the hardware available process based on the RSA algorithm is completed.

In the data receive operation of step 1402, the data conversion process receives data that has been encrypted by the public key of that data conversion process and decrypts the received data by the secret key of that data conversion process. The data transfer thereafter is performed through the encryption and decryption based on the RSA algorithm.

In steps 1404 and 1405, the data required for encryption timing and procedure are stored based on the data of FIGS. 28 and 29.

Figure 11:
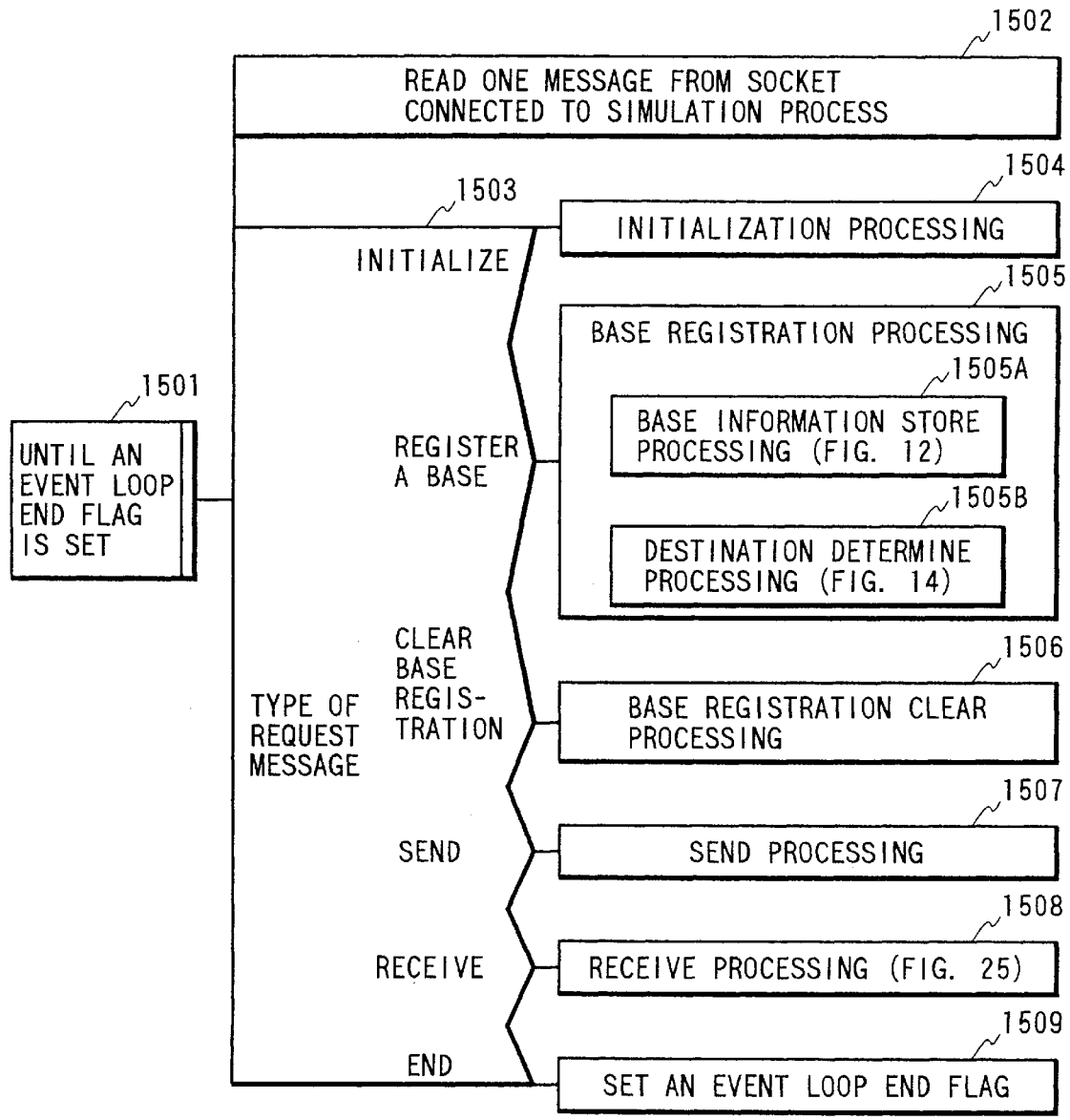
FIG. 11 is a flowchart of data conversion processing in the data conversion process.

When the communication path has been established between the data conversion processes, the data transfer is performed in the same manner as the first embodiment as shown in FIG. 11.

In the data transfer according to the present second embodiment, the sending data conversion process encrypts the data and sends the encrypted data, and the receiving data conversion process decrypts the received data, which is different from the processing of the first embodiment. To be specific, the sending data conversion process encrypts, by use of the public key of the destination, all or part of the data to be sent or the data already compressed to be sent to the hardware (node processor) and software of the destination. The sending data conversion process also attaches an index that distinguishes between encrypted information and plain text information. If the software is common to both parties, the sending side may only consider the hardware (node processor) of the destination for encryption. On the other hand, in step 1508 of FIG. 11, the receiving data conversion process distinguishes, for all or part of the data to be received or the data already compressed, between plain text information and encrypted information according to the data entered in the encryption range defined by the user in FIGS. 28 and 29. Then the receiving data conversion process attaches an index that indicates the distinction. The receiving data conversion process encrypts the index information before sending the same to other processes. Moreover, using the secret key of its own, the receiving data conversion process decrypts the encrypted information coming from the mate process. If the software is common to both parties, the receiving data conversion process may only consider the hardware (node processor) of the mate processor for decryption.

In the second embodiment, the security process portion is included in the data conversion process. It will be apparent that the security process may be executed independently of the data conversion process. In this case, the data conversion process and the security process are interconnected by a software communication path to perform data transfer while communicating with each other. In addition, of the above-mentioned processing operations, the processing associated with the security process portion may only be executed on the security process.

According to the second embodiment of the present invention, the security of the programs on a network can be maintained, the use form is simplified, and the use authorization is made clear, thereby facilitating the program execution through network, preventing the unauthorized use, and decreasing the economic damage caused by such unauthorized use.

The Third Embodiment

In a parallel computer system or a distributed computer constituted by computer systems having different resource quantities, when a coupled program composed of a plurality of element programs (for example, simulation programs) operating in cooperation with each other, the third embodiment of the present invention provides a program loading method suited for allocating each of the element programs to the computer such that the execution efficiency is enhanced.

To be specific, in the third embodiment, for each of the processor units (PUs) constituting the computer system, such computer resources as CPU power, disk I/O power, and main memory quantity and such resource consumption quantities required by program as load quantity of each element program to be input, file I/O quantity, and memory consumption quantity are registered beforehand or automatically acquired. At the time of program input, the PUs to which the element program are allocated are selected based on the usage status of each PU at that time and the above-mentioned resource consumption quantities. The acquisition of the usage status of each PU is performed by executing a demon process for monitoring the resource consumption state on the registered PUs and inquiring the demon process for the acquisition. If the resource quantities of a program to be input are unknown, resource consumption information is profiled for subsequent use.

The profiling is performed by asking the above-mentioned resource monitoring demon process for acquisition of program resource consumption quantities. In what follows, the third embodiment will be described in detail.

Figure 30:
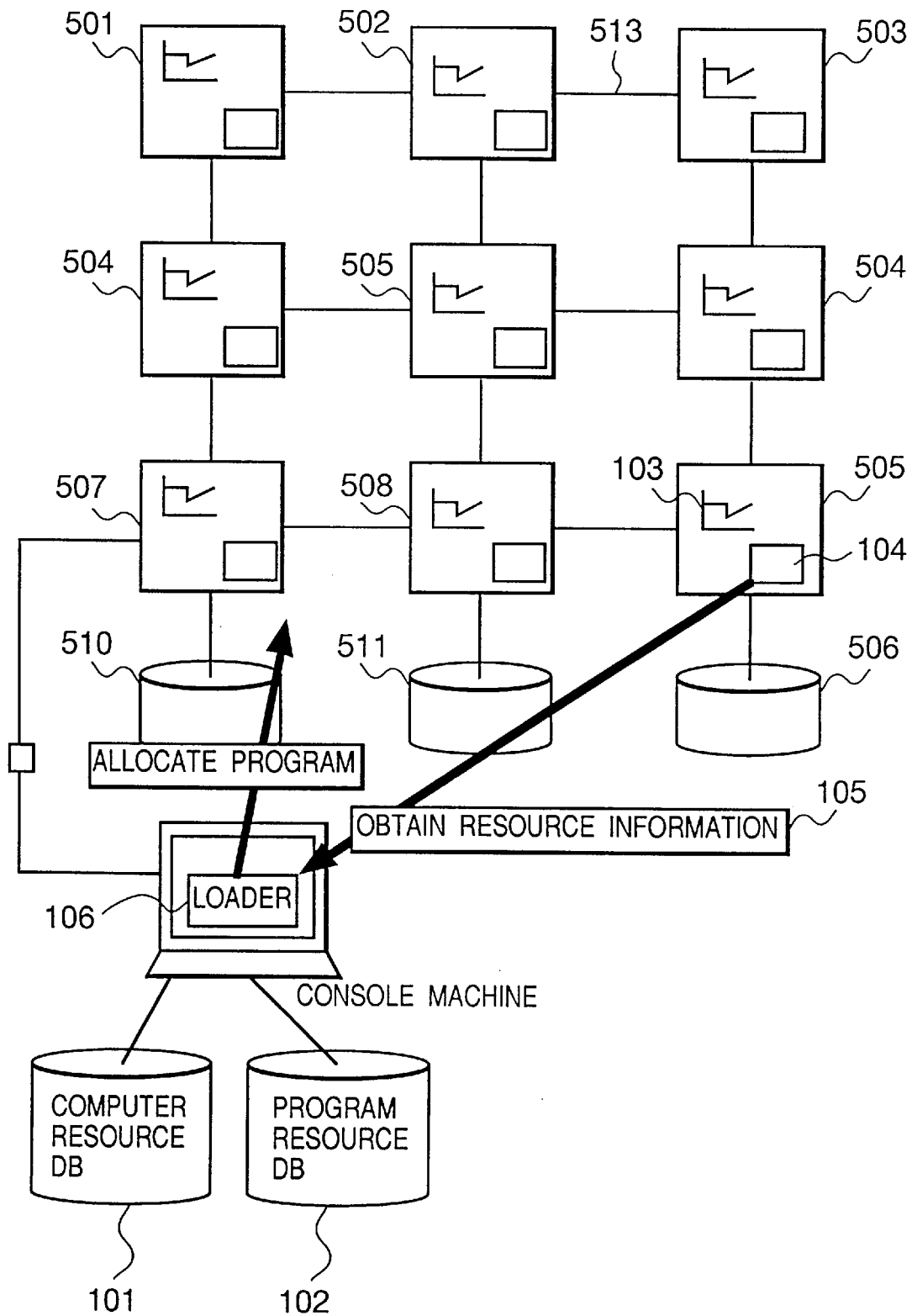
FIG. 30 is a block diagram illustrating a computer system for use in the third embodiment of the present invention.

Referring to FIG. 30, the element programs are allocated to the computers such that the coupled program to be input can be executed efficiently, based on the resource quantity of each computer stored in a computer resource database 101, the resource consumption quantity of each element program stored in a program resource database 102, and the usage status of each computer at program input (indicated by a graph 103). The acquisition of the computer usage status 105 is performed by a resource monitoring demon 104 resident on one of the computers. The resource monitoring demon uses an OS system call to acquire and hold the computer usage status. In addition, the resource monitoring demon monitors the execution state of the above-mentioned coupled program and automatically register the program resource database (105).

Figure 31:
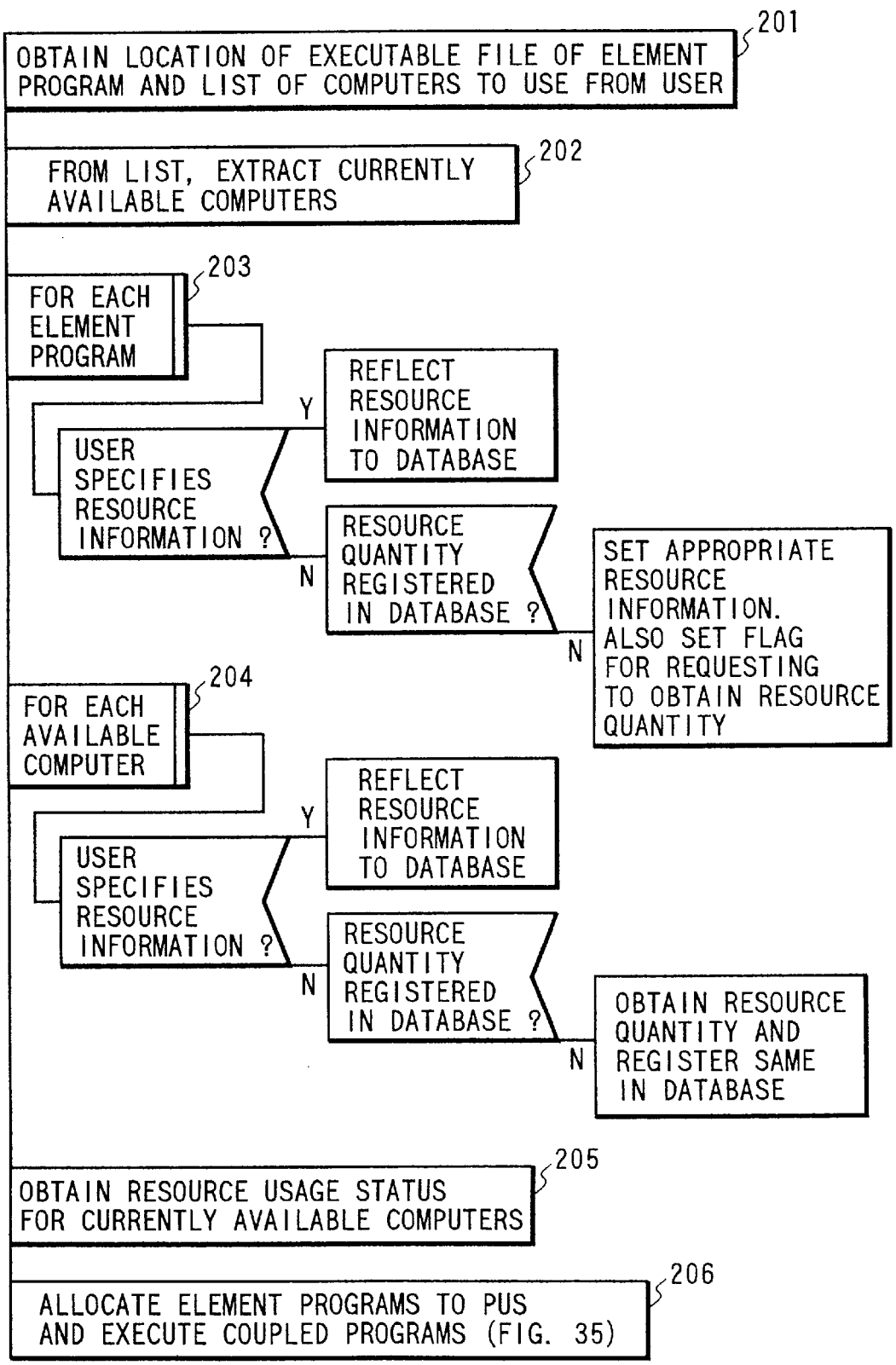
FIG. 31 is a flowchart of an overall processing procedure adopted in the system of FIG. 30.

Referring to FIG. 31, a file in which paths to the executable forms of the element programs for the coupled program to be input are described and a file in which IP addresses (or host names) for identifying computers to be used are passed to a loader program (hereinafter referred to as a loader system) prepared by the user (block 201).

The loader system checks the computers described in the file for availability and extracts the available computers (block 202). An available computer herein denotes a computer that is connected both physically and logically to a computer made a host computer by the user by inputting a program input command. An unavailable computer denotes a computer having no effective path with the host computer. A computer is made unavailable when the same is not networked, a network coprocessor (a processor unit dedicated to checking destinations of data flowing through the network and transferring the data) if any of the computer is failing, the computer is in the halt state, or the network to which the computer is connected is failing, by way of example.

Then, the resource consumption quantity of each element program is acquired. The resource consumption quantity includes a load quantity, a memory request quantity, an average file I/O quantity (hereinafter referred to as a file I/O quantity), and an average transfer data quantity between element programs (hereinafter referred to as a transfer data quantity). To be specific, the load quantity is the total number of four basic arithmetic operations that appear in the program. Triangular functions and arithmetical functions such as square roots are converted to the number of four basic arithmetic operations. The memory request quantity denotes a memory quantity to be consumed by the program. This quantity is equivalent to the total quantity of codes, stacks, and data of the program; because the data occupy most of this quantity, the quantity of the data to be processed by the program is used for the memory request quantity for simplicity. The average file I/O quantity indicates an average quantity per every file input/output or disk input/output that appears in the program. The transfer data quantity denotes an average quantity per every data input/output of message exchange between element programs. Information about these resource consumption quantities is registered in the program resource database 102 in advance and therefore acquired from this database. For a new program, the resource consumption quantity information is not yet registered in the program resource database 102. In this case, if any of the element programs constituting the coupled program has the resource consumption quantity information registered in the database, appropriate values are set based on that information. If none of the element programs has the resource consumption quantity information, appropriate values are set based on the resource consumption quantity information of another element program in the program resource database 102. For these values, an average value of the registered element programs is set for example.

If none of the resource consumption quantity information is registered, a uniform resource consumption quantity is assumed. Further, if no resource consumption quantity information is registered in the program resource database 102, the resource consumption quantity is collected by a resource information automatic acquisition feature during the execution of the coupled program to be reflected on the program resource database 102. This automatic acquisition feature will be described later. Also, the user can define the resource consumption quantity information. In this case, it is possible to give preference or a weighted addition between the information stored in the database 102 and the information defined by the user for the resource consumption quantity information. In the present embodiment, the resource consumption quantity information defined by the user is preferred by way of example. In addition, when the resource consumption quantity is unknown, it may be acquired before, not during execution, of the coupled program by interactively inquiring the user (block 203).

Then, the resource quantity of each computer is obtained. The resource quantity includes a CPU power, a main memory quantity, a disk I/O power, and a network I/O power. To be specific, the CPU power denotes an arithmetic capability of the processor, or an arithmetic operation quantity executable in a unit time. In the simulation program used in the present embodiment, floating-point operations are mainly performed, so that FLOPS (FLoating-point Operation Per Second) is used for the unit for the CPU power. The main memory quantity denotes a main memory quantity held by the processor. The disk I/O power denotes a data transfer rate at the time when the program performs a disk I/O operation on that processor. For this data, a peak value of the disk I/O performance is used. The network I/O power denotes a data transfer rate of the network interconnecting the processors. For this data, a peak value of network transfer rate performance is used. The information of these resource quantities is stored in the computer resource database 101 and therefore is referenced from this database. If no resource quantity information is registered as with a new computer, appropriate values are set based on the registered information if any of other computers. For these values, an average value of the registered computers is set for example. If none of the resource consumption quantity information of the other computers is registered, a uniform resource consumption quantity is assumed. Also, the user can define the resource consumption quantity information. In this case, it is possible to give preference or a weighted addition between the information stored in the database 101 and the information defined by the user for the resource consumption quantity information. In the present embodiment, the resource consumption quantity information defined by the user is preferred by way of example (204).

Then, the current usage status of each computer is obtained from the resource monitoring demon. The resource usage status indicates the usage status of the computer resources such as CPU, memory, disk I/O, and network I/O (205). To be specific, a CPU usage ratio, a free memory quantity of main memory, an average disk I/O quantity, and an average network I/O quantity. The average disk I/O quantity denotes a disk I/O quantity per second and the average network I/O quantity denotes a network I/O quantity per second.

Lastly, the above-mentioned coupled program is allocated to the computers based on the above-mentioned resource information to actually load and execute the coupled program (206).

The following describes in detail the constitutions of the computer resource database 101 and the program resource database 102, the resource monitoring demon, the program allocation, and the resource information automatic acquisition feature.

First, the constitution of these resource databases (101 and 102) and the resource monitoring demon will be described.

FIGS. 32A and 32B show the constitution of the computer resource database 101. This database holds the resource information obtained by the resource information acquisition feature and the resource information specified by the user by file to be referenced for program allocation at the time of program loading.

FIG. 32A shows the resource quantities of PUs. Reference numeral 301 indicates a PU number, reference numeral 302 indicates a CPU power, reference numeral 303 indicates a main memory quantity, reference numeral 304 indicates a disk I/O power, and reference numeral 305 indicates a network I/O power. FIG. 32B shows a network resource quantity between PUs. Reference numeral 311 indicates a network topology, reference numeral 312 indicates an array of PUs, and reference numeral 313 indicates a network bandwidth. The symbol M in these tables and in other which will be explained below represents mega (sixth power of 10).

FIG. 32C shows the constitution of the program resource database 102. In the figure, reference numeral 321 indicates an element program position, reference numeral 322 indicates a load quantity, reference numeral 323 indicates a memory request quantity, reference numeral 324 indicates a file I/O quantity, and reference numeral 325 indicates a transfer data quantity, for each element program.

The resource monitoring demon has two major capabilities. One is for periodically acquiring the computer resource usage status (indicated by the graph 103 of FIG. 30) of each PU. This information is given through the console computer that proves the host computer and is passed, as the information about the computer resource usage status of the PU at that moment, to the loader program 106 when the simulation program is loaded for execution. The other is for acquiring a resource quantity to be consumed by a particular program. This capability acquires a resource quantity requested by a given program and registers the acquired information in the program resource database 102 (block 105). Also, this resource information is obtained from the OS by use of a system call prepared in the OS.

The resource monitoring demon is activated in advance for each of the available computers (acquired in block 201) registered by the user in advance. This activation is made by use of a shell script or the like.

The following describes the capability of periodically acquiring the computer resource usage status. The computer resource information to be acquired by this capability includes a CPU usage ratio, a free memory quantity, an average disk I/O, and an average network I/O. These pieces of information are periodically acquired and stored in the program resource database 102 of FIG. 30.

FIG. 33 shows the constitution of the program resource database. In this example, a time interval for acquiring the resource information from the OS is 100 seconds. Reference numerals 401 to 403 indicate the CPU usage ratios, reference numerals 411 through 413 indicate the free memory quantities, reference numerals 421 through 423 indicate the average disk I/O quantities, and reference numerals 431 through 433 indicate the average network I/O quantities. Three components 401 to 431, 402 to 432, and 403 to 433 for each quantity indicate the current resource usage status, the resource usage status five minutes before, and the usage status ten minutes before. It should be noted that the time interval for resource information acquisition and the time interval for storing the acquired information in the table are not restricted to the above-mentioned values.

The following describes the capability of the computer resource quantity to be consumed by a particular program. The resources to be acquired by this capability are a CPU load, a memory request quantity, a file I/O quantity, and a transfer data quantity. This capability is executed when the resource consumption quantity information about programs is not set by the user. Because a program execution time cannot be known in advance, a method is employed in which the time interval for resource quantity collection is shorter at the beginning and longer as the program execution progresses.

The following describes in detail a program allocation procedure by assuming that all pieces of resource information have been registered in the two resource databases 101 and 102 of FIG. 30.

As shown in FIG. 30, one parallel computer system used in the present embodiment is of distributed memory type composed of nine PUs 501 through 509. The PUs are interconnected by a mesh-like network 513. In this figure, the nine PUs are interconnected in a mesh manner. It will be apparent that any network topology and any number of PUs may be used in the present embodiment. In this figure, a console machine having a loader program is also connected to the network by way of the PU 507.

The PUs 507 through 509 are connected with disk units 510 through 512 respectively. In this case, the PUs other than the PUs 507 through 509 are executed by way of the PUs 507 and 509, the disk I/O performance of these PUs are lower than that of the PUs 507 through 509. For an example of a coupled program to be executed on that computer, a coupled simulation is used. The coupled program, as described in the first embodiment, is a program in which two simulation processes A and B exchange execution results thereof for simulation.

In the third embodiment, it is assumed that each PU be available and the resource quantity of each PU and the resource consumption quantity of each element program have been registered already. Therefore, in what follows, the processing equivalent to blocks 205 and 206 of FIG. 30 will be described in detail.

FIGS. 34A and 34B show the resource quantities of the PUs constituting the parallel computer system of FIG. 30. FIG. 34C shows the resource consumption quantities of the element programs. To be specific, FIG. 34A shows a CPU power 602, a memory request quantity 603, a disk I/O power 604, and a network I/O power 605 for each PU 601.

FIG. 34B shows a network configuration 611 and a bandwidth 612 for the network between the PUs. In the present embodiment, the PUs 501 through 509 are interconnected in a mesh manner, the bandwidth of the network being 50 Mbits/ second. FIG. 34C shows an executable file position 621, a load quantity 622, a memory request quantity 623, a file I/O quantity 624, a transfer data quantity 625, and the number of processes to be generated 626 for each element program. In the figure, the simulation programs A and B are represented in simA and simB respectively. In the present embodiment, the simA program is executed as two processes, while the simB program is executed as four processes.

Figure 35:
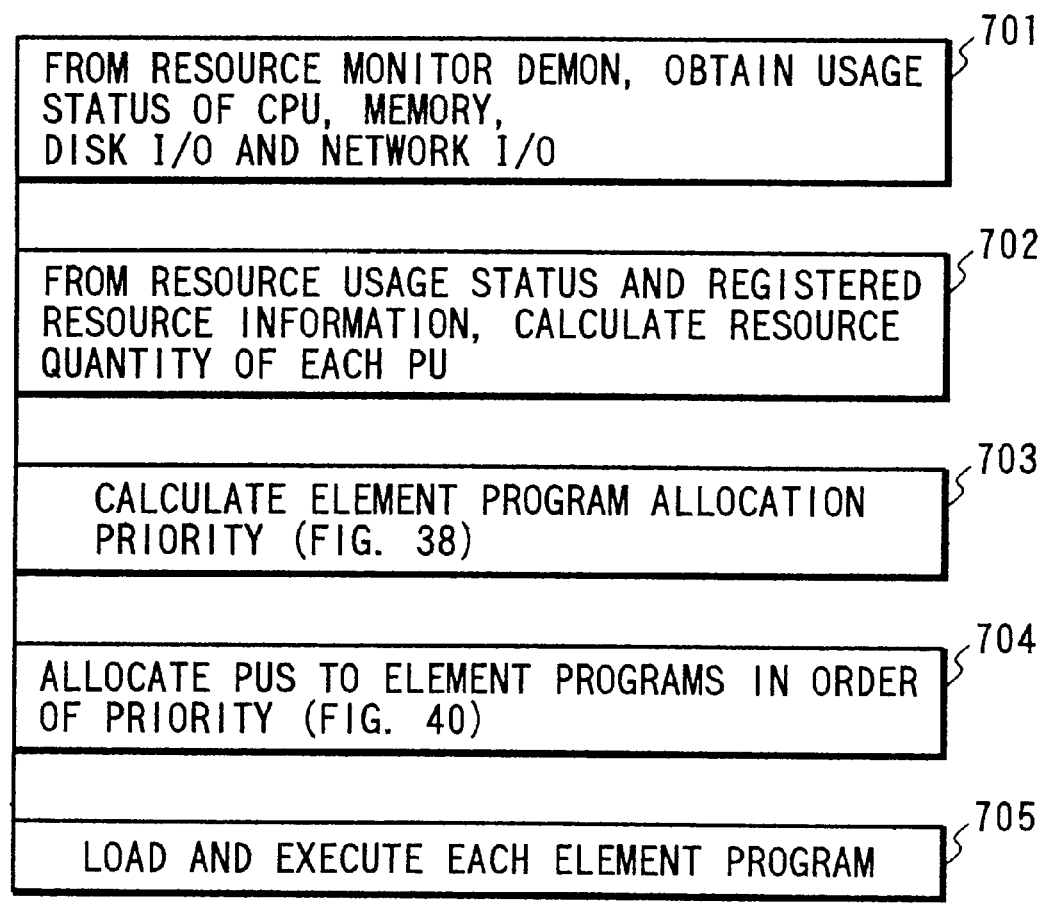
FIG. 35 is a flowchart of the program allocation processing of FIG. 31.

FIG. 35 shows details of the allocation procedure 206 (FIG. 31). First, the resource usage status of each PU registered is acquired (block 701). The specific resource items are the above-mentioned CPU usage ratio, free memory quantity, average disk I/O quantity, and average network I/O quantity. These resource quantities are acquired by inquiring the above-mentioned resource monitoring demon. FIG. 36 shows the usage status of the acquired resources. The figure indicates the acquired CPU usage ratio 802, free memory quantity 803, average disk I/O quantity 804, and average network I/O quantity 805.

Then, from the resource quantities of the PUs and the current usage status of the resources acquired above, each PU resource quantity at program loading is calculated (702). FIG. 37 shows the results of this calculation. This figure shows, for each PU 901 at program loading, a CPU reserve power 902, a free memory ratio 903, a disk I/O nonuse ratio 904, and a network I/O nonuse ratio 905 at program loading. These are calculated as follows:

CPU power 902=CPU power 602×(1−CPU usage ratio 802);

free memory ratio 903=free memory quantity 803/ main memory quantity 603;

disk I/O nonuse ratio 904=1−(average disk I/O quantity 805/ disk I/O power 604); and network I/O nonuse ratio 905=1−(average network I/O quantity 805/ network I/O power 605).

Then, an element program allocation priority is calculated (703). A plurality of element programs to be allocated are allocated one by one to the PUs in the order of decreasing priority (704). Lastly, the element programs are loaded in the respective PUs. This loading is performed by use of a remote execution command (rsh) or the like.

The element program allocation priority increases as the execution time of an element program is longer. Generally, the program execution time increases as the total amount of the resource consumption quantities of that program increases. Therefore, in the present embodiment, the allocation priority of an element program is determined based on the total amount of the resource consumption quantities of the program such that a higher priority is given as the total amount increases. When allocating each element program to a PU, it is determined which of the plurality of resources that element program needs most. Based on the determination, the element program is allocated to a PU that has a higher reserve power for the determined type of the resource.

To be specific, the allocation priority is determined as follows. Referring to FIG. 38, as initialization processing, allocation queue entries are allocated for the number of processes to be generated (1001). The element programs to be allocated are registered in the allocation queue, in which the registered programs are queued in the order of decreasing priority of allocation. The constitution of the allocation queue will be described later. Also, the values for weighting the resources to be referenced for the priority determination of blocks 1002 through 1004 are set. These values are set by the computer administrator or the user beforehand. In the present embodiment, the weights of the resources are set to 1, 1.7, 10, and 5 respectively. Then, the program allocation priority is calculated for each element program (1002 through 1004). For the element program allocation priority, the total quantity (the total effective resource consumption quantity) of the resource consumption quantity of each element program is evaluated by an evaluation function. The highest priority is given to the element program having the greatest total effective resource consumption quantity (1005).

For example, in the present embodiment, the total effective resource consumption quantity is obtained by weighting CPU load quantity cpu, memory request quantity mem, average file I/O quantity io, and average element program-to-element program transfer data quantity net with w-cpu, w-mem, w-io, and w-net respectively and adding these weighted quantities together. The weights w-cpu, w-mem, w-io, and w-net are parameters introduced to compare the sizes of the resource requests between different resources. These parameters are adjusted by the computer administrator based on the result of profiling the benchmark of the parallel program. To be more specific, if the wait for message exchange occurs often, it indicates that the request for communication is relatively high, so that the weight for communication is increased.

Basically, a higher priority is given to an element program that takes a longer execution time. It can be said that the execution time is longer as the total quantity (the total effective resource consumption quantity) required by the element program is larger. However, the resource quantity and its influence on the execution time depend on the resources. Therefore, the present embodiment uses, as an example of the total effective resource consumption quantity, the sum of the weighted resource consumption quantities of multiple types required by the element programs. It is therefore desired to adjust the above-mentioned weight values such that the total effective resource consumption quantity of an element program increases as the execution time thereof increases. In the present embodiment, this allocation priority is determined depending on the total effective resource consumption quantities of the plurality of element programs, but not on the resource reserve power of each PU. If the allocation priority is determined depending on the resource reserve powers of the plurality of PUs, then the execution time of each program needs to be evaluated by changing the combinations of the plurality of programs and the plurality of PUs. However, as the total number of processors and the total number of programs to be allocated increase, the number of combinations increases extremely, making it difficult to determine the allocation priority of each program within a practical calculation time. Hence, in the present embodiment, the determination of the allocation priority does not consider the PU resource reserve power, resulting in a simplified calculation for the allocation priority. Consequently, in the present embodiment, it is not ensured that the program having the longest execution time be given the highest allocation priority; but a program having a relatively long execution time be given the highest allocation priority.

When the allocation priorities of all PUs have been calculated, the element programs are registered in the allocation queue in the order of decreasing priority (1005). Each element program is entered in the allocation queue in a form of FIG. 39A. Each entry of the allocation queue is composed of a pointer 1101 to a program registered in that entry and the fields of priorities 1 (1102), 2 (1103), 3 (1104), and 4 (1105) in the order of decreasing priority. These priorities are determined, as described above, by weighting each of the resources to be used by the program, the weights having been used at calculating the allocation priority of that program. This ordering indicates the most necessary resource of the computer resources to be consumed by that program. Therefore, this ordering is used to determine the PUs to which the processes are allocated with emphasis placed on the resources required by the element programs.

In the present embodiment, the total effective resource consumption quantity of the simulation programs A and B are the following. The symbol M represents mega (sixth power of 10) in the following equations.

Total effective resource consumption quantity of simA=50M×1+ 20M×1.7+0M+10M×5=134M;

Total effective resource consumption quantity of simB=100M×1+ 30M×1.7+10M×10+5=301M.

Therefore, the program simB is to be allocated earlier than the program simA.

When registering the element programs in the allocation queue, an element program that forks a plurality of processes (the number of forks 626=2 or more) is registered in the number for the number of forks. FIG. 39B shows an example in which four process belonging to the program simA and two processes belonging to the program simB are registered in the allocation queue.

Figure 40:
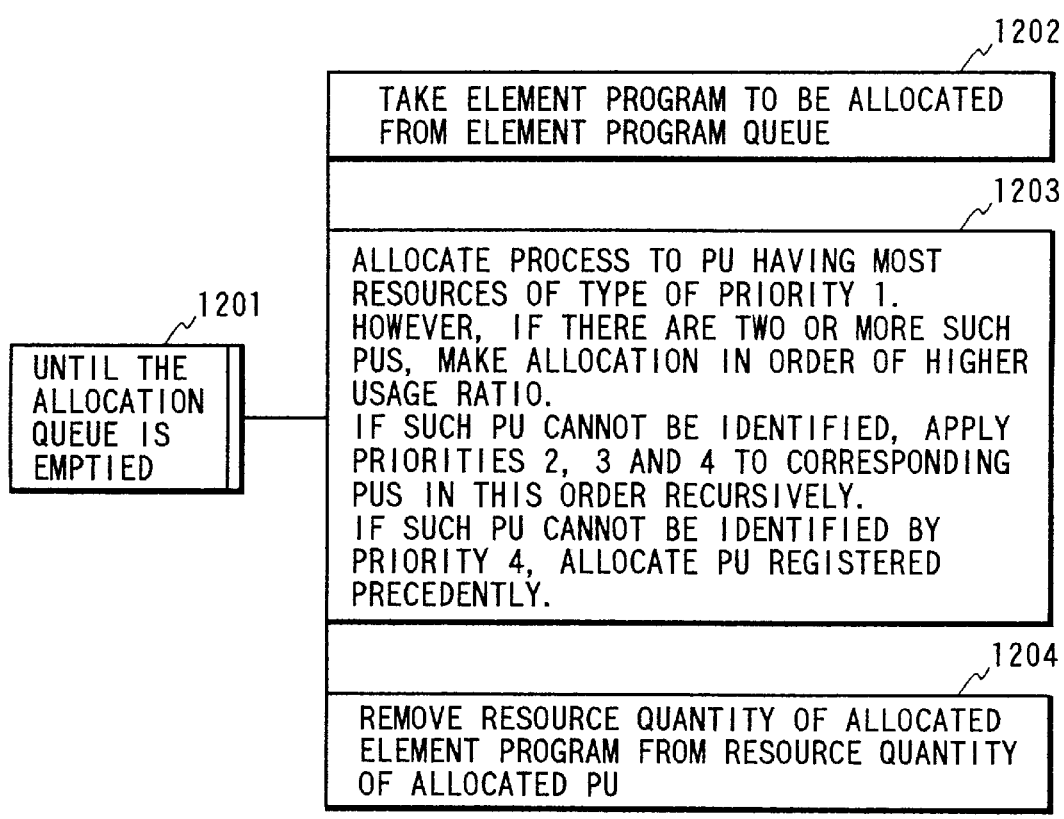
FIG. 40 is a flowchart of the element program allocation processing based on the allocation priority of FIG. 35.

The element programs are allocated to the PUs according to the priorities as determined above. FIG. 40 shows a procedure of the allocation. First, a process not yet allocated is taken out of the allocation queue (1202). The PU to which allocation is made is determined by selecting the PU that can execute the allocated program in the shortest time. As described above, the execution time on a plurality of PUs depends on the reserve powers of the resources of the PUs and the consumption quantities of the resources of the program to be allocated. However, estimating the execution time of a program at each PU by use of the resource reserve powers of all PUs takes long if the number of PUs is large. Therefore, an individual effective resource consumption quantity is determined which indicates the influence of the consumption quantities of a plurality of resources to be consumed by the program to the execution time of that program. And the size of the determined effective resource consumption quantity is used for the resource allocation priority. The product obtained by multiplying the various resource consumption quantities of the program by the weights used at the allocation priority calculation is used as an example of the individual effective consumption quantity of each resource. The program is allocated to the PU having a large reserve power of the resource of the highest resource allocation priority. Consequently, the processor selection based on the resource allocation priority does not ensure that the program is not always allocated to the PU that minimizes the execution time of the allocated program; but this selection permits the allocation of the program to the PU that makes relatively short the execution of that program.

For the above-mentioned processor allocation, the priorities of the resource allocation of a plurality of resources to be consumed by the program are registered in the allocation queue when registering the programs in the allocation queue. To be specific, when performing the PU allocation, a process taken out of the allocation queue is allocated to the PU that has the greatest resource reserve power of priority 1 of that process. If these reserve powers are equal on two or more PUs, then the PU having the highest nonuse ratio is selected for allocation. If the nonuse ratios are equal on two or more PUs, then the allocation is made by applying priorities 2, 3, and 4 recursively. If there are still PUs that have the same resource quantities at the priority 4, the PU that was entered least recently is allocated. In the first element program allocation in the present embodiment, the element program to be allocated is /users/taro/work/simB and the priority 1 is the CPU, so that the element program is allocated to the PU having highest CPU reserve power at the current allocation time. In the present embodiment, 504 through 509 are candidates for allocation. When these are given priorities 2, 3, and 4 in this order, 507 and 509 remain. Consequently, the program is allocated to the 507 that has been registered before 509.

Then, for the PU to which the program has been allocated, a resource reserve power after allocation is calculated. In the present embodiment, the calculation is made as follows:

CPU reserve power after allocation=CPU reserve power before allocation−(CPU load quantity/L);

free memory quantity after allocation=free memory quantity before allocation−memory consumption quantity;

disk I/O power after allocation=disk I/O power before allocation−(file I/O quantity/M); and network I/O power after allocation=network I/O power before allocation−(transfer data quantity/N).

L in the above-mentioned equation denotes a value for relating the CPU power of the PU with the CPU load quantity. For example, if the CPU usage ratio becomes 100 (full operation of the CPU) when an element program having a CPU power of 100 and a CPU load quantity of 100 has been executed in five processes, the value of L becomes 5. It is assumed here that L=5 on all PUs for simplicity. M denotes is a value for relating the disk I/O power with the file I/O quantity. If the usage ratio of the file I/O becomes 100 (full operation of the disk I/O) when an element program having a disk I/O power of 100 and the file I/O quantity of 100 has been executed in five processes, the value M becomes 5. It is assumed here that M=5 on all PUs for simplicity. N is a value for relating the network I/O power with the transfer data quantity. If the usage ratio of the network I/O becomes 100 (full operation of the network I/O) when an element program having the network I/O power of 100 and the transfer data quantity of 100 has been executed in five processes, the value of N becomes 5. It is assumed here that N=5 on all PUs for simplicity.

FIG. 41 shows the PU resource quantities after one element program has been allocated. Reference numeral 1301 indicates the resource quantities of the PU with one element program allocated in the above-mentioned procedure. Subsequently, this procedure is repeated until all element programs are allocated.

FIG. 42 shows the results of the allocation. In the present example, two simulation processes for the simulation programs simA and four simulation processes for the simulation program simB are allocated to two and four PUs, respectively. The following steps enable these two simulation programs to be executed according to the method shown in the first embodiment, The simulation processes corresponding to the program simA and simB are loaded into two and four PUs, respectively. The data conversion process is loaded into the six PUs. Then, the simulation processes and the data conversion processes loaded in these six PUs are started up. The operation explained in the first embodiment is started.

According to the present embodiment, a PU is preferentially allocated to a program having a relatively long execution time among a plurality of programs and each program is allocated with a PU that can execute the program in a relatively short time at the time of the allocation, thereby preventing the execution time of any of the programs running on any of the PUs from being made extremely long. Consequently, the loads of the PUs can be allocated generally uniformly. In addition, in the above-mentioned evaluation of the allocation priorities, each of the programs can be prioritized with the above-mentioned relatively simple calculations. Further, in allocation of the PUs to the programs, use of the allocation priorities classified by resource simplifies the selection of the PUs to be allocated.

As described and according to the present invention, in execution of a plurality of simulation programs on a computer system in a cooperative manner, the data exchange between the simulation programs and the data conversion necessitated by the difference between the bases of the simulation program are supported by the program dedicated to the data conversion, the simulation programs may only be modified to a relatively small degree as compared with execution of each simulation program alone. Consequently, this novel constitution facilitates the execution of a coupled simulation by the cooperation between the plurality of simulation programs.

While the embodiments of the present invention have been described using specific terms, such description is for illustrative purposes only, and it is to be understood that changes and variations may be made without departing from the spirit or scope of the appended claims.

What is claimed is:

1. A method of assisting execution of a plurality of simulation programs for coupled simulation, wherein each simulation program is programmed so as to produce values of at least one physical quantity, defined on a base which belongs to a simulation target region, said method comprises a plurality of steps executed by a computer system, said steps including:

receiving by an interprogram data communication assist program from each simulation program, base information related to a base which said each simulation program uses;

judging by said interprogram data communication assist program, positional relationship between the base of each simulation program and a base of other one of said plurality of simulation programs, based on said base information received from each of said plurality of simulation programs;

converting by said interprogram data communication assist program, operation result data produced by one of said plurality of simulation programs and defined on a base of said one simulation program into data defined on a base of at least other one of said plurality of simulation programs which uses the operation result data; and transferring by said interprogram data communication assist program, said data obtained by said converting step to said other simulation program which uses said operation result data;

wherein said converting step is executed based on positional relationship judged by said judging step between the base of said one simulation program which has produced said operation result data and the base of said other simulation program which uses said operation result data.

2. A method of assisting execution of said plurality of simulation programs for coupled simulation according to claim 1;

wherein said converting step includes the steps of;

selecting one conversion procedure corresponding to a pair of a kind of the base of said one simulation program which has produced said operation result data and a kind of the base of said other simulation program which uses said operation result data; and converting said operation result data according to said selected data converting procedure;

wherein said one conversion process is selected from a plurality of conversion procedures each predetermined for a pair of one of a plurality of bases which may be used by a simulation program which will produce operation result data and one of a plurality of bases which may be used by a simulation program which will use the operation result data.

3. A method of assisting execution of said plurality of simulation programs for coupled simulation according to claim 1, further comprising a step of:

selecting by said conversion program, part of said operation result data;

wherein said converting step is executed for said selected part of said operation result data;

wherein said part of data comprises data relating to a portion of a simulation target region of said one simulation program which has produced said operation result data, said portion of said simulation target region overlapping a simulation target region of said other simulation program which uses said operation result data;

wherein said selecting step is executed based upon said positional relationship judged by said judging step between the base of said one simulation program which has produced said operation result data and the base of said other simulation program which uses said operation result data.

4. A method of assisting execution of said plurality of simulation programs for coupled simulation according to claim 1, further comprising a step of:

detecting by said interprogram data communication assist program, whether there is at least one other simulation program which will use an operation result data which said one simulation program will produce, among said plurality of simulation programs;

wherein said detecting step is executed based on positional relationship judged by said judging step between the base of said one simulation program which has produced said operation result data and the base of said other simulation program;

wherein said transferring step includes the steps of;

transferring by said interprogram data communication assist program, said operation result data which has been produced by said one simulation program to one other simulation program, when said one other simulation program has been detected by said detecting step; and transferring by said interprogram data communication assist program, said operation result data which has been produced by said one simulation program to each of plural other simulation programs, when said plural other simulation programs have been detected by said detecting step;

wherein said converting step includes the steps of;

converting said operation result data which has been produced by said one simulation program into data defined on the base of one other simulation program, when said one other simulation program has been detected by said detecting step; and converting said operation result data which has been produced by said one simulation program into a plurality of data each defined on the base of a plurality of other simulation programs, when said plurality of other simulation programs have been detected by said detecting step.

5. A method of assisting execution of said plurality of simulation programs for coupled simulation according to claim 4;

wherein said positional relationship judged by said judging step includes information as to whether at least part of the simulation target region of each simulation program overlaps a simulation target region of other simulation program;

wherein said detecting step includes a step of detecting by said interprogram data communication assist program, whether there is at least one other simulation program with a simulation target region at least part of which overlaps the simulation target region of said one simulation program, based upon said positional relationship judged between said one simulation program and said other simulation program.

6. A method of assisting execution of said plurality of simulation programs for coupled simulation according to claim 1;

wherein said converting step is executed in response to a send request issued for said operation result data by said one simulation program which has produced said operation result data.

7. A method of assisting execution of said plurality of simulation programs for coupled simulation according to claim 1;

wherein said positional relationship judged by said judging step between the base of each simulation program and the base of other simulation program includes positional relationship between a plurality of discrete points which compose the base of each simulation program and a plurality of discrete points which compose the base of the other simulation program.

8. A method of assisting execution of said plurality of simulation programs for coupled simulation according to claim 7, wherein said positional relationship between said plurality of discrete points which compose the base of each simulation program and said plurality of discrete points which compose the base of the other simulation program includes at least one of (1) distances between each of said plurality of discrete points which compose the base of each simulation program and part of said plurality of discrete points which compose the base of the other simulation program, said part of said plurality of discrete points comprising discrete points near said each discrete points which composes the base of said each simulation program, and (2) distances between each of said plurality of discrete points which compose the base of said other simulation program and part of said plurality of discrete points which compose the base of said each simulation program, said part of said plurality of discrete points comprising discrete points near said each discrete points which composes the base of said other simulation program.

9. A method of assisting execution of said plurality of simulation programs for coupled simulation according to claim 1;

wherein each simulation program is executed as at least one simulation process, whereby said plurality of simulation programs are executed as a plurality of simulation processes;

wherein said interprogram data communication assist program is executed as a plurality of interprogram data communication assist processes each corresponding to one of said plurality of simulation processes.

10. A method of assisting execution of said plurality of simulation programs for coupled simulation according to claim 9;

wherein said receiving step includes the steps of;
notifying by each simulation process, base information of said each simulation process to one of said plurality of interprogram data communication assist processes corresponding to said each simulation process; and
notifying by each interprogram data communication assist process, base information of one simulation process corresponding to said each interprogram data communication assist process to other interprogram data communication assist process;

wherein said judging step includes a step of judging by each interprogram data communication assist process, positional relationship between a base of one of said plurality of simulation processes corresponding to said each interprogram data communication assist process and a base of other one of said plurality of simulation processes, based on base information of said one simulation process corresponding to said each interprogram data communication assist process and base information of said other simulation process;

wherein said converting step is executed by either one of one interprogram data communication assist process corresponding to one simulation process which has produced said operation result data among said plurality of interprogram data communication assist processes and other interprogram data communication assist process corresponding to other simulation process which uses said operation result data;

wherein said method further includes a step of sending operation result data from said one interprogram data communication assist process to said other interprogram data communication assist process corresponding to said other simulation process which uses said operation result data;

wherein said operation result data sent by said sending step is data obtained by executing said converting step when said converting step is executed by said one interprogram data communication assist process, and said operation result data sent by said sending step is said operation result data which said one simulation process has produced, when said converting step is executed by said other interprogram data communication assist process.

11. A method of assisting execution of said plurality of simulation programs for coupled simulation according to claim 10;

wherein said method further includes a step of;
detecting by said one interprogram data communication assist process corresponding to said one simulation process, whether there is other one or a plurality of simulation processes which use operation result data which will be produced by said one simulation process;

wherein said detecting step is executed by said one interprogram data communication assist process, based on positional relationship between said one simulation process and other simulation process judged by said judging step;

wherein said sending step of said operation result data to said other interprogram data communication assist process includes the steps of;
sending said operation result data produced by said one interprogram data communication assist process to one other interprogram data communication assist process corresponding to one other simulation process, when said one other data simulation process has been detected by said detecting step; and
sending said operation result data produced by said one interprogram data communication assist process to each of a plurality of other interprogram data communication assist processes corresponding to a plurality of other simulation processes, when said plurality of other simulation processes have been detected by said detecting step;

wherein said converting step is executed by one of said one interprogram data communication assist process and one other interprogram data communication assist process corresponding to one other simulation process, when said one simulation process has been detected by said detecting step;

wherein said converting step is executed by either one of said one interprogram data communication assist process or by a plurality of other interprogram data communication assist processes corresponding to a plurality of other simulation processes, when said plurality of other simulation processes have been detected by said detecting step.

12. A method of assisting execution of said plurality of simulation programs for coupled simulation according to claim 11;

wherein said positional relationship judged by said judging step executed by each interprogram data communication assist process includes information as to whether at least part of the simulation target region of each simulation process overlaps a simulation target region of other simulation process;

wherein said detecting step executed by said one interprogram data communication assist process includes a step of detecting by said interprogram data communication assist process, whether there is at least one other simulation process with a simulation target region at least part of which overlaps the simulation target region of said one simulation process, based upon said positional relationship judged between said one simulation process and said other simulation process.

13. A method of assisting execution of said plurality of simulation programs for coupled simulation according to claim 10;

wherein a plurality of libraries are further provided each corresponding to one of said plurality of simulation processes;

wherein said notifying step of the base information of each simulation process therefrom to said interprogram data communication assist process corresponding thereto includes the steps of;

notifying said base information of each simulation process therefrom by a function call to one of said plurality of libraries corresponding to said each simulation process; and notifying said notified base information from said one library corresponding to said each simulation process to said interprogram data communication assist process corresponding to said each simulation process;

wherein said sending step of said operation result data to said other simulation process which uses said operation result data by said other interprogram data communication assist process corresponding to said other simulation process includes the steps of;

notifying said operation result data from said other interprogram data communication assist process to other one of said plurality of libraries corresponding to said other simulation process; and notifying said operation result data from said other library to said other simulation process.

14. A method of assisting execution of said plurality of simulation programs for coupled simulation according to claim 10;

wherein said sending step of said operation result data by said one interprogram data communication assist process to said other simulation processes is executed in response to a send request for said operation result data issued by said one simulation process;

wherein said notifying step of said operation result data by said other interprogram data communication assist process to said other simulation process is executed in response to a receive request for said operation result data issued by said other simulation process.

15. A method of assisting execution of said plurality of simulation programs for coupled simulation according to claim 10;

wherein each simulation program is executed as a plurality of simulation processes, wherein each simulation process executes simulation to be executed by said each simulation program to part of the simulation target region of said each simulation program, whereby said plurality of simulation programs are executed as a plurality of simulation processes whose number is greater than that of said plurality of simulation programs;

wherein said interprogram data communication assist program is executed as a plurality of interprogram data communication assist processes each corresponding to one of said plurality of simulation processes.

16. A method of assisting execution of said plurality of simulation programs for coupled simulation according to claim 15;

wherein said notifying step of the base information of one simulation process corresponding to each interprogram data communication assist process to other interprogram data communication assist process includes a step of notifying the base information to a plurality of other interprogram data communication assist processes corresponding to other simulation processes which belong to other simulation program than one simulation program to which said one simulation process belongs;

wherein said judging step executed by each interprogram data communication assist process includes a step of judging positional relationship between a base of one simulation process corresponding to said each interprogram data communication assist process and a base of each of a plurality of other simulation processes which belong to other simulation programs than one simulation program to which said one simulation process belongs;

wherein said judging is executed by said each interprogram data communication assist process based on base information of said corresponding simulation process of said each interprogram data communication assist process and base information of each of said plurality of other interprogram data communication assist processes.

17. A method of assisting execution of said plurality of simulation programs for coupled simulation according to claim 16;

wherein said method further includes a step of;

detecting by said one interprogram data communication assist process corresponding to said one simulation process which has produced said operation result, whether there is other one or a plurality of simulation processes which use operation result data which will be produced by said one simulation process, among a plurality of other simulation processes which belong to other simulation program than one simulation program to which said one simulation process belongs;

wherein said detecting is executed by said one interprogram data communication assist process, based on positional relationship between said one simulation process and each of said other simulation processes judged by said judging step executed by said one interprogram data communication assist process.

18. A method of assisting execution of said plurality of simulation programs for coupled simulation according to claim 1, wherein said plurality of simulation programs and said interprogram data communication assist program are executed on a same processor included in said computer system.

19. A method of assisting execution of said plurality of simulation programs for coupled simulation according to claim 1, wherein at least plural ones within said plurality of simulation programs are executed on plural mutually different ones of a plurality of processors included in said computer system.

20. A method of assisting execution of said plurality of simulation programs for coupled simulation according to claim 9, wherein said plurality of simulation processes and said plurality of interprogram data communication assist processes are executed on a same processor included in said computer system.

21. A method of assisting execution of said plurality of simulation programs for coupled simulation according to claim 9;

wherein at least plural ones within said plurality of simulation processes are executed on plural mutually different ones of a plurality of processors included in said computer system;

wherein each interprogram data communication assist process and a simulation process corresponding thereto are executed on a same one of said plurality of processors.

22. A method of assisting execution of said plurality of simulation programs for coupled simulation according to claim 15;

wherein at least plural ones within said plurality of simulation processes corresponding to said plurality of programs are executed on plural mutually different ones of a plurality of processors included in said computer system;

wherein each interprogram data communication assist process and a simulation process corresponding thereto are executed on a same one of said plurality of processors.

23. A method of assisting execution of said plurality of simulation programs for coupled simulation according to claim 1;

wherein said interprogram data communication assist program comprises a plurality of programs each of which corresponds to one of said plurality of simulation programs and is executed as a subroutine of said corresponding one of said plurality of simulation programs;

wherein each of said plurality of programs executes processing to be executed by said interprogram data communication assist program.

24. A method of assisting execution of a plurality of simulation programs for coupled simulation, wherein each simulation program is programmed so as to produce values of at least one physical quantity, defined on a base which belongs to a simulation target region, said method comprises a plurality of steps executed by a computer system, said steps including:

receiving by an interprogram data communication assist program from each simulation program, base information related to a base which said each simulation program uses;

judging by said interprogram data communication assist program, positional relationship between the base of each simulation program and a base of other of said plurality of simulation programs, based on said base information received from each of said plurality of simulation programs;

detecting by said interprogram data communication assist program, at least one other simulation program, if there is any, which uses operation result data which will be produced by one of said plurality of simulation programs, said detecting being done based on positional relationship between said one simulation program and said one other simulation program, judged by said judging step; and transferring by said interprogram data communication assist program, operation result data to at least one other simulation program detected by said detecting step, when said operational data has been generated by said one simulation program.

25. A method of assisting execution of said plurality of simulation programs for coupled simulation according to claim 24;

wherein said positional relationship judged by said judging step includes information as to whether at least part of a simulation target region of each simulation program overlaps a simulation target region of other simulation program;

wherein said detecting step includes a step of detecting by said interprogram data communication assist program, whether there is at least one other simulation program with a simulation target region at least part of which overlaps the simulation target region of said one simulation program, based upon said positional relationship judged between said one simulation program and said other simulation program.

26. A method of assisting execution of said plurality of simulation programs for coupled simulation according to claim 24;

wherein said transferring step of said operation result includes the steps of;

transferring by said interprogram data communication assist program, said operation result data produced by said one simulation program to one other simulation program, when said one other simulation program has been detected by said detecting step; and transferring by said interprogram data communication assist program, said operation result data produced by said one simulation program to each of plural other simulation programs, when said plural other simulation programs have been detected by said detecting step.

27. A method of assisting execution of said plurality of simulation programs for coupled simulation according to claim 24;

wherein each simulation program is executed as at least one simulation process, whereby said plurality of simulation programs are executed as a plurality of simulation processes;

wherein said interprogram data communication assist program is executed as a plurality of interprogram data communication assist processes each corresponding to one of said plurality of simulation processes.

28. A method of assisting execution of said plurality of simulation programs for coupled simulation according to claim 27;

wherein said receiving step includes the steps of;

notifying base information of each simulation process to one of said plurality of interprogram data communication assist processes corresponding to said each simulation process from said each simulation process; and notifying by each interprogram data communication assist process, base information of one simulation process corresponding to said each interprogram data communication assist process to other interprogram data communication assist process;

wherein said judging step includes a step of judging by each interprogram data communication assist process, positional relationship between a base of one of the plurality of simulation processes corresponding to said each interprogram data communication assist process and a base of other one of said plurality of simulation processes, based on base information of said one simulation process corresponding to said each interprogram data communication assist process and base information of said other simulation process;

wherein said transferring step includes the steps of;
sending operation result data produced by one of said plurality of simulation processes from one interprogram data communication assist process corresponding to said one simulation process to other interprogram data communication assist process corresponding to other simulation process which uses said operation result data; and transferring said operation result data from said other interprogram data communication assist process to said other simulation process;

wherein said detecting step includes a step of detecting by said one interprogram data communication assist process corresponding to said one simulation process, whether there is other one or a plurality of simulation processes which use operation result data which said one simulation process will produce;

wherein said detecting is executed by said one interprogram data communication assist process, based on positional relationship between said one simulation process and other simulation process, judged by said judging step.

29. A method of assisting execution of said plurality of simulation programs for coupled simulation according to claim 28;

wherein each simulation program is executed as a plurality of simulation processes, wherein each simulation process executes simulation to be executed by said each simulation program to part of the simulation target region of said each simulation program, whereby said plurality of simulation programs are executed as a plurality of simulation processes whose number is greater than that of said plurality of simulation programs.

30. A method of assisting execution of said plurality of simulation programs for coupled simulation according to claim 29;

wherein said interprogram data communication assist program is executed as a plurality of interprogram data communication assist processes each corresponding to one of said plurality of simulation processes;

wherein said notifying step of the base information of one simulation process corresponding to each interprogram data communication assist process to other interprogram data communication assist process includes a step of notifying the base information to a plurality of other interprogram data communication assist processes corresponding to other simulation processes which belong to other simulation program than one simulation program to which said one simulation process belongs;

wherein said judging step executed by each interprogram data communication assist process includes a step of judging positional relationship between a base of one simulation process corresponding to said each interprogram data communication assist process and a base of each of a plurality of other simulation processes which belong to other simulation programs than one simulation program to which said one simulation process belongs;

wherein said judging is executed by said each interprogram data communication assist process based on base information of said one corresponding simulation process and base information of each of said other simulation processes;

wherein said detecting step includes a step of detecting by said one interprogram data communication assist process corresponding to said one simulation process, whether there is other one or a plurality of simulation processes which use said operation result data which said one simulation process will produce, among a plurality of other simulation processes which belong to other simulation program than one simulation program to which said one simulation process belongs;

wherein said detecting is executed by said one interprogram data communication assist process, based on positional relationship between said one simulation process and each of said other simulation processes, judged by said judging step executed by said one interprogram data communication assist process.

31. A method of assisting execution of said plurality of simulation programs for coupled simulation according to claim 24, wherein said plurality of simulation programs and said interprogram data communication assist program are executed on a same processor included in said computer system.

32. A method of assisting execution of said plurality of simulation programs for coupled simulation according to claim 24, wherein at least plural ones within said plurality of simulation programs are executed on plural mutually different ones of a plurality of processors included in said computer system.

33. A method of assisting execution of said plurality of simulation programs for coupled simulation according to claim 27:

wherein at least plural ones within said plurality of simulation processes are executed on plural mutually different ones of a plurality of processors included in said computer system;

wherein each interprogram data communication assist process and a simulation process corresponding thereto are executed on a same one of said plurality of processors.

34. A method of assisting execution of said plurality of simulation programs for coupled simulation according to claim 29;

wherein at least plural ones within said plurality of simulation processes corresponding to said plurality of programs are executed on plural mutually different ones of a plurality of processors included in said computer system;

wherein each interprogram data communication assist process and a simulation process corresponding thereto are executed on a same one of said plurality of processors.

35. A method of assisting execution of said plurality of simulation programs for coupled simulation according to claim 24;

wherein said interprogram data communication assist program comprises a plurality of programs each of which corresponds to one of said plurality of simulation programs and is executed as a subroutine of said corresponding one of said plurality of simulation programs;

wherein each of said plurality of programs executes processing to be executed by said interprogram data communication assist program.

36. A method of assisting execution of said plurality of simulation programs for coupled simulation according to claim 28;

wherein said sending step of said operation result data to said other interprogram data communication assist process from said interprogram data communication assist process corresponding to said simulation process which has produced said operation result data includes the steps of;

enciphering said operation result data by said interprogram data communication assist process with a first key for enciphering predetermined for said other simulation process;

sending said enciphered operation result data to said other interprogram data communication assist process corresponding to said other simulation process which uses said operation result data; and deciphering said enciphered operation result data by said other interprogram data communication assist process with a second key for deciphering predetermined for said other simulation process.

37. A method of assisting execution of said plurality of simulation programs for coupled simulation according to claim 36, wherein said first and second keys comprise a secret key predetermined for said other simulation process and a public key predetermined therefor, respectively.

38. A storage medium for storing an interprogram data communication assist program programmed so as to execute said receiving step to said transferring step of claim 1.

39. A storage medium for storing an interprogram data communication assist program programmed so as to execute said receiving step to said transferring step of claim 24.

40. A method of assisting cooperative execution of a plurality of programs, said method comprises a plurality of steps executed by a computer system, said steps including:

receiving by an interprogram data communication assist program from each program, data information related to a group of data which said each program handles;

judging by said interprogram data communication assist program, relationship between one group of data handled by each program and other group of data handled by other of said plurality of programs, based on data information received from each of said plurality of programs;

converting by said interprogram data communication assist program, one group of data which has been produced by one of said plurality of programs into other group of data used by at least other one of said plurality of programs; and transferring by said interprogram data communication assist program, said data obtained by said converting step to said other program;

wherein said converting step is executed based on data relationship judged by said judging step between the one group of data produced by said one program and other group of data used by said other program.

41. A method of assisting cooperative execution of a plurality of programs cooperatively, said method comprises a plurality of steps executed by said computer system, said steps including:

receiving by an interprogram data communication assist program from each program, data information related to a group of data used by said each program uses;

judging by said interprogram data communication assist program, relationship between a group of data handled by each program and other group of data handled by other one of said plurality of programs, based on said data information received from each of said plurality of programs;

detecting by said interprogram data communication assist program, at least one other program, if there is any, which will use a group of data which will be produced by one of said plurality of programs, said detecting being done based on relationship between a group of data handled by said one program and other group of data handled by said one other program, judged by said judging step; and transferring by said interprogram data communication assist program, one group of data to said one other program, if said one other program has been detected by said detecting step, when said one group of data has been produced.

42. A method of assisting cooperative execution of a plurality of execution programs, said method comprising the following steps executed by a computer system which includes a plurality of processor units:

allocating each of said plurality of execution programs to at least one of said plurality of processor units selected for said each execution program, said allocating step including the sub-steps of:

determining an order of allocation of said execution programs to said plurality of processor units, based on resource consumption quantities of said plurality of execution programs so that an execution program with larger resource consumption quantity is allocated earlier, sequentially allocating each of said plurality of execution programs to a respective one of said plurality of processor units according to said determined order of allocation, and selecting one of said plurality of processor units, based upon a resource consumption quantity of one of said plurality of execution programs to be allocated next and resource reserve powers of said plurality of processor units;

allocating an interprogram data communication assist program to each of a plurality of processor units to each of which at least one of said plurality of execution programs has been allocated;

activating each of said plurality of execution programs as allocated to one of said plurality of processor units and said interprogram data communication assist program as allocated to each of said plurality of processor units to each of which at least one of said plurality of execution programs has been allocated;

receiving by at least one said interprogram data communication assist program allocated to at least one of said plurality of processor units to each of which at least one of said plurality of execution programs has been allocated, from each execution program as allocated to one of said processor units, data information related to a group of data which said each execution program handles;

judging, by at least one said interprogram data communication assist program as allocated to at least one of said plurality of processor units to each of which at least one of said plurality of execution programs has been allocated, relationship between one group of data handled by each execution program as allocated to one of said plurality processor units and other group of data handled by other of said plurality of execution programs as allocated to one of said plurality processor units, based on data information received from each of said plurality of execution programs as allocated to one of said plurality processor units;

converting, by at least one said interprogram data communication assist program allocated to at least one of said plurality of processor units to each of which at least one of said plurality of execution programs has been allocated, one group of data which has been produced by one of said plurality of execution programs as allocated to one of said plurality processor units into other group of data used by at least other one of said plurality of execution programs as allocated to one of said plurality processor units; and transferring by at least one said interprogram data communication assist program allocated to at least one of said plurality of processor units to each of which at least one of said plurality of execution programs has been allocated, said data obtained by said converting step to said other execution program;

wherein said converting step is executed based on data relationship judged by said judging step between the one group of data produced by said one execution program and other group of data used by said other execution program.

43. A method of assisting execution of a plurality of simulation programs for coupled simulation, wherein each simulation program is programmed so as to produce values of at least one physical quantity, defined on a base which belongs to a simulation target region, said method comprises a plurality of steps executed by a computer system which includes a plurality of processor units, said method including the steps of:

allocating each of said plurality of simulation programs to at least one of said plurality of processor units selected for said each simulation program, including the substeps of:

determining an order of allocation of said simulation programs to said plurality of processor units, based on resource consumption quantities of said plurality of simulation programs so that a simulation program with larger resource consumption quantity is allocated earlier, sequentially allocating each of said plurality of simulation programs to a respective one of said plurality of processor units according to said determined order to allocation, selecting one of said plurality of processor units, based upon a resource consumption quantity of one of said plurality of simulation programs to be allocated next and resource reserve powers of said plurality of processor units;

allocating an interprogram data communication assist program to each of a plurality of processor units to each of which at least one of said plurality of simulation programs has been allocated;

activating each of said plurality of simulation programs as allocated to one of said plurality of processor units and said interprogram data communication assist program allocated to each of said plurality of processor units to each of which at least one of said plurality of simulation programs has been allocated;

receiving by at least one said interprogram data communication assist program allocated to at least one of said plurality of processor units to each of which at least one of said plurality of simulation programs has been allocated, from each simulation program as allocated to one of said plurality processor units, base information related to a base which said each simulation program as allocated to one of said plurality processor units uses;

judging by at least one said interprogram data communication assist program as allocated to one of said plurality of processor units to each of which at least one of said plurality of simulation programs has been allocated, positional relationship between the base of each simulation program as allocated to one of said plurality processor units and a base of other one of said plurality of simulation programs as allocated to one of said plurality processor units, based on said base information received from each of said plurality of simulation programs each as allocated to one of said plurality processor units;

converting by at least one said interprogram data communication assist program allocated to at least one of said plurality of processor units to each of which at least one of said plurality of simulation programs has been allocated, operation result data produced by one of said plurality of simulation programs as allocated to one of said plurality processor units and defined on a base of said one simulation program as allocated to one of said plurality processor units into data defined on a base of at least other one of said plurality of simulation programs which uses the operation result data and is allocated to one of said plurality processor units; and transferring by at least one said interprogram data communication assist program allocated to at least one of said plurality of processor units to each of which at least one of said plurality of simulation programs has been allocated, said data obtained by said converting step to said other simulation program which uses said operation result data and is allocated to one of said plurality processor units;

wherein said converting step is executed based on positional relationship judged by said judging step between the base of said one simulation program which has produced said operation result data and the base of said other simulation program which uses said operation result data.

* * * * *